(12) United States Patent
Ando et al.

(10) Patent No.: US 6,978,083 B2
(45) Date of Patent: Dec. 20, 2005

(54) STREAM DATA GENERATION METHOD AND PARTIAL ERASE PROCESSING METHOD

(75) Inventors: Hideo Ando, Hino (JP); Kazuyuki Uyama, Kumagaya (JP); Yuuji Ito, Ota-ku (JP); Shinichi Kikuchi, Yokohama (JP)

(73) Assignee: Kabushiki Kaisha Toshiba, Kawasaski (JP)

( * ) Notice: Subject to any disclaimer, the term of this patent is extended or adjusted under 35 U.S.C. 154(b) by 0 days.

(21) Appl. No.: 10/365,501

(22) Filed: Feb. 13, 2003

(65) Prior Publication Data

US 2003/0118320 A1 Jun. 26, 2003

Related U.S. Application Data

(63) Continuation of application No. 09/660,556, filed on Sep. 12, 2000, now abandoned, which is a continuation of application No. PCT/JP00/00653, filed on Feb. 7, 2000.

(30) Foreign Application Priority Data

Feb. 5, 1999 (JP) .......................................... 11-028697

(51) Int. Cl.[7] ................................................. H04N 5/91
(52) U.S. Cl. ......................... 386/95; 386/125; 386/126
(58) Field of Search ............................ 386/46, 95, 98, 386/105, 111, 112, 125, 126; 370/538, 509

(56) References Cited

U.S. PATENT DOCUMENTS

| | | | |
|---|---|---|---|
| 5,661,728 A | 8/1997 | Finotello et al. | |
| 5,684,804 A | * 11/1997 | Baronetti et al. | ........... 370/509 |
| 5,768,466 A | 6/1998 | Kawamura et al. | |
| 5,802,068 A | * 9/1998 | Kudo | .......................... 370/538 |
| 5,819,004 A | 10/1998 | Azadegan et al. | |
| 5,999,698 A | 12/1999 | Nakai et al. | |
| 6,134,383 A | 10/2000 | Kikuchi et al. | |
| 6,172,989 B1 | 1/2001 | Yanagihara et al. | |
| 6,266,483 B1 | * 7/2001 | Okada et al. | ................ 386/128 |
| 6,278,834 B1 | * 8/2001 | Yagi et al. | ..................... 386/54 |
| 6,285,825 B1 | * 9/2001 | Miwa et al. | ................... 386/98 |
| 6,470,135 B1 | * 10/2002 | Kim et al. | ...................... 386/68 |
| 6,546,192 B2 | * 4/2003 | Hisatomi et al. | .............. 386/70 |
| 6,574,422 B1 | * 6/2003 | Kikuchi et al. | .............. 386/105 |
| 6,819,865 B2 | * 11/2004 | Ando et al. | ..................... 386/95 |

FOREIGN PATENT DOCUMENTS

| | | |
|---|---|---|
| EP | 0 899 964 | 3/1999 |
| EP | 000929072 A2 * | 7/1999 |
| JP | 6-150623 | 5/1994 |
| JP | 6-311472 | 11/1994 |
| JP | 7-235170 | 9/1995 |
| JP | 08-223531 | 8/1996 |
| JP | 08-235781 | 9/1996 |
| JP | 8-273304 | 10/1996 |
| JP | 9-139937 | 5/1997 |
| JP | 09-322148 | 12/1997 |
| JP | 9-322148 | 12/1997 |
| JP | 10-50035 | 2/1998 |
| JP | 10-285548 | 10/1998 |
| JP | 10-320914 | 12/1998 |
| JP | 11-16286 | 1/1999 |
| JP | 2000-217066 | 8/2000 |

* cited by examiner

*Primary Examiner*—Huy Nguyen
(74) *Attorney, Agent, or Firm*—Oblon, Spivak, McClelland, Maier & Neustadt, P.C.

(57) ABSTRACT

Stream data has a recording data structure formed in units of stream blocks (or stream object units SOBU) which are segmented to have a predetermined data size. Data are recorded (or encoded) and partially erased (or temporarily erased) in units of the stream blocks (SOBUs).

5 Claims, 30 Drawing Sheets

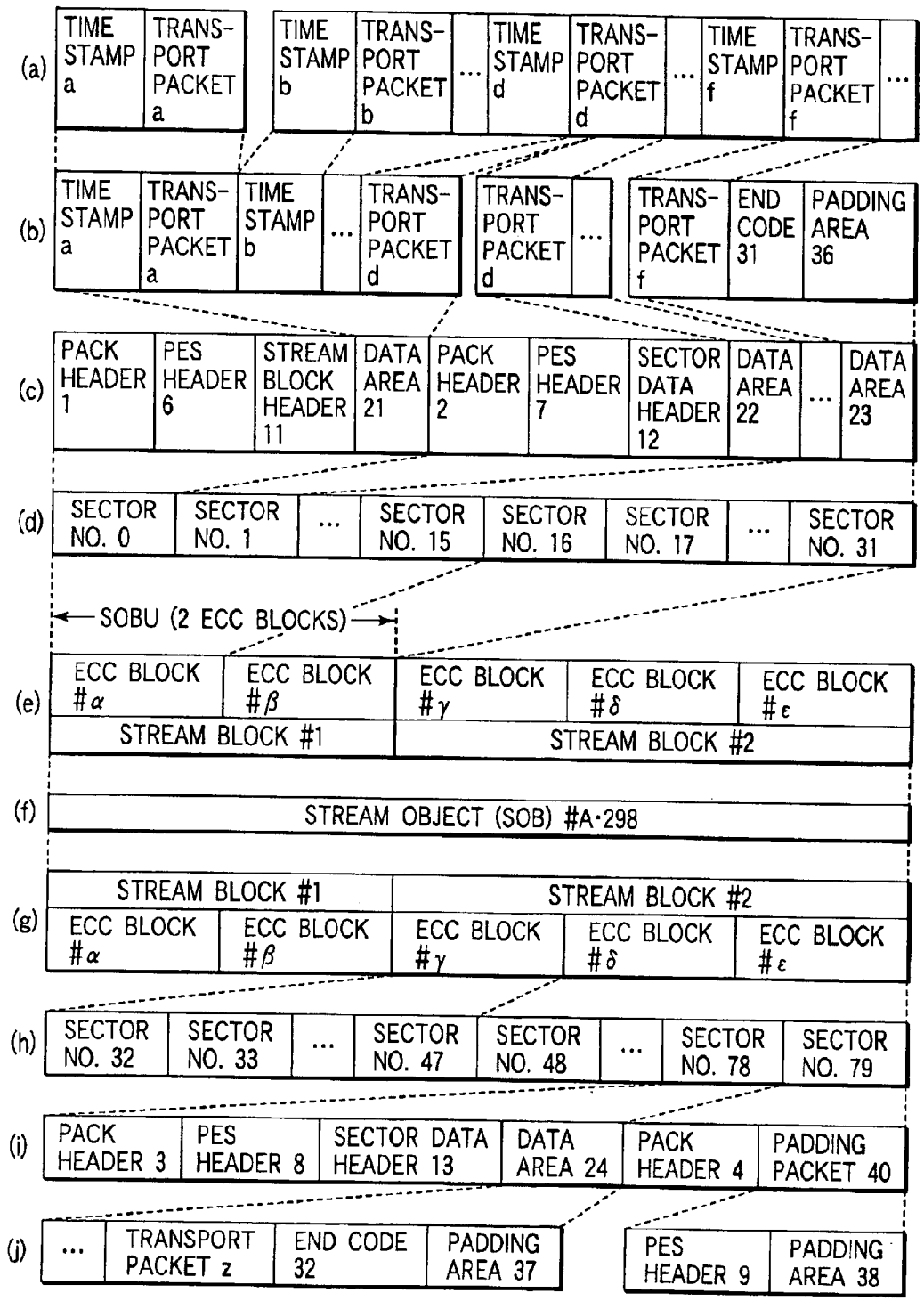
F I G. 1

| INFORMATION OF ORIGINAL CELL #1 (SCI) (BEFORE PARTIAL OR TEMPORARY ERASE) 763 | .................. | .................. |
|---|---|---|
| | CORRESPONDING VOB (SOB) 766 | VOB (SOB) #1 |
| | CORRESPONDING CELL START TIME (SC_S_APAT OR ERA_S_APAT) 753 | = 0TH FIELD (TIME INFORMATION) |
| | CORRESPONDING CELL END TIME (SC_E_APAT OR ERA_E_APAT) 758 | = 2(z-1)-TH FIELD (TIME INFORMATION) |

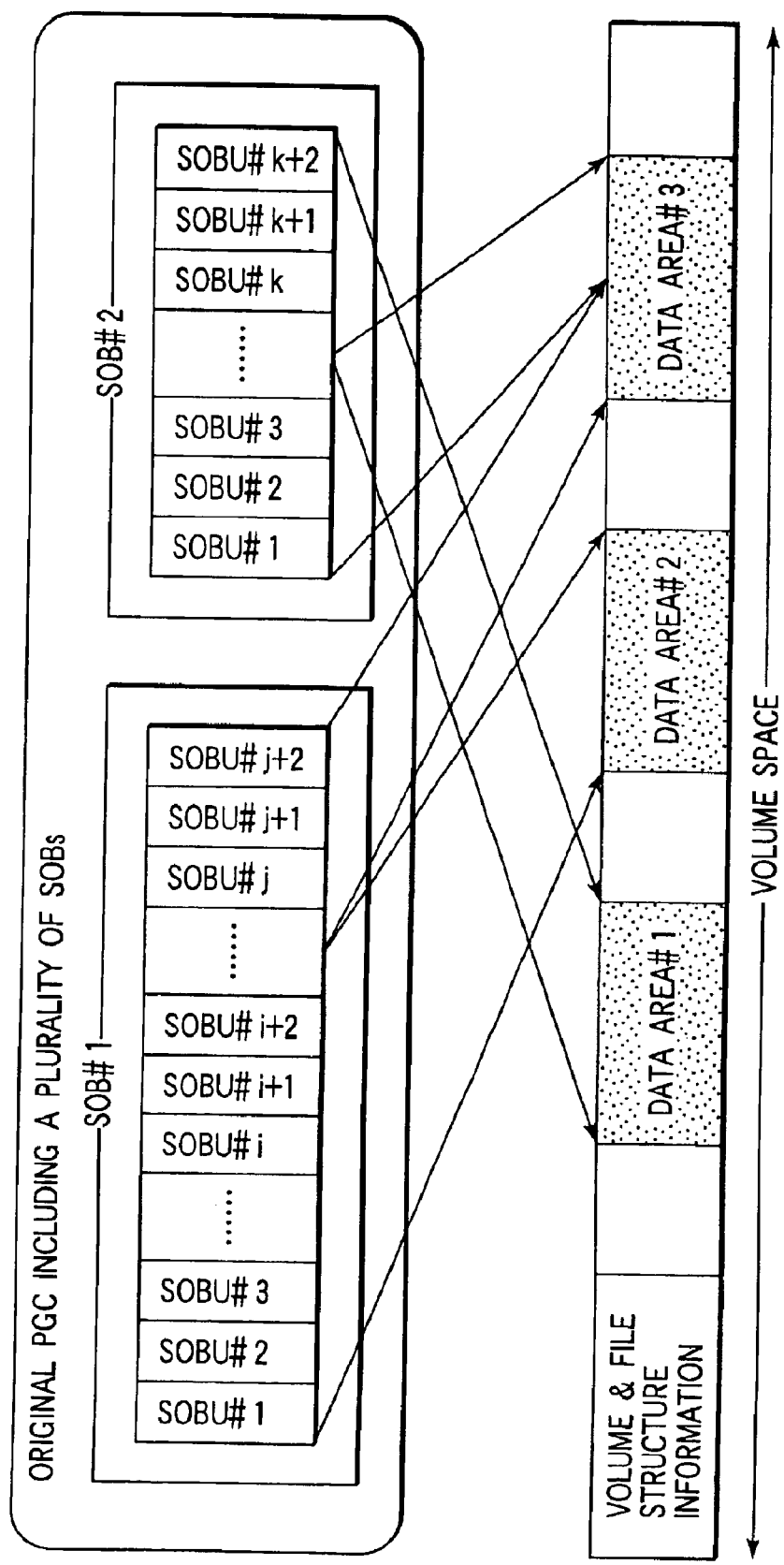
F I G. 33

US 6,978,083 B2

STREAM DATA GENERATION METHOD AND PARTIAL ERASE PROCESSING METHOD

CROSS REFERENCE TO RELATED APPLICATIONS

This application is a continuation of application Ser. No. 09/660,556, filed Sep. 12, 2000, abandoned, which is a continuation of Application No. PCT/JP00/00653, filed Feb. 7, 2000.

This application is based upon and claims the benefit of priority from the prior Japanese Patent Application No. 11-028697, filed Feb. 5, 1999, the entire contents of which are incorporated herein by reference.

BACKGROUND OF THE INVENTION

The present invention relates to a method of generating (or encoding) bitstream information of digital broadcast, etc., a method of generating (or encoding) stream data sent with a packet structure, a method of recording the encoded stream data on an information medium, a method of decoding the encoded stream data, or a method of partially erasing (including temporarily erasing/actually erasing) the recorded stream data.

In recent years, TV broadcast has come into the era of digital broadcast. Accordingly, an apparatus for saving digital data of digital TV broadcast as it is irrespective of their contents, i.e., a so-called streamer, has been demanded.

The current digital TV broadcast uses an MPEG transport stream. An MPEG transport stream will be used as a standard one in the field of digital broadcast using moving picture.

As a streamer for recording digital broadcast data, a home digital VCR such as D-VHS (digital VHS) or the like is currently commercially available. A streamer using D-VHS directly records a broadcasted bitstream on a tape. For this reason, a plurality of programs are multiplexed and recorded on a video tape.

Upon playback, all data are output from the VCR to a set-top box (digital TV receiver unit; to be abbreviated as an STB hereinafter) either when they are played back from the beginning or the middle of the tape. In this STB, a desired program is selected from the output data by user operation or the like. The selected program information is transferred from the STB to a digital TV receiver, and is played back (playback of video plus audio, etc).

Since the D-VHS streamer uses a tape as a recording medium, it cannot attain quick random access, and it is difficult to quickly jump to a desired position of a required program so as to play it back.

As a promising candidate that can combat such shortcoming (difficulty of random access) of the tape, a streamer that uses a large-capacity disc medium such as a DVD-RAM or the like has been proposed. In this case, management data must be inevitably recorded together with broadcast data in consideration of random access, special playback, and the like.

In general, when a DVD-RAM disc is used as an information storage medium, ECC blocks are formed in units of 16 sectors, and data in each ECC block are interleaved (re-arranged) and appended with an error correction code. For this reason, in order to erase, rewrite or additionally write only a specific sector in an ECC block, the following complicated process are required.

Namely, a process so-called "read-modify-write" is required. In this process, after all contents of data in an ECC block are read (READ) and are re-arranged in a buffer memory (deinterleaved), part of data for a specific sector(s) is erased or rewritten, and new data is additionally written (MODIFY). Then, the modified data is interleaved (re-arranged) again while appending a new error correction code, and the resultant data is recorded This is a very time-consuming process, and recording or partial erase of stream data cannot be done in real time.

The present invention has been made to solve the aforementioned problem, and has as its object to provide a method that can easily record (or encode) and partially erase (temporarily erase/actually erase) stream data within a short period of time.

BRIEF SUMMARY OF THE INVENTION

In order to achieve the above object, according to the present invention, stream data uses a recording data structure made up of stream blocks (or stream object units SOBU) which can be segmented at a predetermined data size, and data are recorded (or encoded) and partially erased in units of the stream blocks (SOBUs).

More specifically, in case of partial erase (actual erase), a method of the invention handles bitstream information (DVD bitstream) formed by a stream object (SOB) which includes a first data unit (transport packet/application packet; e.g., 188 bytes), a second data unit (sector/stream pack; e.g., 2,048 bytes or 2 kbytes) having one or more first data units (packets), and a third data unit (stream block/SOBU; e.g., 64 kbytes=32 sectors=2 ECC blocks) having one or more second data units (sectors/packs).

In this method, a portion (erase area 741/742 in FIG. 15, FIG. 16, FIG. 22, or FIG. 24) of bitstream information included in the stream object (SOB) is erased in units of third data units (stream blocks/SOBUs) (step S22 in FIG. 17).

Or, in case of partial erase (actual erase), a method of the invention handles bitstream information (DVD bitstream) formed by a stream object (SOB) which includes a first data unit (transport packet/application packet), a second data unit (sector/stream pack) having one or more first data units (packets), and a third data unit (stream block/SOBU) having one or more second data units (sectors/stream packs), and streamer information (STREAM.IFO 105 in FIGS. 2 and 3; STRI in FIG. 27) that manages the stream information (DVD bitstream). In this method, the bitstream information (DVD bitstream) includes information (ORG_PGCI/UD_PGCIT in FIG. 3(f) or FIG. 27) of a program formed of one or more cells, and information of a program chain (PGC) indicating a sequence (playback order) of the program or a portion thereof, the information (ORG_PGCI/UD_PGCIT in FIG. 27; PGCI#i in FIG. 28) of the program chain is included in the streamer information (STREAM.IFO/STRI), the information (PGCI#I/SCI/SC_GI in FIG. 28) of the program chain includes start time information (751 in FIGS. 15 and 22; SC_S_APAT in FIGS. 21 and 28) of the first data unit (application packet) including contents of the cell, and end time information (757 in FIGS. 15 and 22; SC_E_APAT in FIGS. 21 and 28) of the first data unit (application packet) including the contents of the cell, and an erase range of a portion (erase area 741/742 in FIG. 22 or FIG. 24) of bitstream information included in the stream object (SOB) is designated by the start time information (SC_S_APAT) and the end time information (SC_E_APAT) (step S21 in FIG. 17).

On the other hand, in case of partial temporary erase, a method of the invention handles bitstream information (DVD bitstream) formed by a stream object (SOB) which includes a first data unit (transport packet/application packet), a second data unit (sector/stream pack) having one or more first data units (packets), and a third data unit (stream block/SOBU) having one or more second data units (sectors/stream packs).

In this method, a portion (temporary erase area 747 in FIG. 23 or FIG. 25) of bitstream information included in the stream object (SOB) is set in a temporary erase state in units of third data units (stream blocks/SOBUs) (change "partial erase" or "erase" to read "temporary erase" in respective steps in FIG. 17).

More specifically, in case of partial temporary erase, a method of the invention handles bitstream information (DVD bitstream) formed by a stream object (SOB) which includes a first data unit (transport packet/application packet), a second data unit (sector/stream pack) having one or more first data units (packets), and a third data unit (stream block/SOBU) having one or more second data units (sectors/stream packs), and streamer information (STREAM.IFO 105 in FIGS. 2 and 3; STRI in FIG. 27) that manages the stream information (DVD bitstream). In this method, the bitstream information (DVD bitstream) includes information (ORG_PGCI/UD_PGCIT in FIG. 3(*f*) or FIG. 27) of a program formed of one or more cells, and information of a program chain (PGC) indicating a sequence (playback order) of the program or a portion thereof, the information (ORG_PGCI/UD_PGCIT in FIG. 27; PGCI#i in FIG. 28) of the program chain is included in the streamer information (STREAM.IFO/STRI), the information (PGCI#i/SCI/SC_GI in FIG. 28) of the program chain includes temporary erase start time information (ERA_S_APAT in FIGS. 21, 23, and 28) of the first data unit (application packet) including contents of the cell, and temporary erase end time information (ERA_S_APAT in FIGS. 21, 23, and 28) of the first data unit (application packet) including the contents of the cell, and a temporary erase range for a portion (temporary erase area 747 in FIG. 23 or FIG. 25) of bitstream information included in the bitstream object (SOB) is designated by the temporary erase start time information (ERA_S_APAT) and the temporary erase end time information (ERA_E_APAT) (change "partial erase range" to read "temporary erase range" in step S21 in FIG. 17).

In temporary erase, management information (streamer information STREAM.IFO/STRI) is rewritten by the following method.

That is, the information (PGCI#i/SCI/SC_GI) of the program chain includes start time information (SC_S_APAT) of the first data unit (application packet) including the contents of the cell, temporary erase start time information (ERA_S_APAT) of the first data unit (application packet) including the contents of the cell, and temporary erase end time information (ERA_E_APAT) of the first data unit (application packet) including the contents of the cell, a temporary erase range for a portion (temporary erase area 747 in FIG. 23 or FIG. 25) of bitstream information included in the bitstream object (SOB) is designated by the temporary erase start time information (ERA_S_APAT) and the temporary erase end time information (ERA_E_APAT) (change "partial erase range" to read "temporary erase range" in step S21 in FIG. 17), and when the start time information (SC_S_APAT) matches a head of the first data unit (application packet) that starts within the third data unit (stream block/SOBU), the streamer information (STREAM.IFO/STRI) is rewritten (step S27 in FIG. 17) by adjusting the temporary erase start time information (ERA_S_APAT) to the start time information (SC_S_APAT) of the first one of the first data units (application packets) which start within the third data unit (stream block/SOBU) that includes the first data unit (application packet) with the start time information (SC_S_APAT) (change "partial erase" to read "temporary erase" in step S26 in FIG. 17).

In case of encoding that generates bitstream information, an encoding method of the invention handles bitstream information (DVD bitstream) formed by a stream object (SOB) which includes a first data unit (transport packet/application packet), a second data unit (sector/stream pack) having one or more first data units (packets), and a third data unit (stream block/SOBU) having one or more second data units (sectors/stream packs). In this method, a time stamp (ATS) is appended to each of one or more packet data formed of the first data units (step S01 in FIG. 13);

a sequence or arrangement of one or more packet data with time stamps is segmented in units of third data units (stream blocks/SOBUs) (step S02); and a header (stream block header or application header in FIG. 11) including information (the number 631 of packets and the like in FIG. 11(*d*)) that pertains to the packet data is inserted in the first one of the second data units (sector/pack) within the third data unit (stream block/SOBU) (step S08).

In the recording method of the present invention, the bitstream information generated by the above encoding method is recorded on a predetermined medium (optical disc, etc.).

Alternatively, in case of encoding that generates bitstream information, an encoding method of the invention handles bitstream information (DVD bitstream) formed by a stream object (SOB) which includes a first data unit (transport packet/application packet), a second data unit (sector/stream pack) having one or more first data units (packets), and a third data unit (stream block/SOBU) having one or more second data units (sectors/stream packs). In this method, a time stamp (ATS) is appended to each of one or more packet data formed of the first data units (step S01 in FIG. 13);

a sequence or arrangement of one or more packet data with time stamps is segmented in units of third data units (stream blocks/SOBUs) (step S02); and an end code (731 in FIG. 16(*k*)) and a padding area (732 in FIG. 16(*k*); stuffing packet in FIG. 26(*i*)) are added as needed to a data end side in the third data unit (stream block/SOBU) (step S03).

Furthermore, contents of the data sequence segmented in units of third data units (stream blocks/SOBUs) are split at the second data units (sectors/packs) (step S04);

the first data unit (subsequent stuffing packet in FIG. 26(*i*)) stuffed or filled with information (zero byte in FIG. 26(*i*)) essentially having no contents is defined as the padding area (step S07), when the padding area (732 in FIG. 16(*k*)) is present at the end in the third data unit (stream block/SOBU) and has a size larger than a size of the second data unit (sector/pack) (YES in step S06); and a header (stream block header or application header in FIG. 11) including information (the number 631 of packets, etc. in FIG. 11(d)) that pertains to the packet data is allowed to be inserted in the first second data unit (sector/pack) in the third data unit (stream block/SOBU) (step S08).

In the recording method of the present invention, the bitstream information generated by the above encoding method is recorded on a predetermined medium (optical disc, etc.).

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a view for explaining the data structure of stream data according to an embodiment of the present invention;

FIG. 10 is a views for explaining the internal structure of a PES header shown in FIGS. 1, 8, 9, and the like;

FIG. 33 is a view for exemplifying the contents of SOBUs that form each stream object (SOB) recorded on data area 207 in FIG. 3 (data areas 21 to 23 in FIG. 1).

DETAILED DESCRIPTION OF THE INVENTION

Figure 2:
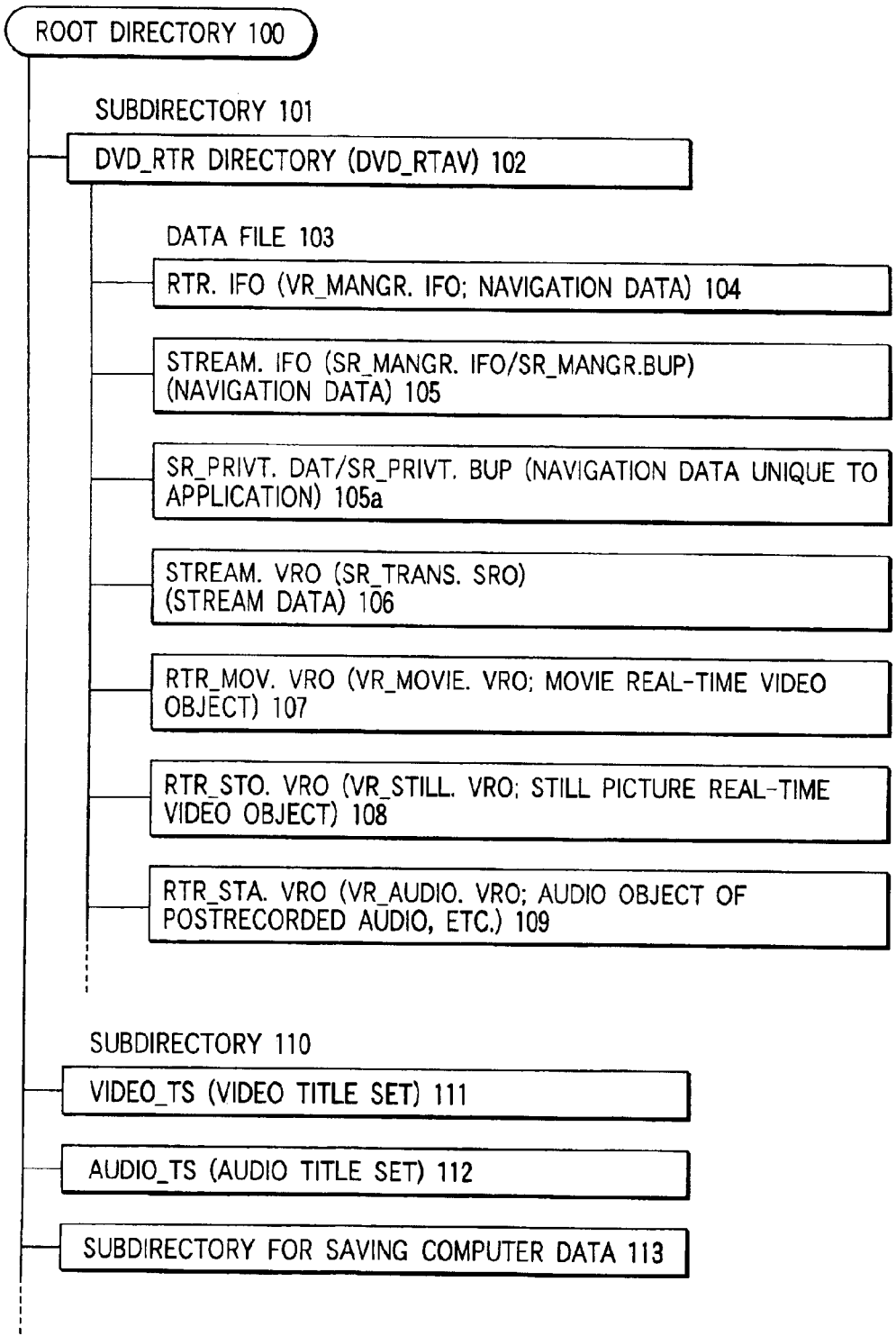
FIG. 2 is a view for explaining the directory structure of data files according to an embodiment of the present invention.

A stream data generation method, its recording method, a partial erase processing method of recorded stream data, and so on according to embodiments of the present invention will be described hereinafter with reference to the accompanying drawings.

FIG. 1 is a view for explaining the data structure of stream data according to an embodiment of the present invention.

Stream data recorded on an information storage medium such as a DVD-RAM disc or the like are combined as stream objects (to be abbreviated as SOBs hereinafter as needed) in units of contents of video information in stream data. Each SOB is formed of stream data obtained by single real-time, continuous recording.

FIG. 1(f) shows one SOB#A·298 of one or more stream objects. When this stream data is recorded on a DVD-RAM disc, each data is recorded using 2,048-kbyte sectors as minimum units. Furthermore, 16 sectors form one ECC block, and in one ECC block, data are interleaved (the order of data is re-arranged) and a correction code for error correction is appended.

In this embodiment, a stream block is formed by one or a plurality of ECC blocks as a unit, and stream information is recorded or partially erased in units of stream blocks. This is a characteristic feature of the present invention.

In this embodiment, the number of ECC blocks that form a stream block can be determined in accordance with the transfer rate of stream data to be transferred. For example, in an example shown in FIG. 1(e), stream block #1 is formed by two ECC blocks #α and #β, and stream block #2 is formed by three ECC blocks #γ, #δ, and #ε. A DVD streamer forms one stream block (stream object unit SOBU) using two ECC blocks (32 sectors).

Each ECC block is made up of 16 sectors, as shown in FIG. 1(d). Therefore, as can be seen from FIGS. 1(d) and (e), stream block (or SOBU) #1 made up of two ECC blocks corresponds to 32 sectors (sectors No. 0 to No. 31).

More specifically, if one sector=2 kbytes, a stream block (SOBU) has a fixed size of 64 kbytes (32 sectors) upon practicing the present invention.

The contents of each sector correspond to a stream pack (details will be explained later with reference to FIG. 9 and the like). For example, a stream pack corresponding to sector No. 0 (FIG. 1(d)) includes pack header 1, PES header 6, stream block header (to be described later with reference to FIG. 11), and data area 21, as shown in FIG. 1(c). On the other hand, a stream pack corresponding to sector No. 1 (FIG. 1(d)) includes pack header 2, PES header 7, sector data header 12 (to be described later with reference to FIG. 12), and data area 22, as shown in FIG. 1(c).

An example of the internal arrangement of PES headers 6 and 7 shown in FIG. 1(c) will be described later with reference to FIG. 10.

Data area 21 in FIG. 1(c) includes a sequence of pairs of time stamps and transport packets (time stamp a, transport packet a, time stamp b, . . . , transport packet d), as shown in FIG. 1(b). Likewise, data area 22 includes another sequence of pairs of time stamps and transport packets. On the other hand, trailing-side data area 23 includes transport packet f, end code 31, and padding area 36, as shown in FIG. 1(b).

A plurality of pairs of time stamps and transport packets shown in FIG. 1(b) form a bitstream having a sequence shown in FIG. 1(a).

Stream block #1 (FIG. 1(e)) preceding SOB#A·298 (FIG. 1(f)) has a data structure shown in FIGS. 1(d), (c), and (b), but the data structure of stream block #2 (FIG. 1(g)) succeeding SOB#A·298 is as follows.

That is, trailing-side sector No. 78 (FIG. 1(h)) of end ECC block #ε of stream block #2 includes pack header 3, PES header 8, sector data header 13, and data area 24, as shown in FIG. 1(i). Also, last sector No. 79 (FIG. 1(h)) of ECC block #ε includes pack header 4 and padding packet 40, as shown in FIG. 1(i).

Data area 24 of sector No. 78 includes transport packet z, end code 32, and padding area 37, as shown in FIG. 1(j). Padding packet 40 of last sector No. 79 includes PES header 9 and padding area 38, as shown in FIG. 1(j).

Note that the contents of padding area 38 will be described later with reference to FIG. 26.

FIG. 2 is a view for explaining the directory structure of data files according to an embodiment of the present invention.

Each information recorded on an information storage medium such as a DVD-RAM disc or the like has a hierarchical file structure. Video information and stream data information to be explained in this embodiment are stored in subdirectory 101 named DVD_RTR directory (or DVD_RTAV) 102.

DVD_RTR (DVD_RTAV) directory 102 stores data file 103 having the following contents.

More specifically, as a group of management information (navigation data), RTR.IFO (VR_MANGR.IFO) 104, STREAM.IFO (SR_MANGR.IFO/SR_MANGR.BUP) 105, and SR_PRIVT.DAT/SR_PRIVT.BUP 105a are stored.

As a data main body (contents information), STREAM.VRO (SR_TRANS.SRO) 106, RTR_MOV.VRO (VR_MOVIE.VRO) 107, RTR_STO.VRO (or VR_STILL.VRO) 108, and RTR_STA.VRO (or VR_AUDIO.VRO) 109 are stored.

Root directory 100 as an upper layer of subdirectory 101 including data file 103 can be provided with subdirectory 110 for storing other kinds of information.

This subdirectory includes, as its contents, video title set VIDEO_TS 111 that stores video programs, audio title set AUDIO_TS 112, subdirectory 113 for saving computer data and the like.

Data which is transmitted on a wired or wireless data communication path in the form of a packet structure and is recorded on an information storage medium while holding the packet structure is called "stream data".

The stream data themselves are recorded together with file name STREAM.VRO (or SR_TRANS.SRO) 106. A file that records management information of the stream data is STREAM.IFO (SR_MANGR.IFO and its backup file SR_MANGR.BUP) 105.

A file that records analog video information which is used in a VCR (VTR) or conventional TV and is digitally compressed based on MPEG2 is RTR_MOV.VRO (or VR_MOVIE.VRO) 107, a file that collects still picture information including postrecorded audio, background audio, or the like is RTR_STO.VRO (or VR_STILL.VRO) 108, and its postrecorded audio information file is RTR_STA.VRO (or VR_AUDIO.VRO) 109.

Figure 3:
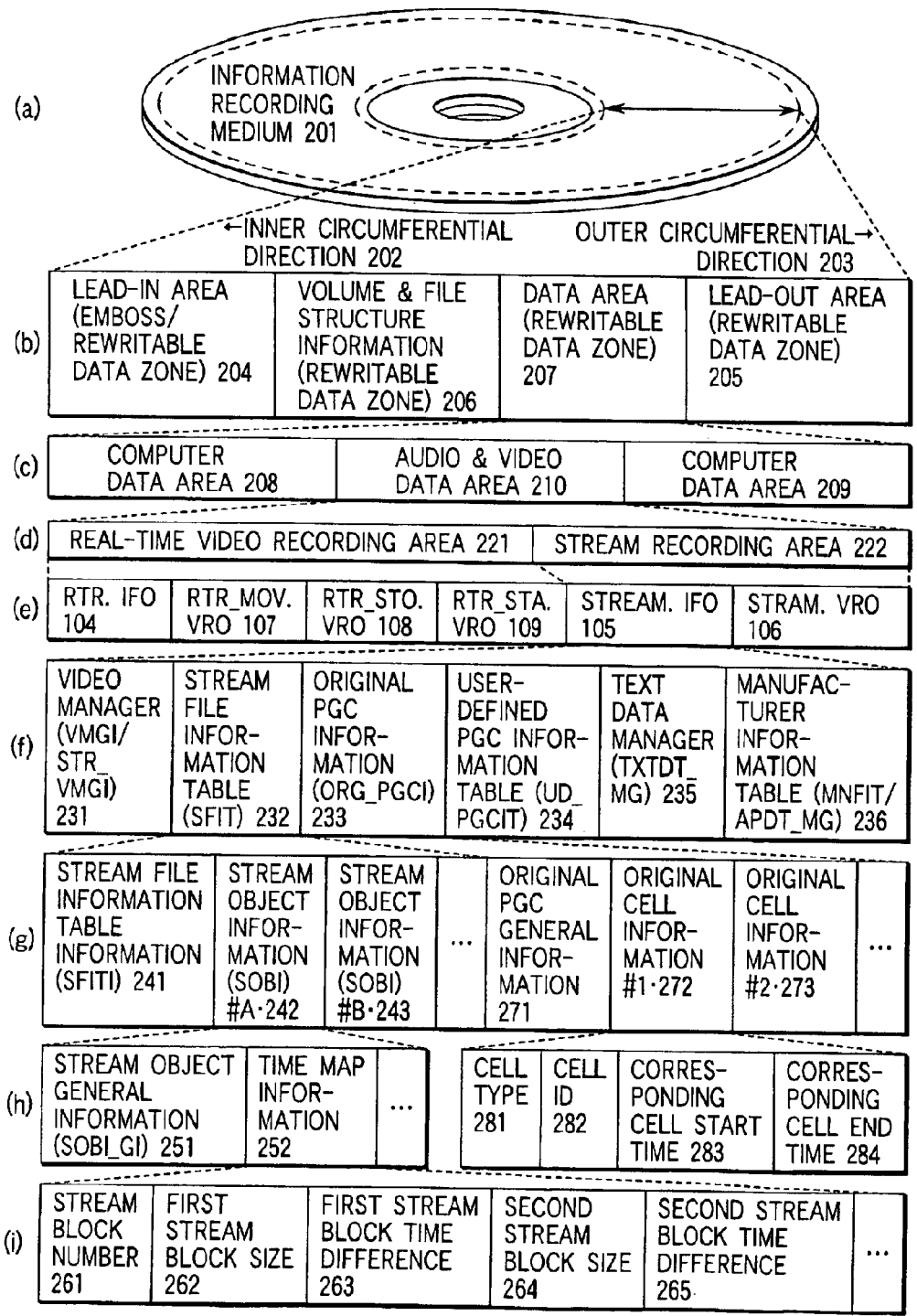
FIG. 3 is a view for explaining the recorded data structure on an information medium (recordable/reproducible DVD disc) according to an embodiment of the present invention.

FIG. 3 is a view for explaining the recorded data structure on an information medium according to an embodiment of the present invention, e.g., recordable/reproducible optical disc 201 such as a DVD-RAM disc or the like.

In an area sandwiched between the ends of inner circumferential direction 202 and outer circumferential direction 203 of information storage medium 201 shown in FIG. 3(a), lead-in area 204, volume & file structure information 206 that records file system information, data area 207, and lead-out area 205 are present, as shown in FIG. 3(b). Lead-in area 204 is made up of an emboss zone and rewritable data zone, and lead-out area 205 is made up of a rewritable data zone. Data area 207 is also made up of a rewritable data zone.

Data area 207 can record computer data and audio & video data together, as shown in FIG. 3(c). In this example, audio & video data area 210 is sandwiched between computer data areas 208 and 209.

Audio & video data area 210 can record real-time video recording area 221 and stream recording area 222 together, as shown in FIG. 3(d). (Either of real-time video recording area 221 or stream recording area 222 can be used.)

As shown in FIG. 3(e), real-time video recording area 221 records RTR navigation data RTR.IFO (VR_MANGR.IFO) 104, movie real-time video object RTR_MOV.VRO (VR_MOVIE.VRO) 107, still picture real-time video object RTR_STO.VRO (VR_STILL.VRO) 108, and audio object RTR_STA.VRO (VR_AUDIO.VRO) 109 such as postrecorded audio or the like, which are shown in FIG. 2.

Also, as shown in FIG. 3(e), stream recording area 222 records streamer navigation data STREAM.IFO (SR_MANGR.IFO/SR_MANGR.BUP) 105 and transport bitstream data STREAM.VRO (SR_TRANS.SRO) 106, which are shown in FIG. 2.

Note that stream recording area 222 can also record navigation data SR_PRIVT.DAT/SR_PRIVT.BUP 105a unique to an application shown in FIG. 2, although not shown in FIGS. 3(d) and (e).

This SR_PRIVT.DAT 105a is navigation data unique to an individual application connected (supplied) to the streamer, and need not be recognized by the streamer.

STREAM.IFO (or SR_MANGR.IFO) 105 as management information that pertains to stream data has a data structure shown in FIGS. 3(f) to (i).

More specifically, as shown in FIG. 3(f), STREAM.IFO (or SR_MANGR.IFO) 105 is comprised of video manager (VMGI or STR_VMGI) 231, stream file information table (SFIT) 232, original PGC information (ORG_PGCI) 233, user-defined PGC information table (UD_PGCIT) 234, text data manager (TXTDT_MG) 235, and manufacturer information table (MNFIT) or application private data manager (APDT_MG) 236 that manages navigation data SR_PRIVT.DAT 105a unique to an application.

Stream file information table (SFIT) 232 shown in FIG. 3(f) can contain stream file information table information (SFITI) 241, one or more pieces of stream object information (SOBI) #A·242, #B·243, ..., original PGC information general information 271, and one or more pieces of original cell information #1·272, #2·273, ..., as shown in FIG. 3(g).

Each stream object information (e.g., SOBI#A·242) shown in FIG. 3(f) can contain stream object general information (SOBI_GI) 251, time map information 252, and the like, as shown in FIG. 3(h).

Each original cell information (e.g., #1·272; corresponding to SCI shown in FIG. 28 to be described later) shown in FIG. 3(f) can contain cell type 281 (corresponding to C_TY shown in FIG. 28 to be described later), cell ID 282, corresponding cell start time (corresponding to SC_S_APAT shown in FIGS. 15(l), 28, and the like to be described later) 283, and corresponding cell end time (corresponding to SC_E_APAT shown in FIGS. 15(l), 28, and the like to be described later) 284, as shown in FIG. 3(h).

Note that the information contents in FIG. 3(f) will be explained later with reference to FIG. 27.

Time map information 252 in FIG. 3(h), which is contained in SOBI#A in FIG. 3(g) can include stream block number 261, first stream block size 262, first stream block time difference 263, second stream block size 264, second stream block time difference 265, ..., as shown in FIG. 3(i). The contents of each stream block time difference that forms time map information 252 will be explained later with reference to FIG. 5.

Figure 4:
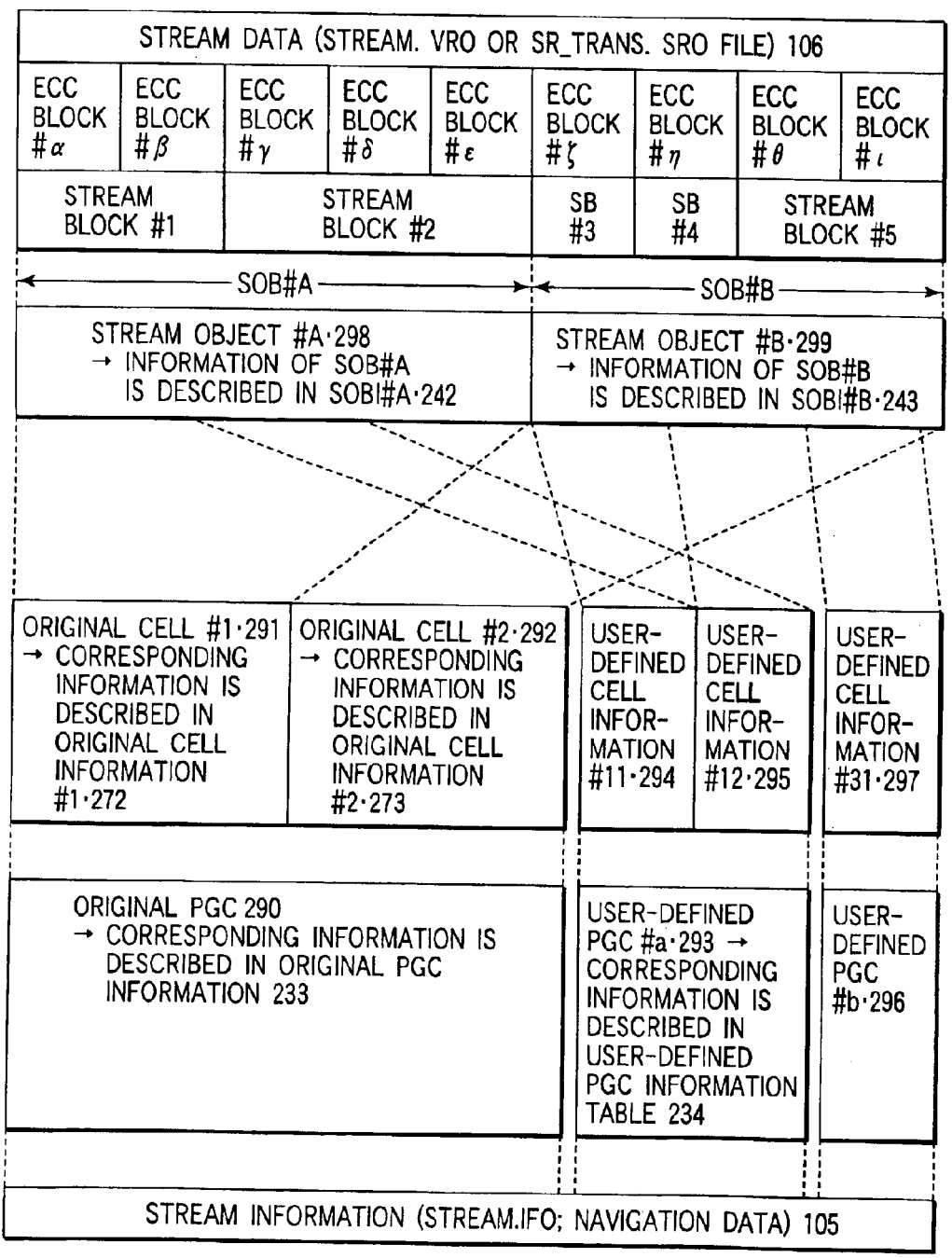
FIG. 4 is a view for explaining the relationship among stream objects (SOB), cells, program chains (PGC), and the like in the present invention.

FIG. 4 is a view for explaining the relationship among stream objects (SOB), cells, program chains (PGC), and the like in the present invention. The relationship between SOB and PGC in the present invention will be explained below using an example shown in FIG. 4.

Stream data recorded in stream data (STREAM.VRO or SR_TRANS.SRO) 106 form stream blocks as sets of one or more ECC blocks, and recording and partial erase processes are done in units of stream blocks. The stream data form groups called stream objects in units of contents of information to be recorded (e.g., in units of programs in digital broadcast).

Management information (original PGC information 233, user-defined PGC information table 234, or the like) for each stream object (SOB#A, SOB#B) recorded in this STREAM.VRO (SR_TRANS.SRO) 106 is recorded in navigation data STREAM.IFO (SR_MANGR.IFO) 105 (see lowermost portion in FIG. 4 and FIGS. 3(e) and (f)).

Two pieces of management information (STREAM.IFO 105) for stream objects #A·298 and #B·299 in FIG. 4 are recorded as two pieces of stream object information (SOBI) #A·242 and #B·243 in stream file information table (SFIT) 232, as shown in FIGS. 3(f) and (g).

Each of stream object information (SOBI) #A·242 and #B243 contains time map information 252 that mainly describes the data size, time information, and the like in units of stream blocks.

Upon playing back stream data, information (corresponding to PGCI#i in FIG. 28 to be described later) of a program chain (PGC) made up of one or more successive cells is used. Stream data can be played back in accordance with the order in which the cells that form this PGC are set.

There are two types of PGCs, i.e., original PGC 290 (ORG_PGCI·233 in FIG. 3(f)) which can continuously play back all stream data recorded in STREAM.VRO (SR_TRANS.SRO) 106, and user-defined PGCs #a·293 and #b·296 (corresponding to the contents of UD_PGCIT·234 in FIG. 3(f)) that can arbitrary set locations and order of user choice.

Originals cells #1·291 and #2·292 that form original PGC 290 basically have one-to-one correspondence with stream objects #A·298 and #B·299.

By contrast, user-defined cells #11·294, #12·295, and #31·297 that form the user-defined PGC can set arbitrary locations within the range of one stream object #A·298 or #B·299.

Note that the sector size of each stream block can be variously set. As a preferred embodiment, a stream object unit (SOBU) made up of two ECC blocks (32 sectors) and having a constant size (64 kbytes) can be used as a stream block like stream block #1 in FIG. 4.

When the stream block is fixed to be an SOBU having a constant size (e.g., 2 ECC blocks=32 sectors=64 kbytes), the following merits are obtained.

(01) Even when stream data is erased or rewritten in units of SOBUs, an ECC block of that SOBU does not influence ECC blocks of SOBUs other than the SOBU to be erased or rewritten. For this reason, ECC deinterleave/interleave upon erase or rewrite (for SOBUs other than the SOBU to be erased or rewritten) need not be done; and

(02) An access position to recorded information in an arbitrary SOBU can be specified by the number of sectors (or a parameter corresponding to the number of sectors; e.g., information of stream packs or application packets therein shown in FIG. 9 to be described later). For example, when the middle position of given SOBU#k is to be accessed, the 16th sector position (or application packet position corresponding to the 16th sector position) from the boundary between SOBU#k−1 and SOBU#k can be designated.

Figure 5:
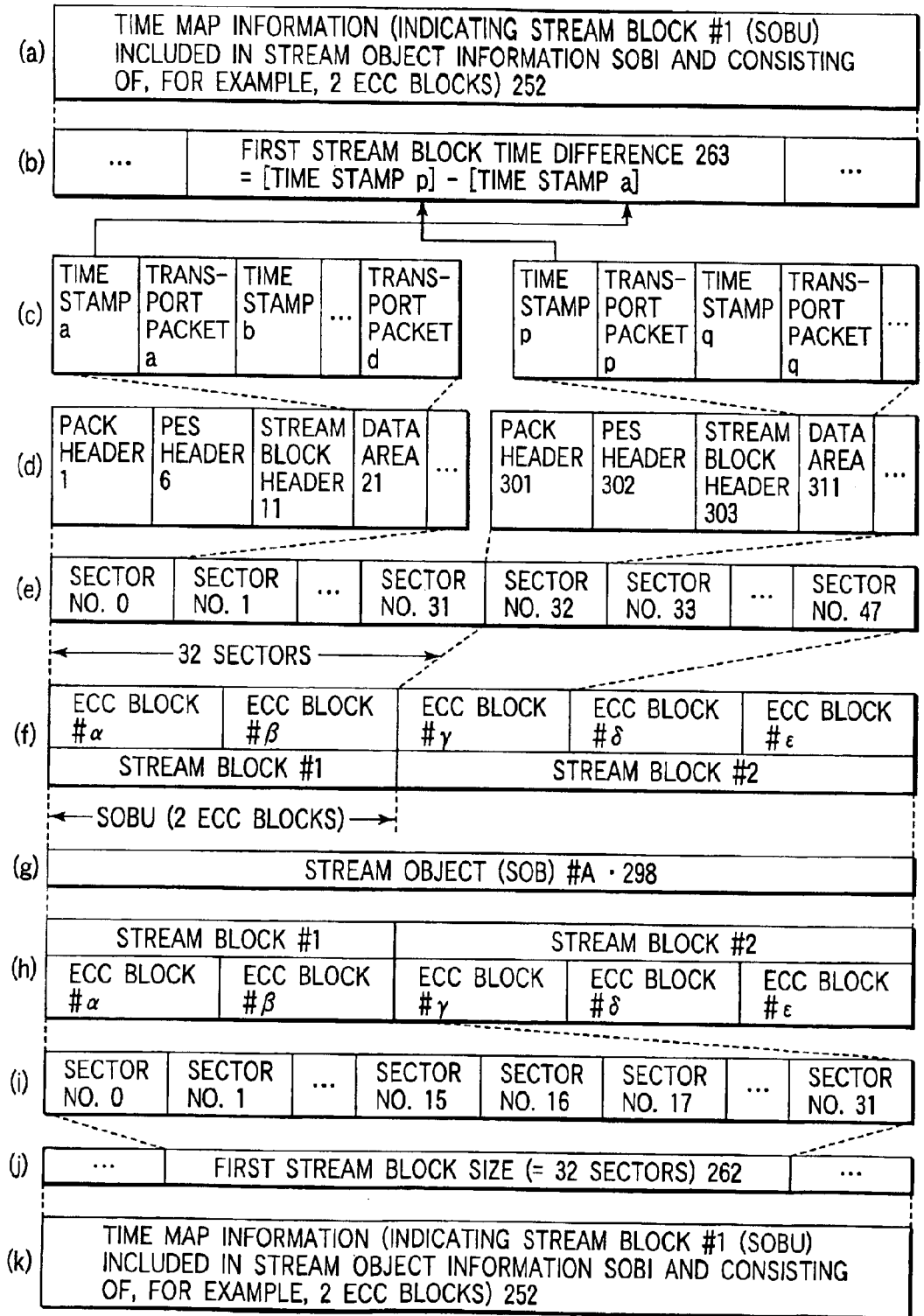
FIG. 5 is a view for explaining the contents of a stream block size and stream block time difference in time map information.

FIG. 5 is a view for explaining the contents of the stream block size and stream block time difference in the time map information. The contents of individual data in time map information 252 will be explained below using FIG. 5.

As exemplified in FIGS. 5(f), (g), and (h), stream object (SOB) #A·298 is made up of stream blocks #1 and #2.

In the example shown in FIGS. 5(f) and (h), the data size of stream block #1 that forms SOB#A·298 is defined by two ECC blocks (#α and #β), i.e., 32 sectors (FIGS. 5(e) and (i)). That is, first stream block size 262 (FIG. 5(j)) in time map information 252 (FIGS. 5(a) and (k)) is 32 sectors (64 kbytes).

Stream block #1 (FIG. 5(f)) located at the head position of SOB#A·298 (FIG. 5(g)) has sector No. 0 (FIG. 5(e)) at its head position, and time stamp a is recorded at the head position of data area 21 (FIG. 5(d)) included in sector No. 0.

Subsequent stream block #2 (FIG. 5(f)) of SOB#A·298 (FIG. 5(g)) has sector No. 32 (FIG. 5(e)), and time stamp p is recorded at the head position of data area 311 (FIG. 5(d)) included in sector No. 32.

As shown in FIG. 5(c), the time stamp value of the first stream data in stream block #1 is time stamp a, and that of the first stream data of next stream block #2 is time stamp p.

The value of first stream block time difference 262 in FIG. 5(b) (corresponding to stream block time difference 263 in FIG. 3(i)) is given by the difference ([time stamp p]−[time stamp a]) between time stamps a and p.

Note that time map information 252 in FIG. 5(a) can be handled as information including access data unit AUD in stream object information SOBI to be described later with reference to FIG. 29. Information (access unit start map AUSM and the like) included in this AUD can specify an SOBU that includes information to be accessed.

Figure 6:
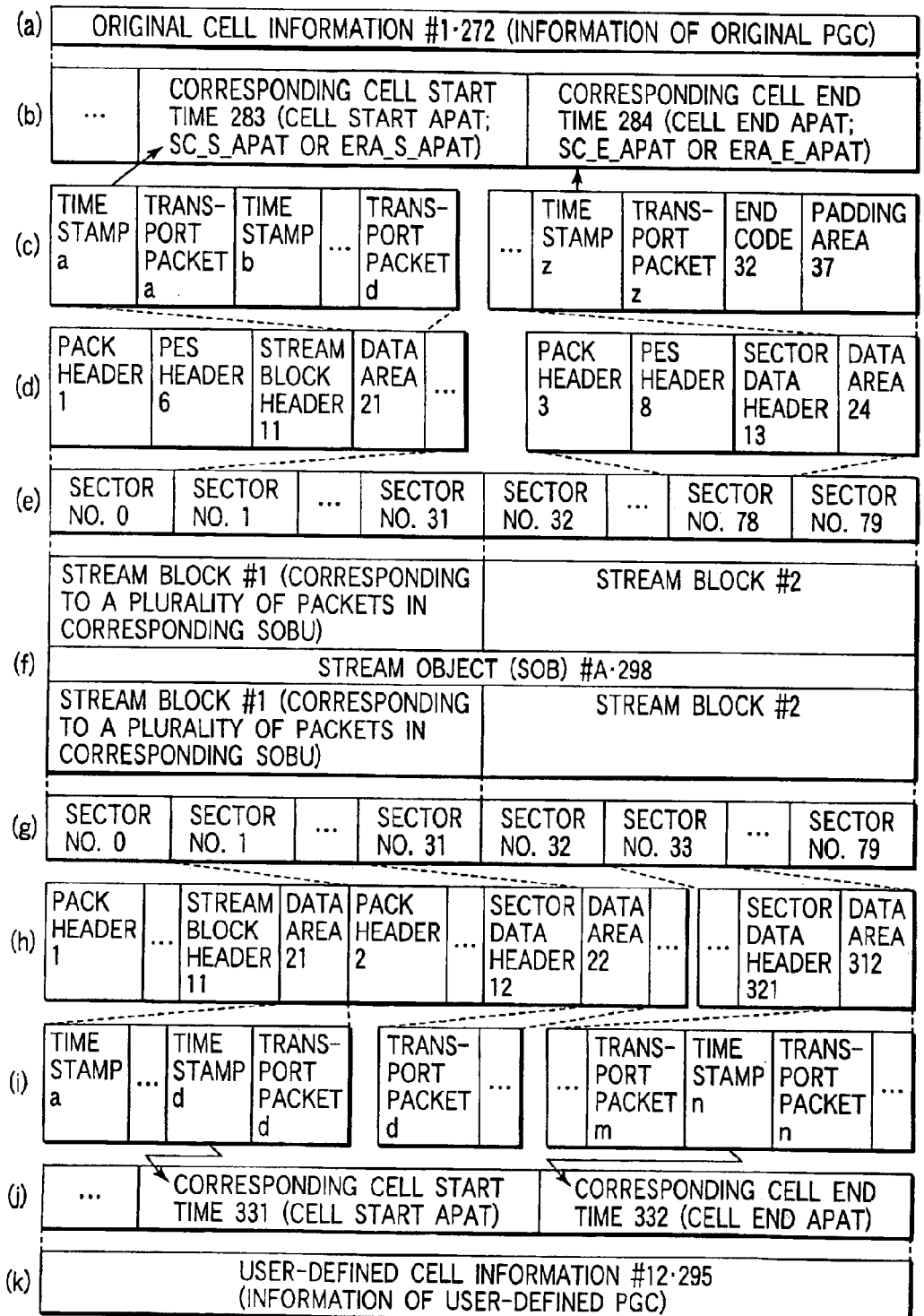
FIG. 6 is a view for explaining the cell range designation method in an original cell and user-defined cell.

FIG. 6 is a view for explaining the cell range designation method in an original cell and user-defined cell.

The cell range can be designated by designating the start and end times.

More specifically, the values of first time stamp a and last time stamp z (FIG. 6(c)) in corresponding stream object #A·298 (FIG. 6(f)) are used as the values of corresponding cell start and end times 283 and 284 (FIG. 6(b)) in an original cell before execution of partial erase (immediately after recording of stream data) to be described later with reference to FIG. 15 and subsequent figures.

By contrast, the time range in user-defined cell #12·295 (FIG. 6(k)) can designate arbitrary times. For example, as shown in FIGS. 6(i) and (j), the values of time stamps d and n corresponding to designated transport packets d and n can be set as the values of corresponding cell start and end times 331 and 332.

FIG. 6(f) exemplifies a case wherein stream object (SOB) #A·298 is made up of two stream blocks #1 and #2.

In the example shown in FIGS. 6(e) and (g), stream block #1 consists of 32 sectors (sectors No. 0 to No. 31), and stream block #2 consists of 48 sectors (sectors No. 32 to No. 79).

First sector No. 0 in stream block #1 is comprised of pack header 1, PES header 6, stream block header 11, data area 21, and the like, as shown in FIGS. 6(e) and (d).

On the other hand, trailing-side sector No. 78 in stream block #2 is comprised of pack header 3, PES header 8, sector data header 13, data area 24, and the like, as shown in FIGS. 6(e) and (d).

Furthermore, sector No. 1 in FIG. 6(g) records pack header 2, sector data header 12, data area 22, and the like, as shown in FIG. 6(h), and sector No. 33 in FIG. 6(g) records sector data header 321, data area 312, and the like, as shown in FIG. 6(h).

Data area 21 shown in FIGS. 6(d) and (h) records pairs of time stamps a to d and transport packets a to d, as shown in FIGS. 6(c) and (i).

Also, data area 24 in FIG. 6(d) records a plurality of pairs of time stamps and transport packets, end code 32 that follows the last pair of time stamp z+transport packet z, and padding area (corresponding to padding area 37 in FIG. 1(j)).

Data area 22 shown in FIG. 6(h) includes transport packet d that includes the remaining contents of transport packet d in data area 21, as shown in FIG. 6(i). That is, in this example, the contents of transport packet d are divisionally recorded in data areas 21 and 22.

The former half (on the data area 21 side) of transport packet d in FIG. 6(i) corresponds to a tail-side partial packet in FIG. 8(f) to be described later, and the latter half (on the data area 22 side) of transport packet d in FIG. 6(i) corresponds to a head-side partial packet in FIG. 8(g) to be described later.

Furthermore, data area 312 in FIG. 6(h) records a pair of time stamp n and transport packet n, and other similar pairs, as shown in FIG. 6(i).

Note that start time 331 (FIG. 6(j)) of a cell corresponding to a position where the user or the like designates the playback start time is designated by time stamp d (FIG. 6(i)) for the total of two transport packets d divisionally recorded in data areas 21 and 22.

When transport packet is substituted by an application packet and APAT represents the application packet arrival time, cell start time 331 can be expressed by cell start APAT.

On the other hand, end time 332 (FIG. 6(j)) of a cell corresponding to a position where the user or the like designates the playback end time is designated by time stamp n (FIG. 6(i)) for transport packet n in data area 312. This cell end time 332 can be expressed as cell end APAT.

The aforementioned cell start time (cell start APAT) 331 and cell end time (cell end APAT) 332 are recorded in user-defined cell information #12·295, as shown in FIG. 6(k).

This user-defined cell information #12·295 can be recorded in user-defined PGC information table 234 shown in FIG. 3(f) or the lower portion in FIG. 4.

The cell start start/end time information that pertains to the user-defined cell information (information of a user-defined PGC) has been explained. On the other hand, cell start/end time information that pertains to original cell information (information of an original cell) can be exemplified as follows.

More specifically, head-side time stamp a in FIG. 6(c) can indicate corresponding cell start time 293 in FIG. 6(b), and tail-side time stamp z can indicate corresponding cell end time 284.

Corresponding cell start time 283 in FIG. 6(b) can correspond to cell start APAT (including stream cell start APAT (SC_S_APAT) or erase start APAT (ERA_S_APAT) to be described later).

Corresponding cell end time 284 in FIG. 6(b) can correspond to cell end APAT (including stream cell end APAT (SC_E_APAT) or erase end APAT (ERA_E_APAT) to be described later).

The aforementioned cell start time (cell start APAT) 283 and cell end time (cell end APAT) 284 are recorded in original cell information #1·272, as shown in FIG. 6(a).

This original cell information #1·272 can be recorded in original cell PGC information 233 shown in FIG. 3(f) or the lower portion in FIG. 4.

Note that examples of cell start APAT and cell end APAT will be explained later in descriptions of FIGS. 18 to 21 and FIGS. 30 to 33.

Figure 7:
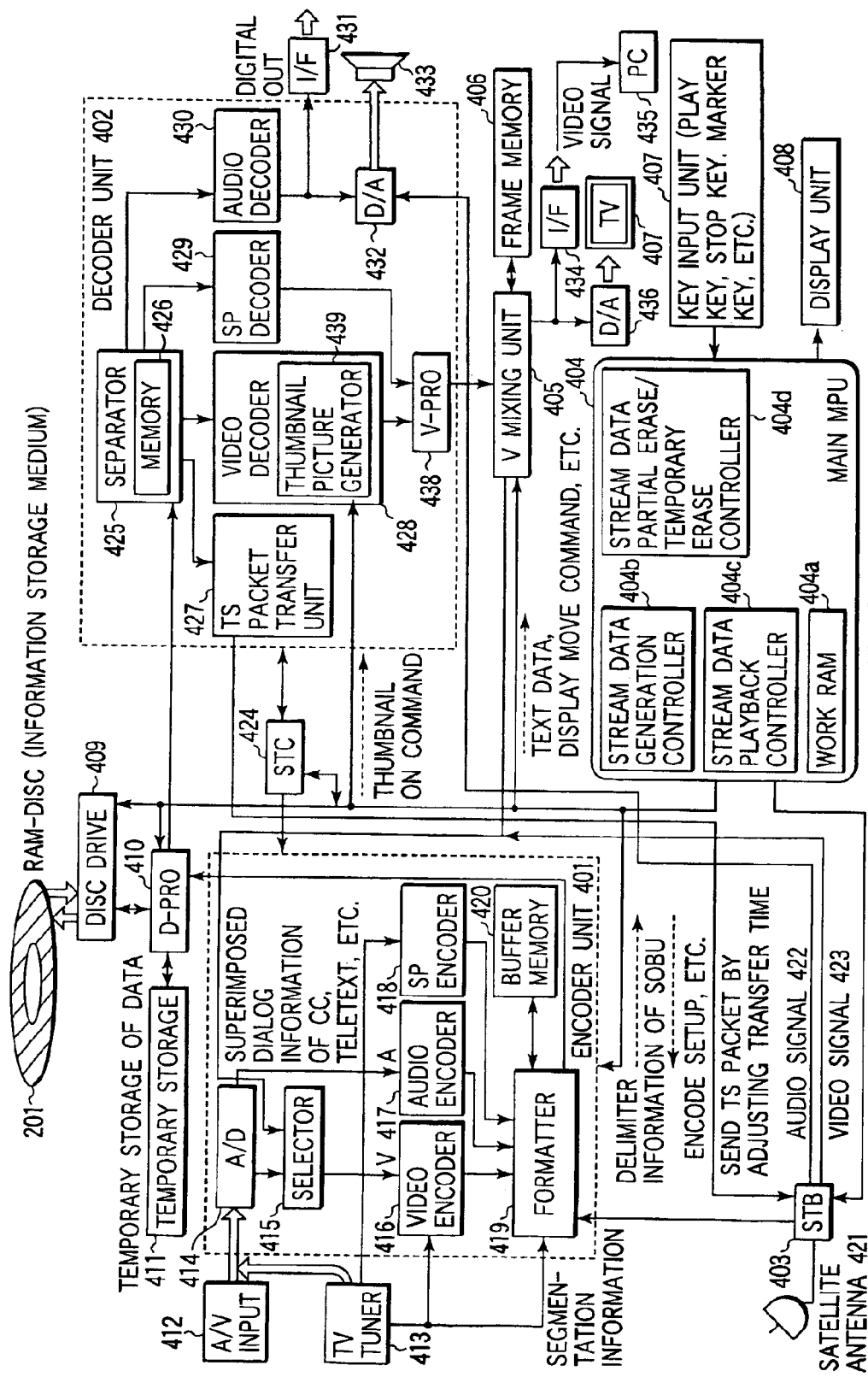
FIG. 7 is a block diagram for explaining the arrangement of a stream data recording/playback apparatus (streamer) according to an embodiment of the present invention.

FIG. 7 is a block diagram for explaining the arrangement of a stream data recording/playback apparatus (streamer) according to an embodiment of the present invention.

The internal structure of the stream data recording/playback apparatus (streamer) according to a preferred embodiment of the present invention will be explained below using FIG. 7.

The stream data recording/playback apparatus in this embodiment comprises encoder unit 401, decoder unit 402, STB 403, main MPU 404, V (video) mixing unit 405, frame memory 406, key input unit 407, display unit 408, disc drive 409 for recording or playing back information on or from DVD-RAM disc 201, data processor (D-PRO) 410, temporary storage 411, A/V (audio/video) input unit 412, and TV tuner 413.

This stream data recording/playback apparatus further comprises satellite antenna 421 connected to STB 403, system time counter (STC) 424, interface (I/F) 434 for sending a digital video signal from V mixing unit 405 to personal computer (PC) 435, and D/A converter 436 for analog TV 437.

Note that V mixing unit 405 has a function of mixing a digital video signal from V-PRO 438 of decoder 402, and digital video signal 423 from STB 403 as needed. With this mixing function, for example, a broadcast picture from STB 403 can be displayed on the left side of the display screen of TV 437, and a picture played back from disc 201 can be displayed on the right side of the display screen of TV 437.

Alternatively, the broadcast picture from STB 403 and the playback picture from disc 201 can be displayed to overlap each other on overlapping windows on the monitor screen of PC 435.

In the aforementioned arrangement, encoder unit 401 includes A/D converter 414 for video and audio, selector 415 for selecting a digital video signal from A/D converter 414 or digital video signal 423 from STB 403, and sending the selected signal to video encoder 416, video encoder 416 for encoding the video signal from selector 415, audio encoder 417 for encoding an audio signal from A/D converter 414, SP encoder 418 for encoding a closed caption (cc) signal, teletext signal, or the like from TV tuner 413 to obtain sub-picture (SP) data, formatter 419, and buffer memory 420.

On the other hand, decoder unit 402 is comprised of separator 425 that incorporates memory 426, video decoder 428 that incorporates thumbnail picture generator 439, SP decoder 429, audio decoder 430, TS packet transfer unit 427, video processor (V-PRO) 438, and audio D/A converter 432.

A digital audio signal decoded by decoder 430 can be externally output via interface (I/F) 431. Also, an analog audio signal obtained by converting the digital audio signal into an analog signal by D/A converter 432 drives loudspeaker 433 via an external audio amplifier (not shown).

Note that D/A converter 432 can D/A-convert not only a digital audio signal from audio decoder 430 but also a digital audio signal from STB 403.

When playback data from disc 201 is transferred to STB 403, TS packet transfer unit 427 can convert playback data (bitstream) from separator 425 into transport packets (TS packets) and can send these TS packets to STB 403 by adjusting the transfer time to time information from STC 424.

Main MPU 404 in FIG. 7 includes work RAM 404a used as a work memory, a control program named stream data generation controller 404b, a control program named stream data playback controller 404c, a control program named stream data partial erase/temporary erase controller 404d, and the like.

In order to read/write the file management area (navigation RTR.IFO 104, STREAM.IFO 105 in FIG. 2 or FIG. 3(e)) and the like, main MPU 404 is connected to D-PRO 410 via a dedicated microcomputer bus.

Video recording control in the stream data recording/playback apparatus is done by main MPU 404 using the aforementioned control programs (sequential control programs).

The flow of a video signal upon video recording in the apparatus shown in FIG. 7 will be explained first. In video recording, a series of processes are executed in accordance with the sequential program named stream data generation controller 404 in main MPU 404.

More specifically, stream data output from STB to encoder unit 401 via a transmission path complying with IEEE1394 is transferred to formatter 419.

The IEEE1394 reception side of formatter 419 reads the time from the start of stream data transfer on the basis of the time count value of STC 424. The read time information is sent as management information to main MPU 404, and is saved in work RAM 404a.

Main MPU 404 generates delimiter information for dividing stream data in units of stream blocks (in units of VOBUs in a real-time RTR recorder, in units of SOBUs in the streamer) on the basis of the time information, also generates cell division information, program division information, and PGC division information corresponding to the delimiter information, and records them in work RAM 404a in main MPU 404.

Formatter 419 converts stream data sent in the format of FIG. 1(a) from STB 403 into the format shown in FIGS. 1(c) and (i) (a stream pack sequence shown in FIG. 8(h) to be described later) in accordance with the instruction from stream data generation controller 404b of main MPU 404, and inputs the converted stream pack sequence to D-PRO

410. Each of the input stream packs has a constant size of 2,048 bytes, which is equal to the sector size. D-PRO 410 combines the input stream packs in units of 16 sectors to form ECC blocks, and sends the ECC blocks to disc drive 409.

When disc drive 409 is not ready to record data on RAM disc (information storage medium) 201, D-PRO 410 transfers recording data to temporary storage 411 to temporarily save them therein, and waits until disc drive 409 is ready to record data.

When disc drive 409 is ready to record data, D-PRO 410 transfers data saved in temporary storage 411 to disc drive 409. In this manner, recording on disc 201 is started. Upon completion of recording of data saved in temporary storage 411, the subsequent data are seamlessly transferred from formatter 419 to D-PRO 410.

Note that a large-size memory is used as temporary storage 411 so as to store recording data for several minutes or more by high-speed access.

Data processes upon playback will be explained below. In playback control in the stream data recording/playback apparatus, main MPU 404 executes a series of processes in accordance with the sequential program named stream data playback controller 404c.

Disc drive 409 plays back stream data from RAM disc (information storage medium) 201. The played-back stream data is transferred to decoder unit 402 via D-PRO 409.

In decoder unit 402, separator 425 receives transport packets in the played-back stream data.

Separator 425 transfers video packet data (MPEG video data) to video decoder 428, audio packet data to audio decoder 430, and sub-picture packet data to SP decoder 429 in accordance with stream ID 603 and substream ID to be described later with reference to FIG. 10.

Video data decoded by video decoder 428 is converted into an analog TV signal via V mixing unit 405 and D/A converter 436, and the analog TV signal is transferred to TV 437 to display a picture.

At the same time, an audio signal decoded by audio decoder 430 is sent to D/A converter 432, and is converted into an analog audio signal. The digital audio data before D/A conversion is transferred to a digital input of an external audio equipment (not shown) via I/F 431. Alternatively, the digital audio data before D/A conversion is converted into an analog audio signal by D/A converter 432, and is sent to loudspeaker 433 via an audio amplifier (not shown).

The flow of signals in the stream data recording/playback apparatus (streamer) in the embodiment of the present invention has been explained.

As described above, stream data to be recorded on DVD-RAM disc (information storage medium) 201 is converted into the structure shown in FIGS. 1(*c*) and (*i*) in formatter 419. The stream data recording sequence that focuses on this conversion process will be described later with reference to the flow chart in FIG. 13.

Also, the stream data playback sequence will be described later with reference to the flow chart in FIG. 14.

Figure 8:
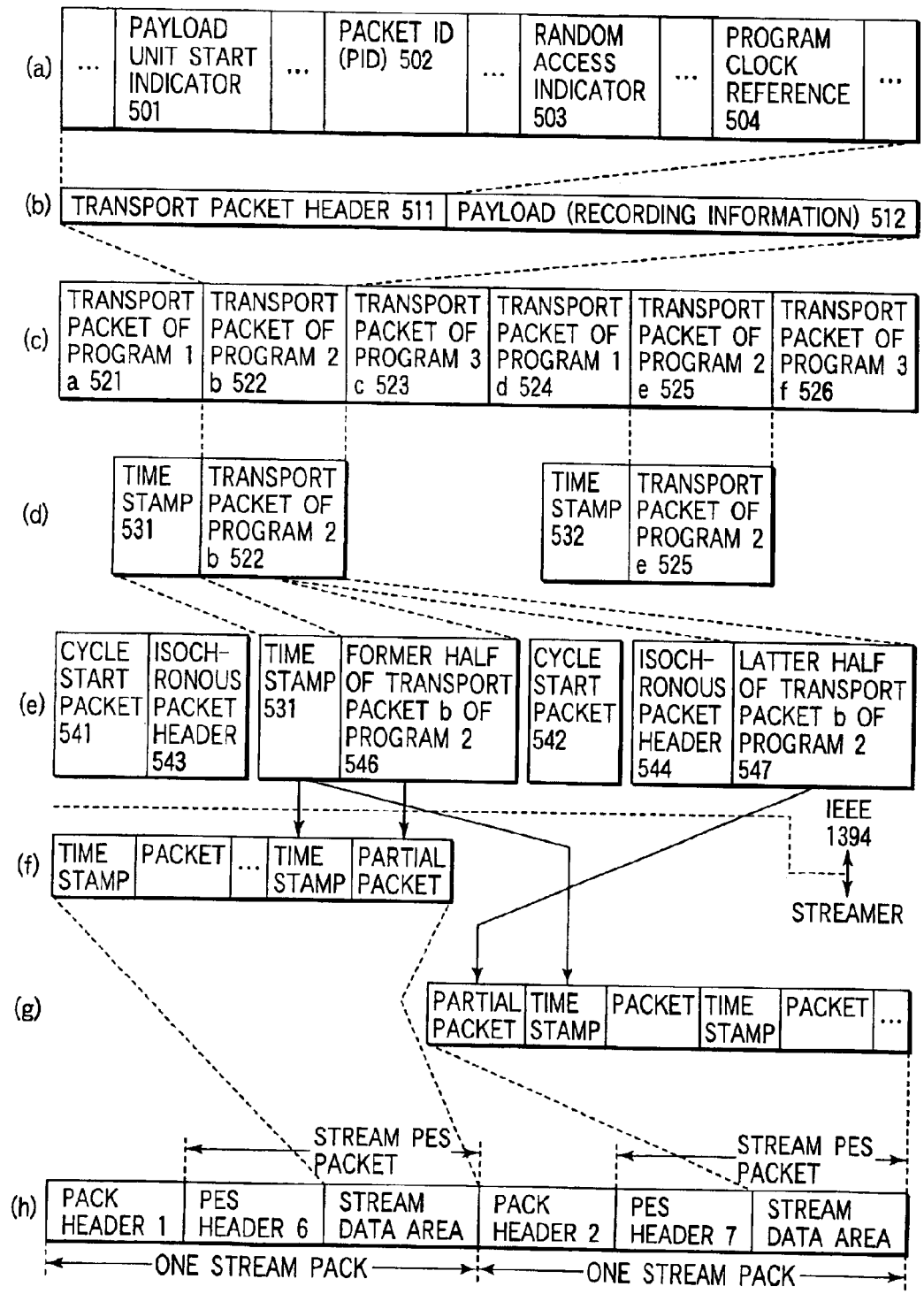
FIG. 8 is a view for explaining the correspondence among the digital broadcast contents, the video data transfer format in IEEE1394, and stream packs in the streamer.

FIG. 8 is a view for explaining the correspondence among the digital broadcast contents, video data transfer format in IEE1394, and stream packs in the streamer.

In digital broadcast, video information compressed according to MPEG2 is transferred in transport packets. Each transport packet is made up of transport packet header 511, and payload 512 that records a data main body of recording information, as shown in FIG. 8(*b*).

Transport packet header 511 is comprised of payload unit start indicator 501, packet ID (PID) 502, random access indicator 503, program clock reference 504, and the like, as shown in FIG. 8(*a*).

The MPEG-compressed video information contains I-, B-, and P-picture information. In the first transport packet that records I-picture information (571 in FIG. 9 to be described later), random access indicator 503 in FIG. 8(*a*) is set with flag="1". On the other hand, in the first transport packets of B-picture information and P-picture information (573, 574, 572 in FIG. 9 to be described later), payload unit start indicator 501 in FIG. 8(*a*) is set with flag="1".

Using information of these random access indicator 503 and payload unit start indicator 501, information of an I-picture mapping table (641 in FIG. 11 to be described later) and information of a B/P-picture start position mapping table (642 in FIG. 11 to be described later) are generated.

For example, a bit at the corresponding position in the B/P-picture start position mapping table (642 in FIG. 11) is set at "1" for a transport packet having payload unit start indicator 501 shown in FIG. 8(*a*) set with flag="1".

In digital broadcast, video information and audio information are transferred in different transport packets. The video information and audio information are distinguished by packet ID (PID) 502 in FIG. 8(*a*). Using information of this PID 502, a video packet mapping table (643 in FIG. 11 to be described later) and an audio packet mapping table (644 in FIG. 11 to be described later) are generated.

As shown in FIG. 8(*c*), a plurality of programs (programs 1 to 3 in this example) are time-divisionally transferred while being packetized in a single transponder.

For example, information of transport packet header 511 and that of payload (recording information) 512 in FIG. 8(*b*) are transferred by transport packets b·522 and e·525 of program 2 shown in FIG. 8(*c*).

Assume that program 2 shown in FIG. 8(*c*) is recorded on information storage medium 201 in FIG. 3 or 7 upon operation of a digital broadcast receiver (the user of the STB in FIG. 7). In this case, STB 403 in FIG. 7 extracts only transport packets b and e of program 2 in FIG. 8(*c*).

At that time, STB 403 appends reception time information of transport packets b·522 and e·525 in the form of time stamps 531 and 532, as shown in FIG. 8(*d*).

After that, when data is transferred from STB 403 in FIG. 7 to formatter 419 according to the IEEE1394 transfer scheme, the pair of time stamp 531 and transport packet 522 are transferred while being segmented into small units, as shown in FIG. 8(*e*).

Formatter 419 in FIG. 7 temporarily converts stream data transferred by IEEE1394 from STB 403 into the format shown in FIG. 8(*d*) (corresponding to the format shown in FIG. 1(*a*) or the format shown in FIGS. 8(*f*), (*g*), and (*h*)). A bitstream in the format shown in FIG. 1(*a*) or FIGS. 8(*f*), (*g*), and (*h*) (a stream pack sequence in FIG. 8(*h*)) is recorded on information storage medium 201.

More specifically, in an embodiment of the present invention, pack headers 1, 2, 3, and 4 and PES headers 6, 7, 8, and 9 which record system clock information and the like are inserted at the head positions of respective sectors (FIGS. 1(*d*) and (*h*)) (see FIGS. 1(*c*) and (*i*) and FIG. 6(*d*)). Immediately after these headers, sector data headers 12 and 13 (FIGS. 1(*c*) and (*i*) and FIG. 6(*d*)) are recorded, but stream block header 11 is recorded in only the first sector of each stream block (FIGS. 1(*c*) and FIG. 6(*d*)).

A plurality of time stamps and transport packets (FIG. 1(*a*)) are packed in data areas 21, 22, 23, and 24 (FIGS. 1(*c*)

and (*i*)), and one transport packet (packet d in FIG. 1(*b*); packet b in FIG. 8(*e*)) is recorded across a plurality of sectors (Nos. 0 and 1 in FIG. 1(*d*); partial packets in FIGS. 8(*f*) and (*g*)). This is one feature of the present invention.

Using the data structure that utilizes this feature, a packet having a size larger than the sector size (e.g., 2,048 bytes) can be recorded. This point will be described in more detail below.

Digital broadcast adopts a multi-program compatible multiplexing/demultiplexing scheme called a transport stream, as shown in FIG. 8(*c*), and one transport packet b·522 often has a size of 188 bytes (or 183 bytes).

As described above, one sector size is 2,048 bytes, and each of data areas 21, 22, 23, and 24 (FIGS. 1(*c*) and (*i*)) can record approximately 10 transport packets for digital broadcast even after various header sizes are subtracted.

By contrast, in a digital communication network such as ISDN or the like, a long packet having a packet size as large as 4,096 bytes is often transferred.

Using the data structure that utilizes the feature (capable of recording one packet data across a plurality of packets so that each of data areas 21, 22, 23, and 24 (FIGS. 1(*c*) and (*i*)) can record not only a plurality of transport packets, but also a packet with a large packet size such as a long packet, one packet is recorded to extend across a plurality of data areas 21, 22, 23, and 24.

As a result, all packets, i.e., transport packets for digital broadcast, a long packet for digital communications, and the like can be recorded in a stream block without any fractions independently of their packet sizes.

A normal packet is appended with a time stamp. However, as shown in FIG. 8(*g*), a time stamp can be omitted in a partial packet.

In this manner, partial packets (the partial packet size falls within the range from 1 to 187 bytes if the packet size is 188 bytes; an average of less than 100 bytes) divided at the boundary of two neighboring stream packs (FIG. 8(*h*)) can be effectively used in information recording. In addition, the storage capacity of medium 201 can be increased by an amount of each time stamp (e.g., 4 bytes per time stamp) omitted from a partial packet.

Note that the position of a time stamp located immediately after the first packet in FIG. 8(*g*) can be specified by first access point 625 in FIG. 12(*b*) to be described later, or FIRST_AP_OFFSET shown in FIG. 12(*c*).

When a blank area is formed in a stream block, padding data (information that allows to recognize an area where no data is recorded) is recorded. For example, end code 31 is allocated behind last transport packet f in stream block #1, and the remaining portion is defined as padding area 36, as shown in FIG. 1(*b*). Padding areas 37 and 38 shown in FIG. 1(*j*) are also similar padding data areas.

Note that an example of the internal data structure of the padding area will be described later with reference to FIG. 26.

Figure 9:
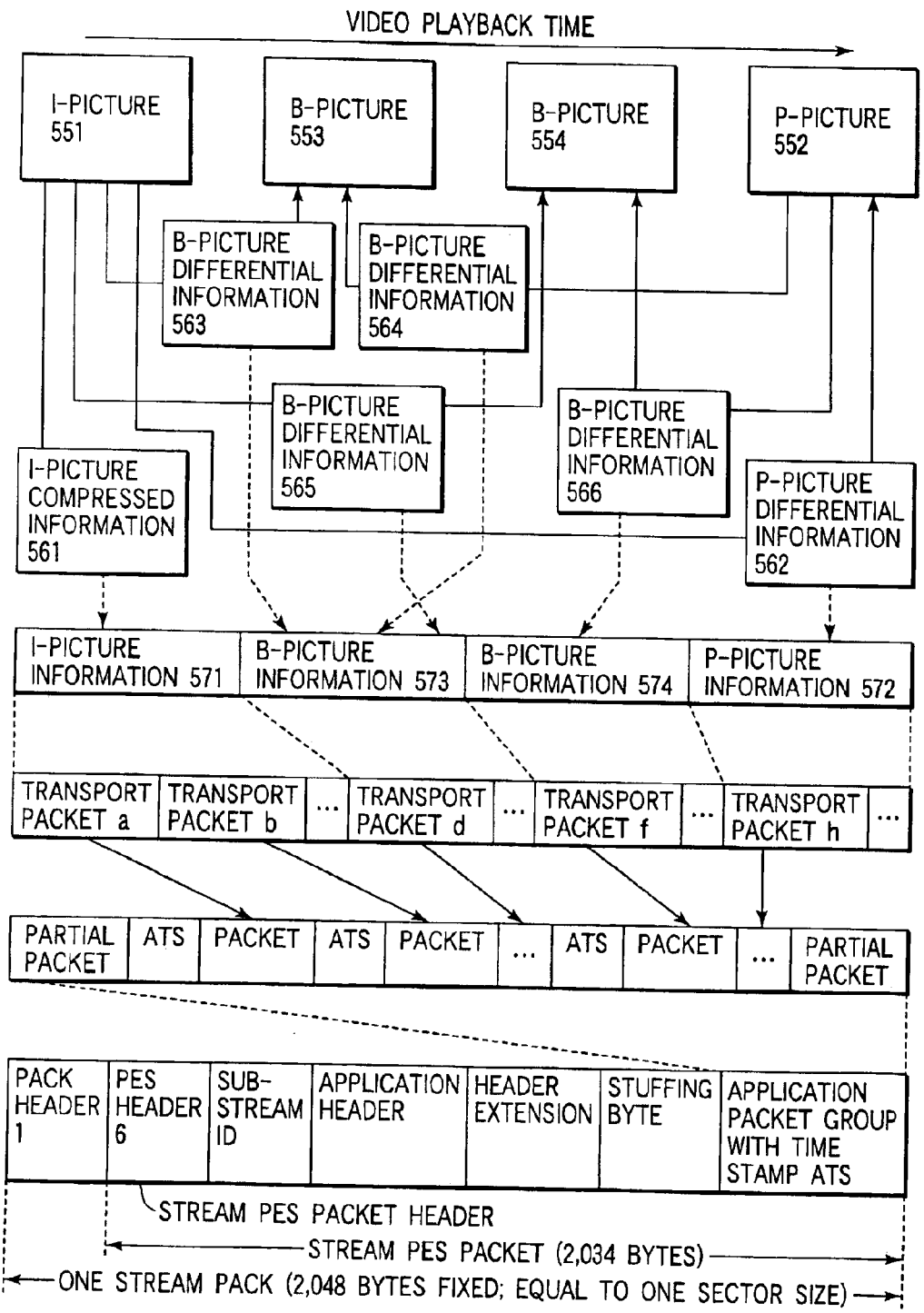
FIG. 9 is a view for explaining the relationship between the video information compression method in MPEG and transport packets, and the relationship between transport packets in MPEG and application packets in the streamer.

FIG. 9 is a view for explaining the relationship between the video information compression method in MPEG and transport packets, and the relationship between transport packets in MPEG and application packets in the streamer.

As described above, in digital broadcast, video information is transferred as information compressed by MPEG2.

As shown in FIG. 9, compressed information 561 of I-picture 551 is recorded in transport packets a, b, . . . , as I-picture information 571. Two pieces of differential information 563 and 564 of B-picture 553 are recorded as B-picture information 573 in transport packets d, . . . . Two pieces of differential information 565 and 566 of B-picture 554 are recorded as two pieces of B-picture information 573 and 574 in transport packets d, f, . . . . Differential information 562 of P-picture 552 is recorded as P-picture information 572 in transport packets h, . . . .

In this way, I-, B-, and P-picture information are recorded in different transport packets.

When such transport packets are recorded by the streamer, the contents of each transport packet are transferred to a packet (application packet) with a time stamp called an application time stamp (ATS).

A group of application packets with ATS (around 10 packets) are stored in an application packet area in a stream PES packet.

This stream PES packet appended with a pack header corresponds to one stream pack exemplified in FIG. 8(*h*).

The stream PES packet is comprised of a PES header, substream ID, application header, application header extension (option), stuffing byte (option), and application packet area that stores a group of application packets with ATS.

Note that the contents of the PES header will be described later with reference to FIG. 10. Also, the application header (corresponding to stream block header 11 or sector data header 12) will be described later with reference to FIGS. 11 and 12.

Figure 10:
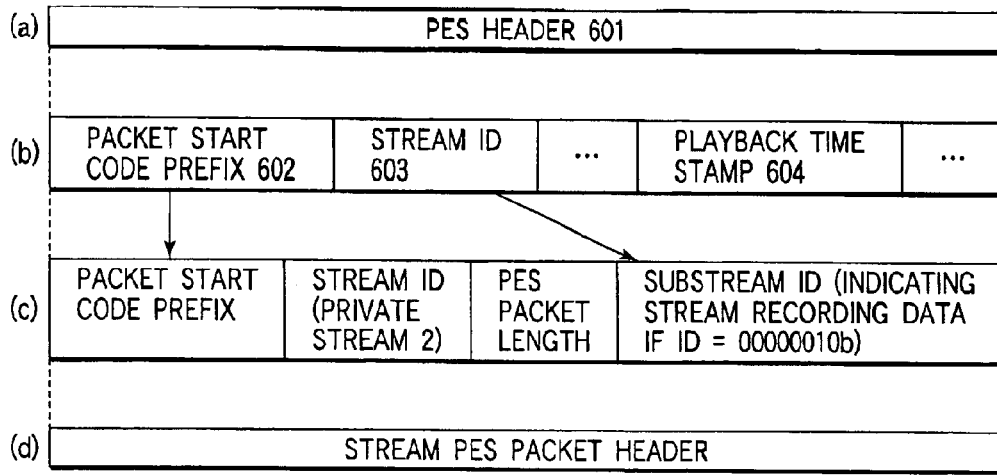

FIG. 10 is a view for explaining the internal structure of the PES header shown in FIGS. 1, 8, 9, and the like.

PES header 601 in FIG. 10(*a*) includes packet start code prefix 602, stream ID 603, playback time stamp 604, and the like, as shown in FIG. 10(*b*). This PES header 601 corresponds to PES headers 6 to 9 shown in FIGS. 1(*c*), (*i*), and (*j*), PES headers 6 and 7 in FIG. 8(*h*), PES header 6 shown in FIG. 9, and the like.

A stream PES header in FIG. 10(*d*) includes a packet start code prefix, stream ID (private stream 2), PES packet length, substream ID, and the like. This stream PES header is the same as that shown in FIG. 9, and has contents corresponding to PES header 601 in FIG. 10(*a*).

When PES header 9 in FIG. 1(*j*) has the internal structure of PES header 601 shown in FIG. 10(*a*), if stream ID 603 (FIG. 10(*b*)) of this PES header is "10111110", a packet having this PES header is defined to be padding packet 40 (FIG. 1(*i*)) in MPEG.

On the other hand, if substream ID 603 (substream ID in FIG. 10(*c*)) is "00000010", a packet with that PES header includes stream recording data.

In stream block #1 in FIG. 1(*e*), last transport packet f (FIG. 1(*a*)) is present within last sector No. 31 (FIG. 1(*d*)). However, in stream block #2 (FIGS. 1(*e*) and (*g*)), since the user or the like ends video recording halfway through, last transport packet z (FIG. 1(*j*)) is allocated in sector No. 78 (FIG. 1(*h*)), and sector No. 79 (FIG. 1(*h*)) is a free area where no stream data is recorded. For this reason, sector No. 79 is recorded as padding packet 40 (FIG. 1(*i*)).

Figure 11:
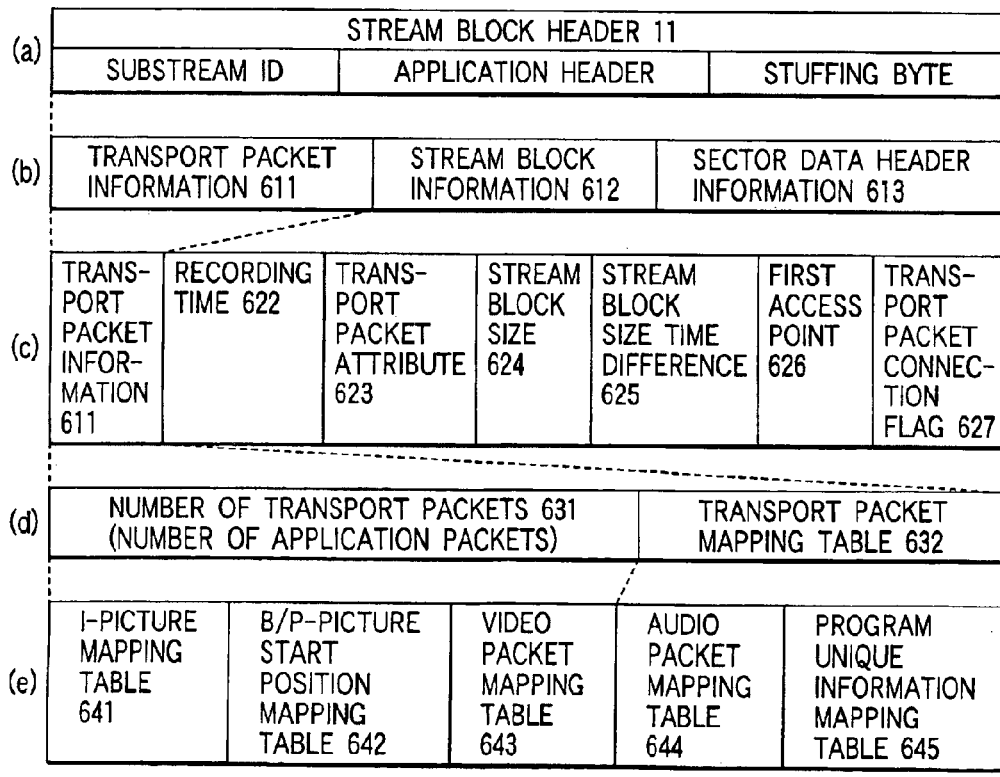
FIG. 11 is a view for explaining the internal structure of a stream block header shown in FIG. 1.

FIG. 11 is a view for explaining the internal structure of the stream block header shown in FIG. 1(*c*).

As shown in FIG. 11(*a*), stream block header 11 has contents corresponding to a substream ID, application header, stuffing byte, and the like shown in the lower portion in FIG. 9.

Stream block header 11 includes transport packet information 611, stream block information 612, sector data header information 613, and the like, as shown in FIG. 11(*b*).

Transport packet information 611 in FIG. 11(*b*) is the same as transport packet information 611 in FIG. 11(*c*).

Stream block information 612 in FIG. 11(*b*) which records information that pertains to the entire stream block corresponds to recording time 622 (information of year, month, day, and time recorded on information storage medium 201), transport packet attribute 623 (attribute information that pertains to a transport packet), stream block size 624 (the data size of the corresponding stream block (e.g., the data size can be expressed by the number of ECC blocks)), stream block time difference 625, and the like in FIG. 11(*c*).

Taking FIG. 1(*b*) as an example, time range information in the corresponding stream block is computed by [stream block time difference]=[first time stamp value in stream block #2]−[value of time stamp a]. This [stream block time difference] corresponds to stream block time difference 625.

Sector data header information 613 in FIG. 11(*b*) corresponds to first access point 626 and transport packet connection flag 627 in FIG. 11(*c*). This sector data header information 613 includes information similar to sector data 12 shown in FIG. 12 to be described later.

Transport packet information 611 in FIG. 11(*c*) includes the number 631 of transport packets (the number of application packets), transport packet mapping table 632, and the like, as shown in FIG. 11(*d*) (the number of application packets in FIG. 11(*d*) corresponds to AP_Ns in FIG. 12(*c*) to be described later).

The number 631 of transport packets (application packets) in FIG. 11(*d*) can include I-picture mapping table 641, B/P-picture mapping table 642, and the like, as shown in FIG. 11(*e*).

Transport packet mapping table 632 in FIG. 11(*d*) can include video packet mapping table 643, audio packet mapping table 644, program unique information mapping table 645, and the like.

Each mapping table (FIG. 11(*e*)) in transport packet mapping table 632 has a bitmap format.

For example, when n transport packets (application packets) are recorded in one stream block, the number 631 of transport packets (the number of application packets) assumes a value "n".

Furthermore, each of mapping tables 643 to 645 consists of "n-bit data", and one bit is assigned to each of transport packets (application packets) which line up in the stream block from the head side.

Figure 12:
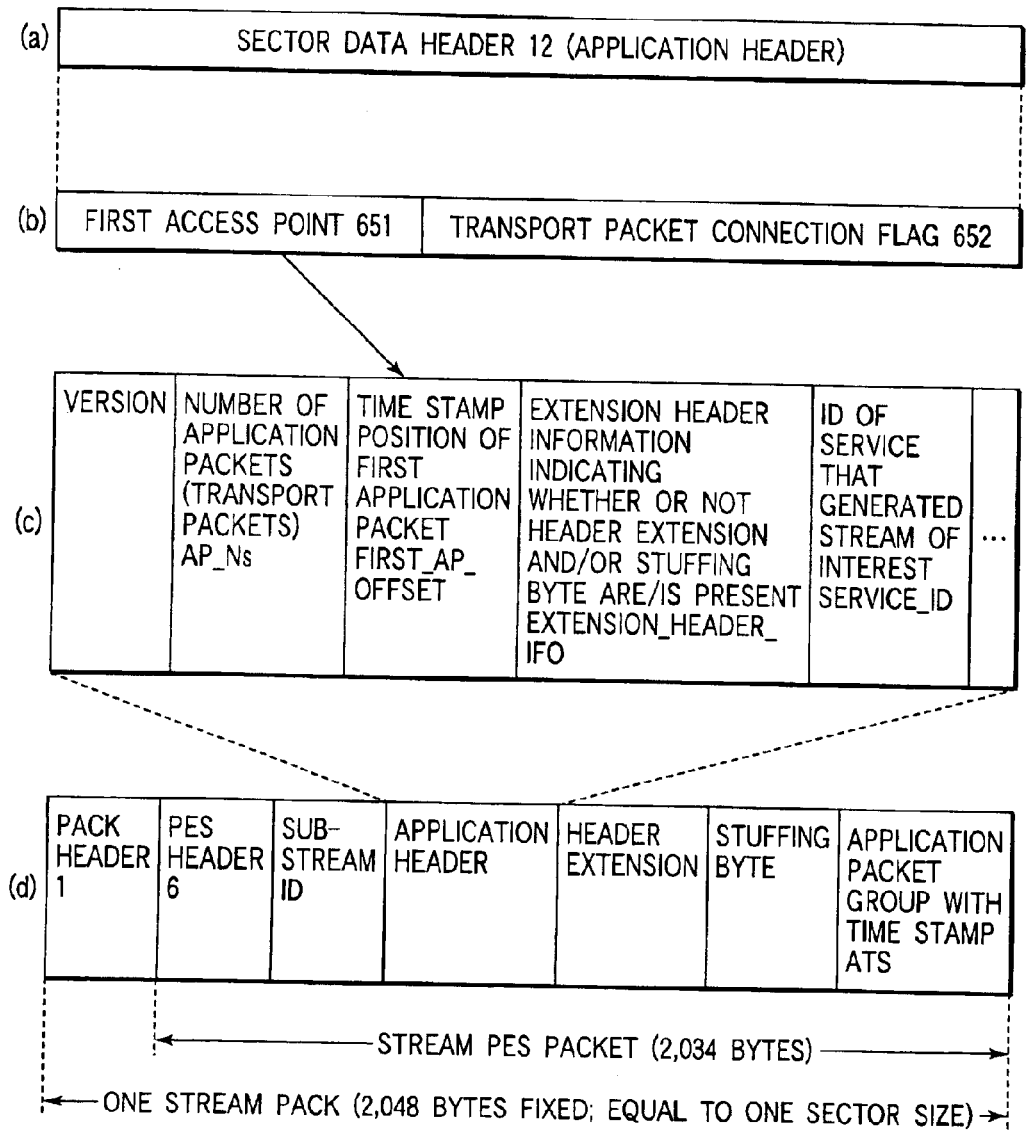
FIG. 12 is a view for explaining the internal structure of a sector data header shown in FIG. 1.

FIG. 12 is a view for explaining the internal structure of the sector data header shown in FIG. 1.

Sector data headers 12 and 13 shown in FIGS. 1(*c*) and (*i*) indicate data layout information in data areas 21, 22, 23, and 24, and have an internal structure including first access point 651 and transport packet connection flag 652, as shown in FIG. 12.

As shown in FIG. 12(*d*) (and the lower portion in FIG. 9), one stream pack having a size of 2,048 bytes, which is the same as the sector size, consists of a pack header and stream PES header. The stream PES header contains an application packet header corresponding to a portion of sector data header 12 in FIG. 12(*a*) or stream block header 11 in FIG. 11(*a*).

As shown in FIG. 12(*c*), this application packet header includes:

the version of the application packet header format;

the number AP_Ns of application packets (transport packets) which start within the stream pack of interest;

first application packet time stamp position FIRST_AP_OFFSET which describes the position of a time stamp of the first application packet which starts within the stream pack of interest by a relative value from the first byte of that stream pack;

extension header information EXTENSION_HEADER_IFO indicating if a header extension and/or stuffing byte are/is present; and identifier SERVICE_ID of a service which generated the stream of interest.

FIRST_AP_OFFSET included in the application packet shown in FIG. 12(*d*) corresponds to first access point 651 included in sector data header 12 in FIG. 12(*a*).

As shown in FIG. 1(*b*), transport packet d is recorded across two sectors. When the last time stamp or transport packet extends to the next sector, transport packet connection flag 652 is set at "1". In the example shown in FIG. 1(*b*), the address in data area 22 of the time stamp head position located after transport packet d which extends to the next sector is recorded in first access point 651 (expressed in units of bits).

The first access point value of sector No. 1 (or its corresponding stream pack) shown in FIG. 1(*d*) can be set to be larger than the size of data area 22 (FIG. 1(*c*)) of sector No. 1. This value indicates that the position of a time stamp corresponding to the next packet of a packet recorded in sector No. 1 is present in the next and subsequent sectors.

In an embodiment of the present invention, since a value larger than the size of data areas 21, 22, 23, and 24 can be designated as the value of first access point 651, the time stamp head position can be designated for a packet having a size larger than the sector size (or stream pack size=2,048 bytes).

For example, assume that one packet is recorded across sector No. 0 to sector No. 2 in the data structure shown in FIG. 1(*d*). Furthermore, a time stamp for that packet is recorded at the first position in data area 21 of sector No. 0, and a time stamp for the next packet is set at the T-th bit position in a data area of sector No. 2. Such case will be examined below.

In this case, the first access point value of sector No. 0 is "0", that of sector No. 1 is "the size of data area 22 of sector No. 1+T", and that of sector No. 2 is "T".

Figure 13:
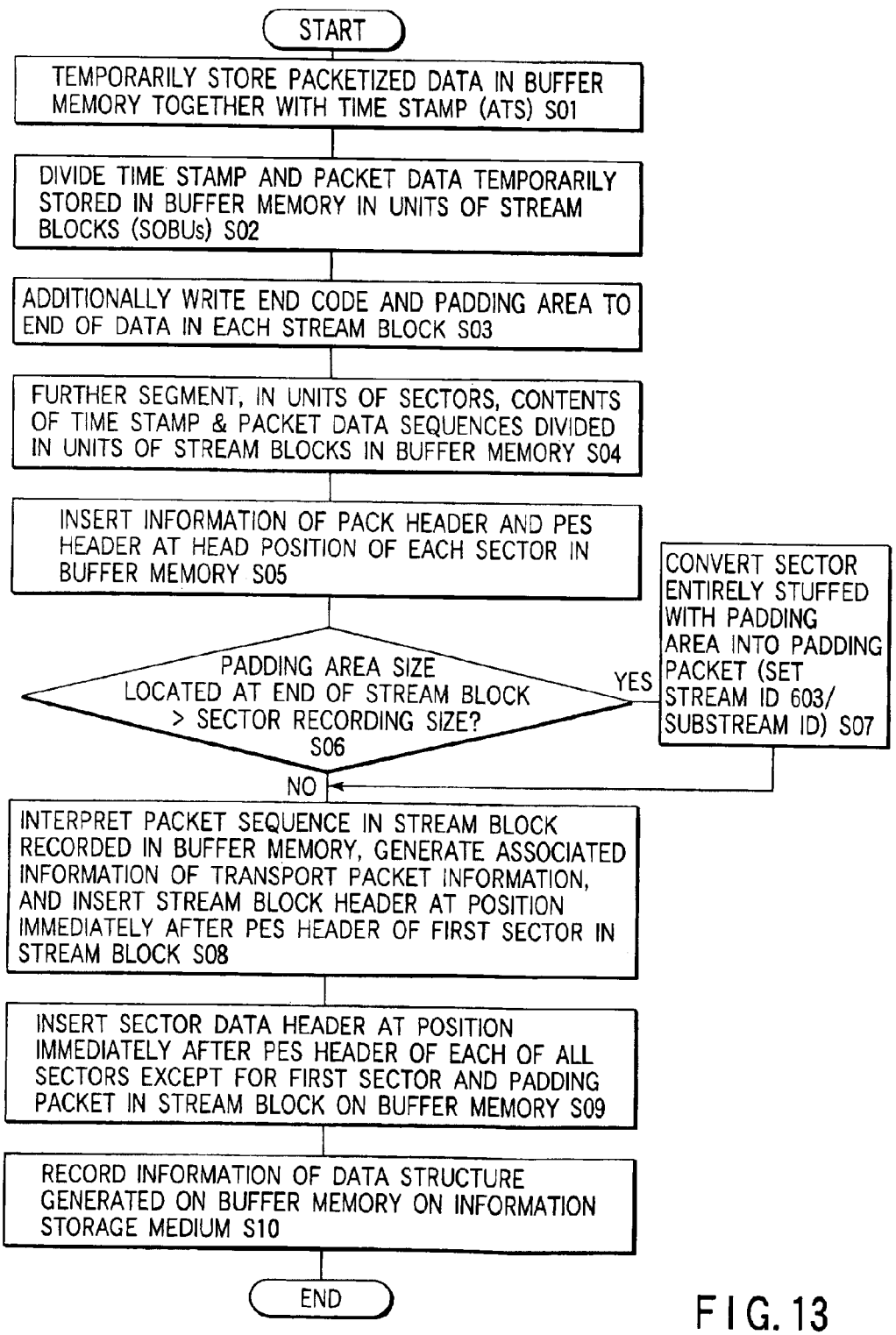
FIG. 13 is a flow chart for explaining the stream data encode sequence and video recording sequence according to an embodiment of the present invention.

FIG. 13 is a flow chart for explaining the stream data encode sequence and video recording sequence according to an embodiment of the present invention.

In encoder unit 401 in FIG. 7, packetized data are temporarily stored in buffer memory 420 together with time stamps (time stamps shown in FIG. 1(*b*), FIG. 8(*f*), and the like, or ATS in FIG. 9) (step S01).

In other words, in step S01 the apparatus (streamer) in FIG. 7 stuffs area of playback data stored in sectors of continuous stream blocks (SOBU) with transport packets (application packets) having time stamps (ATS). The time stamp appended in this step uses local clock value obtained from STC 242 in FIG. 7.

A bit sequence of time stamps and packet data temporarily stored in buffer memory 420 are divided in units of stream blocks (or SOBUs) (step S02).

In this embodiment, a single transport packet (d) can be inhibited from being recorded across different stream blocks (#1, #2), as shown in FIG. 1(*b*). In this case, in step S02 that divides the time stamps and packet data temporarily recorded in buffer memory 420 in FIG. 7 in units of stream blocks, division must be done so that a pair of time stamp and transport packet completely fall within one stream block.

An end code (FIG. 1(j)) and padding area as needed are additionally written at the end of data in each divided stream block (SOBU) (step S03).

Each of bit sequences of the time stamps and packet data, which have been divided in units of stream blocks (SOBUs) in buffer memory 420, is further segmented in units of sectors (or in units of stream packs each having 2,048 bytes) (step S04).

In this embodiment, a single transport packet (d) can be recorded to extend across different sectors (No. 0 and No. 1 in FIG. 1(d)). In such case, in step S04 that segments data in units of sectors, segmentation is simply done in accordance with a predetermined size assigned to data areas 21, 22, 23, and 24.

After that, information of a pack header and that of PES header shown in FIGS. 1(c), 9, and the like are inserted at the head position of each sector (stream pack) in buffer memory 420 (step S05).

Note that the information of a pack header and that of PES header inserted in step S05 are also that of a sequence header arbitrarily output from a device (application device) which generated transport packets (application packets).

It is then checked if the padding area size located at the end in a stream block (SOBU) is larger than the sector recording size (stream pack size=2,048 bytes) (step S06).

For example, in last stream block #2 in stream object #A-298 in FIG. 1(f), the user or the like may execute a video recording end process at an arbitrary position. For this reason, the size of stream data to be recorded is often much larger than the size of a recordable area in stream block #2.

In such case, it is determined as the checking result in step S06 that the total padding area size is larger than the sector recording size. (In the example shown in FIG. 1(f) to (j), stream data is recorded up to the middle of sector No. 78, and no data is substantially recorded in sector No. 79. In this case, the total size of padding areas 37 and 38 in FIG. 1(j) becomes larger than the size in sector No. 79.)

In this case (YES in step S06), the value of stream ID 603 in FIG. 10(b) is set to be "10111110", as described above, and sector No. 79 (a sector entirely stuffed with a padding area) is converted into padding packet 40 (step S07).

On the other hand, if it is determined in step S06 that the padding area size is equal to or smaller than the sector recording size (NO in step S06), or if the conversion process into a padding packet is completed in step S07, the packet data sequence in each stream block (SOBU) recorded in buffer memory 420 is analyzed or interpreted. Based on this analysis result, associated information (FIG. 11(b) to (e), FIGS. 12(b) to (d)) of transport packet information is generated. Then, stream block 11 in FIG. 11(a) is inserted immediately after the PES header of the first sector in each stream block (step S08).

Alternatively, an application header shown in FIGS. 9, 11, and the like is inserted after the PES header of the first sector (first stream pack) in each stream block (SOBU) (step S08).

Furthermore, for all the sectors except for the first sector and padding packet in each stream block, sector data header 12 shown in FIG. 12(a) is inserted immediately after each PES header (step S09).

Alternatively, for all the sectors (stream packs) except for the first sector (first stream pack) and padding areas in each stream block (SOBU), the application header shown in FIGS. 9, 12, and the like is inserted after each PES header (step S09).

Header insertion in steps S08 and S09 is done within buffer memory 420.

A bitstream encoded in the aforementioned processes (steps S01 to S09) (stream information having a data structure created on buffer memory 420) is recorded on an information storage medium (201 in FIG. 3 or FIG. 7) such as a DVD-RAM disc or the like by the apparatus shown in FIG. 7.

In step S08, all transport packet headers 511 (FIG. 8(b)) in each stream block (SOBU) are searched, and individual data in transport mapping table 632 in FIG. 11(e) can be created using the values of payload unit start indicator 501, PID 502, and random access indicator 503 in FIG. 8(a).

Also, the value of stream block time difference 625 in FIG. 8(c) can be obtained by computing the difference between the value of the first time stamp in the next stream block (SOBU) and that of the first time stamp in the current stream block (SOBU).

Figure 14:
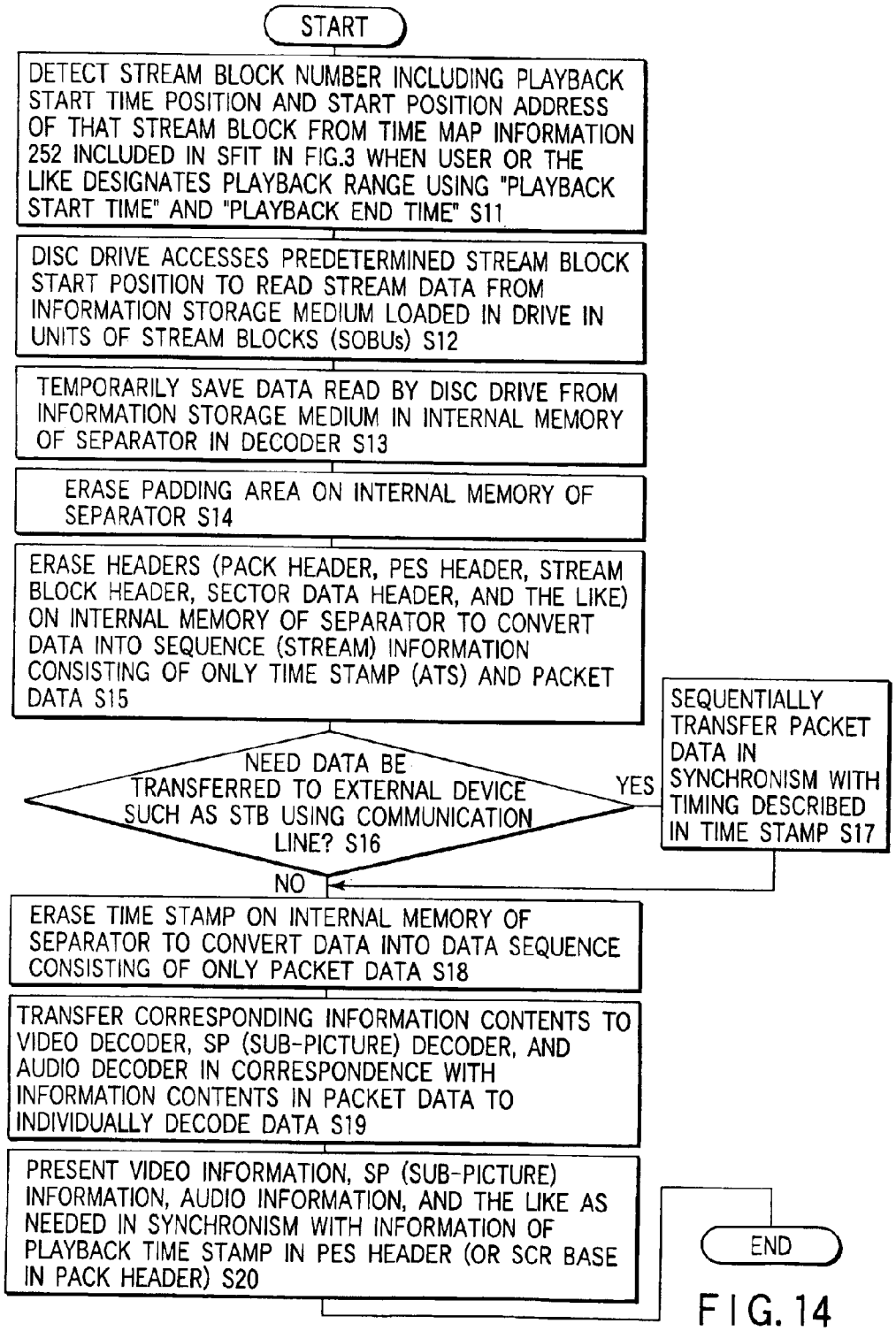
FIG. 14 is a flow chart for explaining the stream data decode sequence and playback sequence according to an embodiment of the present invention.

FIG. 14 is a flow chart for explaining the stream data decode sequence and playback sequence according to an embodiment of the present invention.

The stream data playback sequence will be explained below while focusing on a process for extracting transport packets in separator 425 in FIG. 7 from stream information recorded on information storage medium (DVD-RAM disc) 201 with the structure shown in FIGS. 1(c) and (i) or FIG. 8(h).

The user or the like designates the range to be played back using time information. Upon playback in such case, a process for searching for a stream block (or SOBU) to be played back corresponding to the designated time information is required.

RAM disc (information storage medium in FIG. 3 or FIG. 7) that has undergone information recording by the method exemplified in FIG. 13 is set in disc drive 409 in FIG. 7. After that, assume that, for example, the apparatus user designates the playback range of his or her choice using "playback start time" and "playback end time". After this designation, assume that the user presses the play key (playback button) of key input unit 407 (or a remote controller (not shown)) in FIG. 7.

Main MPU 404 in FIG. 7 then accesses stream file information table (SFIT) 232 in FIG. 3(f) in accordance with control program "stream data playback controller 404c" to read the contents of time map information 252 in FIG. 3(h). Main MPU 404 detects the number of a stream block (SOBU) that includes the position (playback start time position) of the designated "playback start time" and the start position address of that stream block (SOBU) (step S11).

In the embodiment shown in FIG. 3(i), time map information 252 records only differential time information in units of stream blocks. In this case, the stream data playback controller (playback control program) in main MPU 404 sums up the values of stream block time differences (see FIG. 5(b)) 263 and 265 in time map information 252 for each of stream object information (SOBI) 242 and stream object information 243 (FIG. 3(g)) to compare if the sum reaches the time designated by the user. Based on the comparison result, the controller detects the position of a stream block (SOBU), the time stamp value of which matches the time designated by the user, and a stream object (SOB) which includes that stream block of interest. In this manner, the start position address of the stream block (SOBU) to be accessed can be detected.

Alternatively, when stream object information (SOBI) with a data structure shown in FIG. 29 (to be described later) is used, the start position address of the stream block (SOBU) to be accessed can be detected using information (time map information MAPL, the number MAPL_ENT_Ns of entries of MAPL, and the like) contained in this SOBI.

The start position address detected in step S11 is sent to disc drive 409. Upon receiving the address information of the access destination, disc drive 409 accesses the start position of the predetermined stream block (SOBU) corresponding to that address information. Disc drive 409 then reads recorded stream data in units of stream blocks from set disc 201 to have the start position of that stream block (SOBU) as a start point (step S12).

With the process in step S12, individual transport packets (or application packets) with packet arrival times (or application packet arrival times APAT) are searched, and recovery of packets (playback of their recorded contents) found by search can be done.

The read stream data are transferred from disc drive 409 to separator 425 in decoder unit 402 via D-PRO 410. The transferred stream data are temporarily saved in internal memory 426 in separator 425 (step S13).

When the stream data saved in internal memory 426 of separator 425 have exceeded a given amount, the contents of memory 426 are automatically searched for packets of padding areas (37, 38, and the like in FIG. 1(j)). A padding packet can be detected by checking the substream ID in FIG. 10(c).

If padding packets are found on internal memory 426 of separator 425, padding areas that include the padding packet are erased on internal memory 426 of separator 425 (step S14).

From the stream data from which the padding packets are removed, various headers (pack headers, PES headers, stream block headers, sector data headers, and the like) are erased on internal memory 426 of separator 425. In this way, the stream data on internal memory 426 of separator 425 are converted into sequence information (bitstream) consisting of only time stamps (ATS) and packet data (step S15).

It is then checked if the converted bitstream data need be transferred to an external device (STB 403 or the like in FIG. 7) using a communication line (IEEE1394 serial bus or the like) (step S16).

Checking in step S16 can be done by, e.g., the following method. That is, when the user of the apparatus shown in FIG. 7 selected "YES" on a setup window (not shown) that asked "transfer played-back bitstream to external device? . . . YES/NO" in initial setups of the apparatus, step S16 can be implemented by checking if the "YES" flag is set.

If the stream data played back from information storage medium 201 need be transferred to STB 403 in FIG. 7 (YES in step S16), the played-back stream data are sequentially transferred to STB 403 in synchronism with the timings of time stamps appended to the individual transport streams (step S17). When IEEE1394 is used as transfer means to STB 403, the played-back stream data are converted into the data structure shown in FIG. 8(e) upon transfer.

If no IEEE1394 transfer is required (NO in step S16) or after the IEEE1394 transfer is completed, time stamps (ATS) are erased from the bitstream converted in step S15 to convert the bitstream into a data sequence consisting of only packet data (step S18).

The packet data in the converted data sequence include video packets, sub-picture (SP) packets, audio packets, and the like in correspondence with the contents upon recording. Each data pack including such packets has a pack header, and the type of data (video, sub-picture, audio, or the like) can be discriminated by the stream ID (not shown) in that pack header.

With reference to the contents of the stream ID, each video packet is transferred to video decoder 428 in FIG. 7, each sub-picture packet to SP decoder 429, and each audio packet to audio decoder 430. In this way, the respective decoders (428 to 430) individually decode the corresponding recorded contents (step S19).

When decoding of various kinds of recorded information (video, sub-picture, audio, and the like) has been started individually, video information, sub-picture information, and/or audio information are/is played back (displayed on the monitor TV screen or played back as sounds from the loudspeaker) at predetermined timings on the basis of playback time stamps set in STC (system time counter) 424 in FIG. 7 (step S20).

Note that each playback time stamp in step S20 can use the one (604 in FIG. 10(b)) stored in the PES header exemplified in FIGS. 1, 10, and the like.

Alternatively, as the playback time stamp in step S20, an SCR (system clock reference) base (not shown) in the pack header exemplified in FIG. 8(h) and the like may be used.

Figure 15:
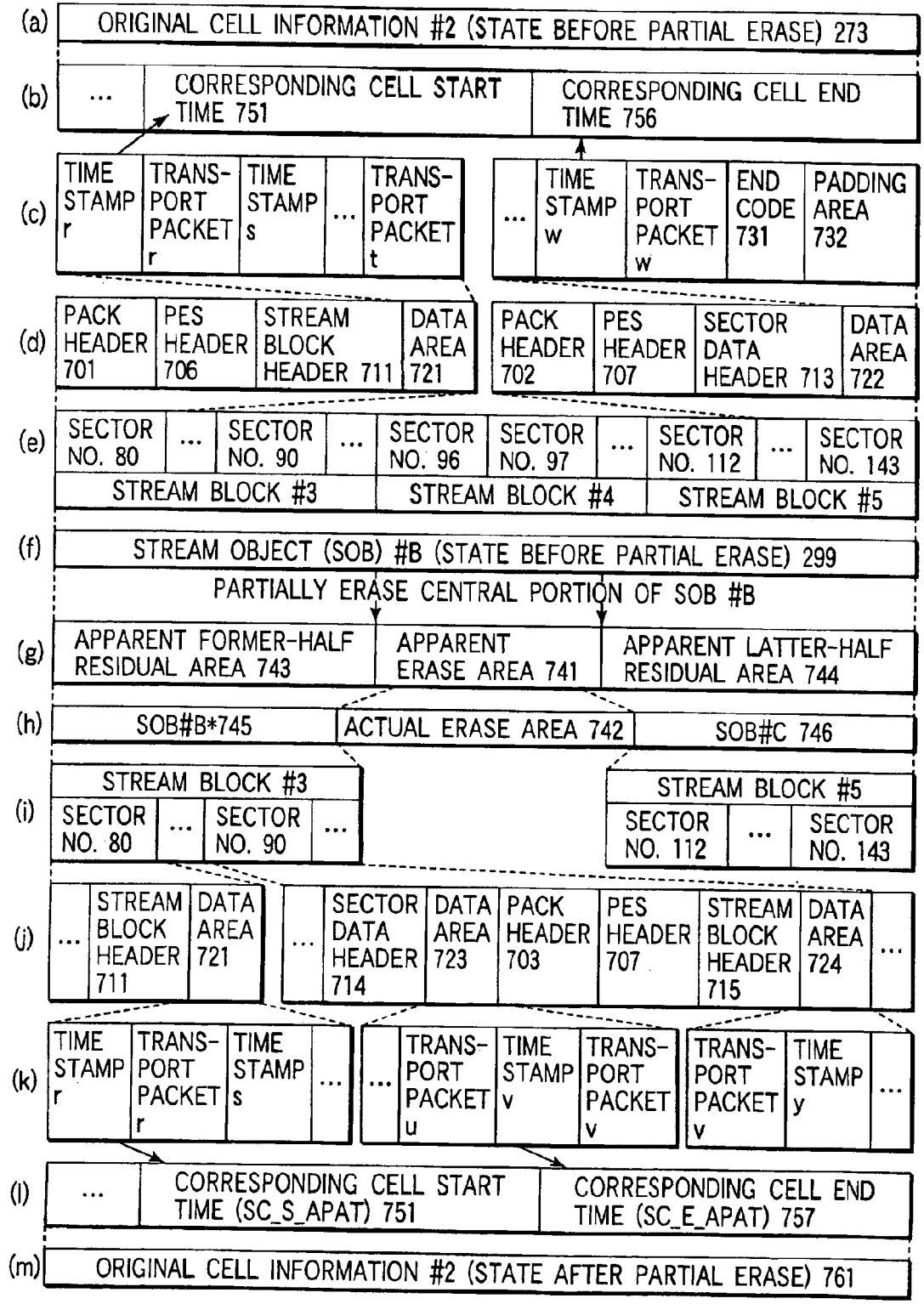
FIG. 15 is a view (example 1) for explaining the partial erase method of stream data according to an embodiment of the present invention.
Figure 16:
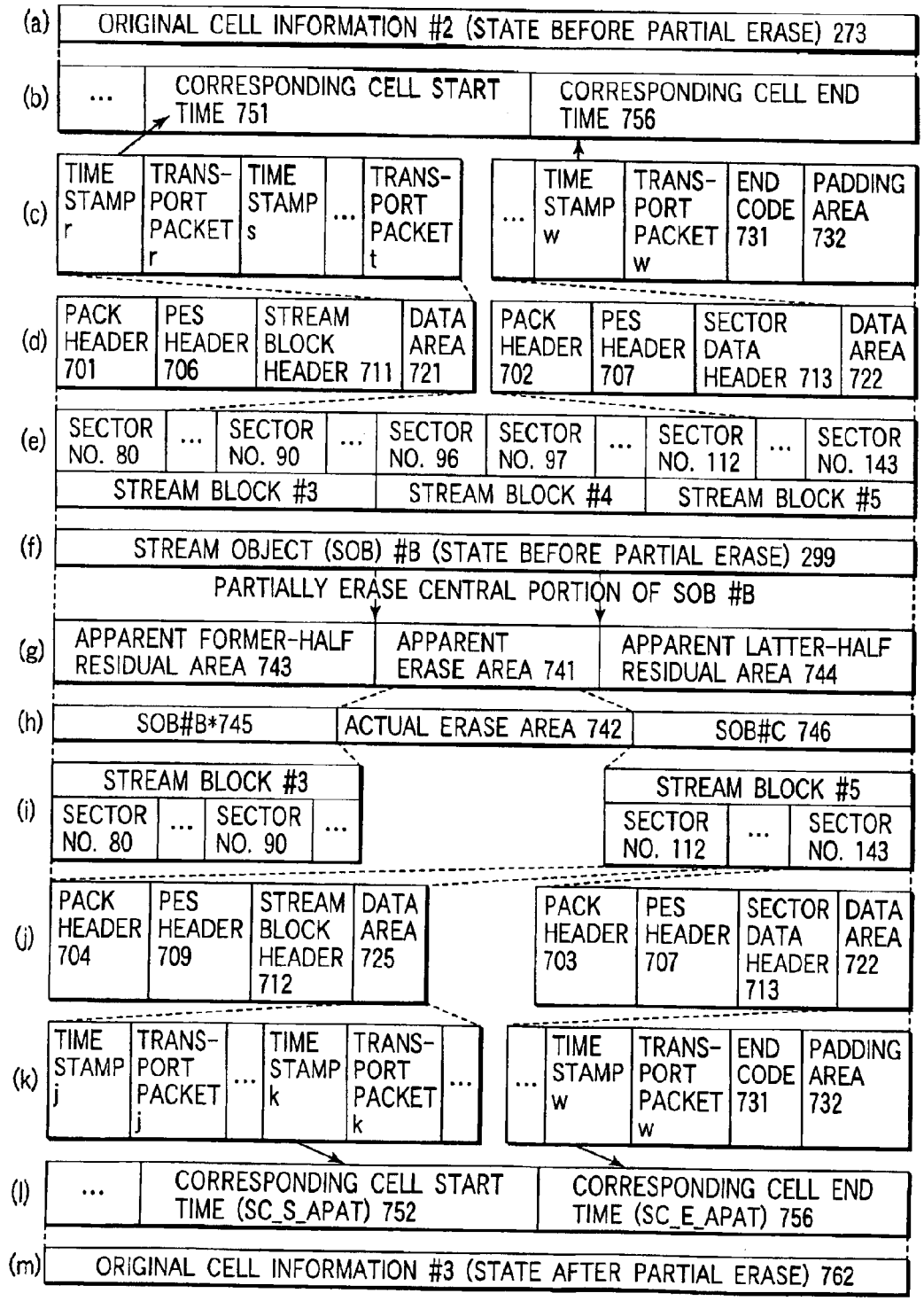
FIG. 16 is a view (example 2) for explaining the partial erase method of stream data according to another embodiment of the present invention.

FIGS. 15 and 16 are views for explaining the stream data partial erase method according to an embodiment of the present invention.

FIG. 15 shows details of apparent former-half residual area 743 after partial erase, and FIG. 16 shows details of apparent latter-half residual area 744 after partial erase.

Figure 22:
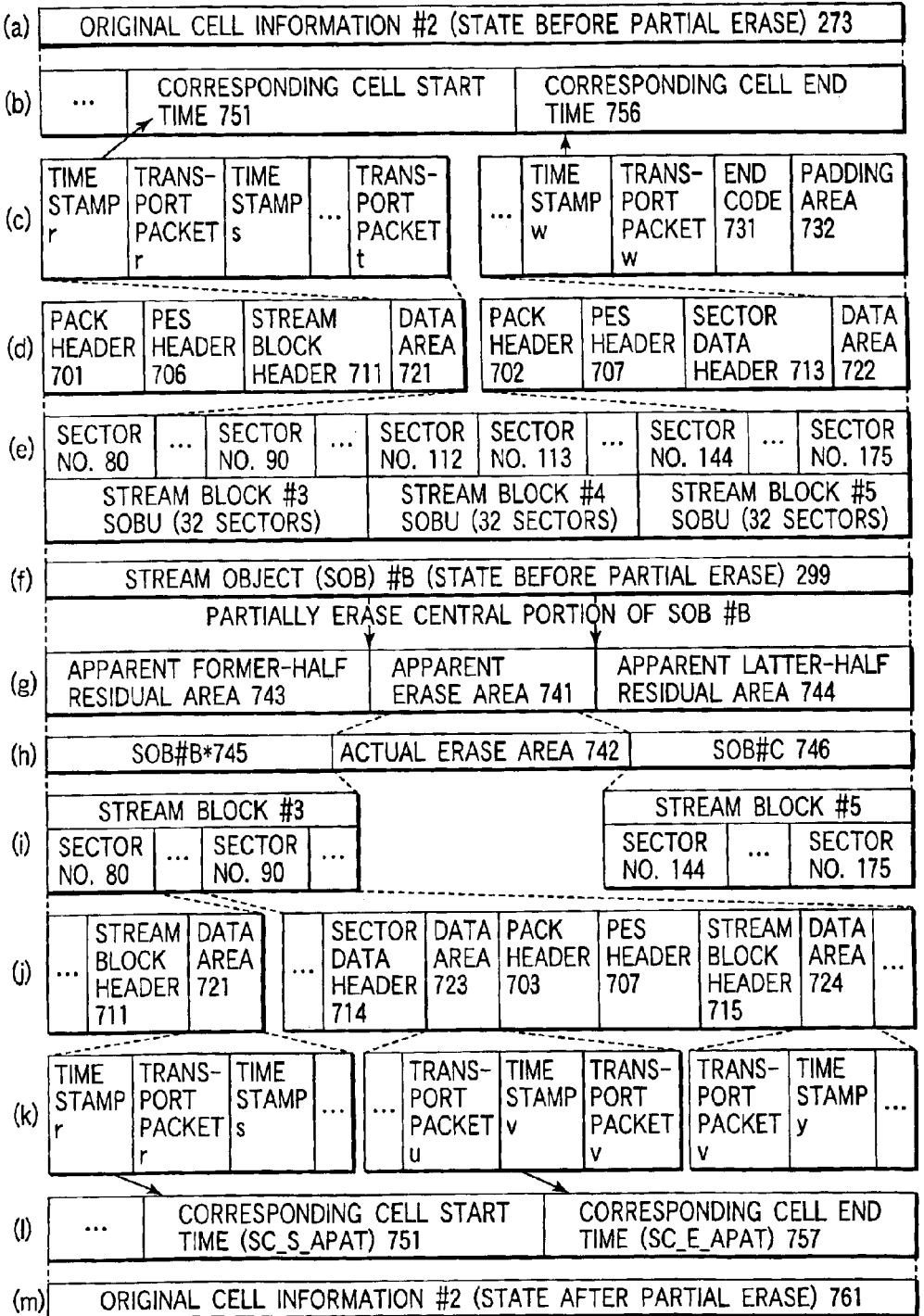
FIG. 22 is a view for explaining, as a modification of FIG. 15, an example of the partial erase method of stream data when all stream blocks are made up of SOBUs each having a constant size (32 sectors=2 ECC blocks)
Figure 24:
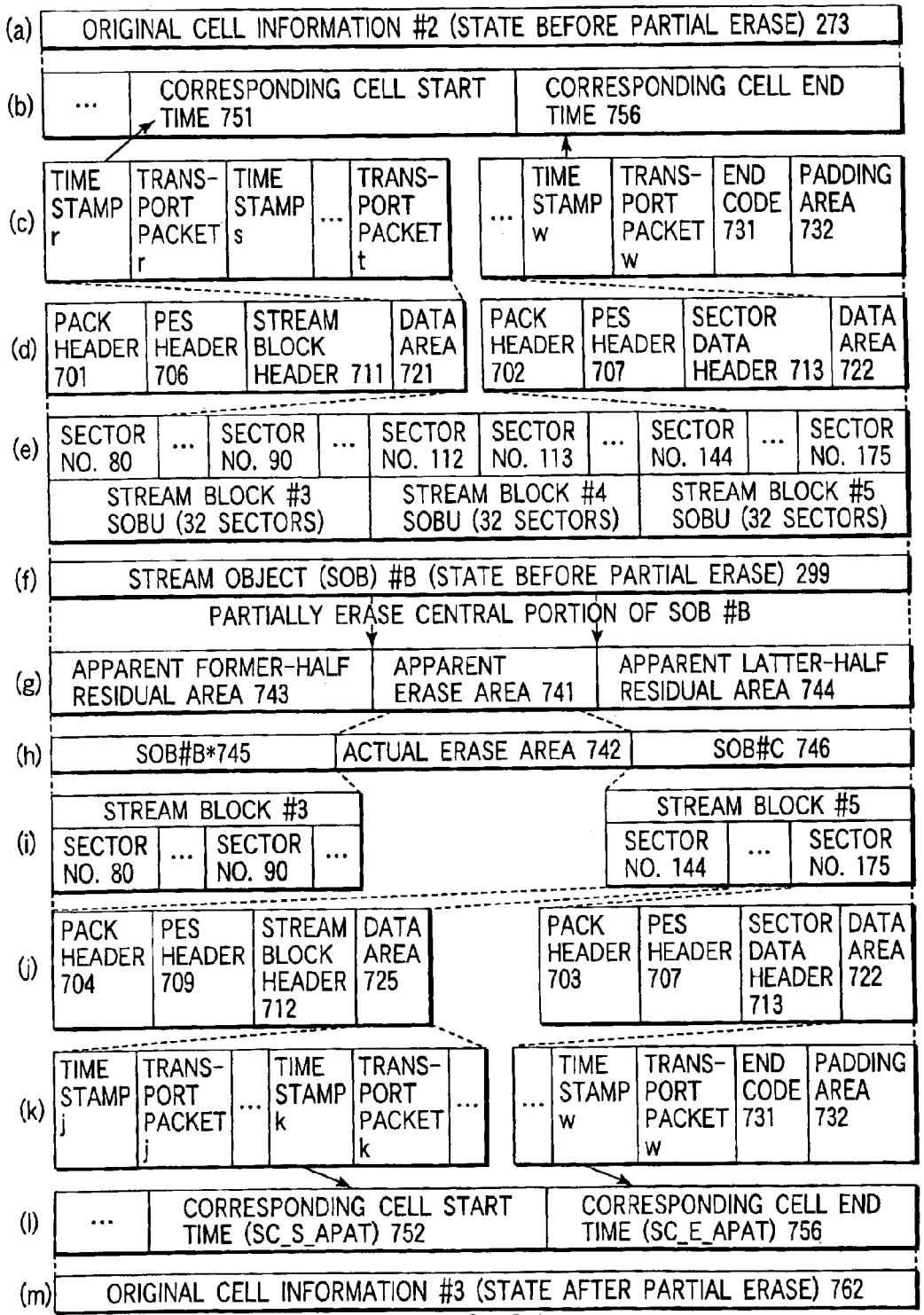
FIG. 24 is a view for explaining, as a modification of FIG. 16, an example of the partial erase method of stream data when all stream blocks are made up of SOBUs each having a constant size (32 sectors=2 ECC blocks)

FIGS. 22 and 24 are views for explaining the stream data partial erase method according to another embodiment of the present invention, and show a case wherein each stream block is made up of stream object units SOBU having a given size (32 sectors 64 kbytes).

FIG. 22 shows details of apparent former-half residual area 743 after partial erase, and FIG. 24 shows details of apparent latter-half residual area 744 after partial erase.

Figure 23:
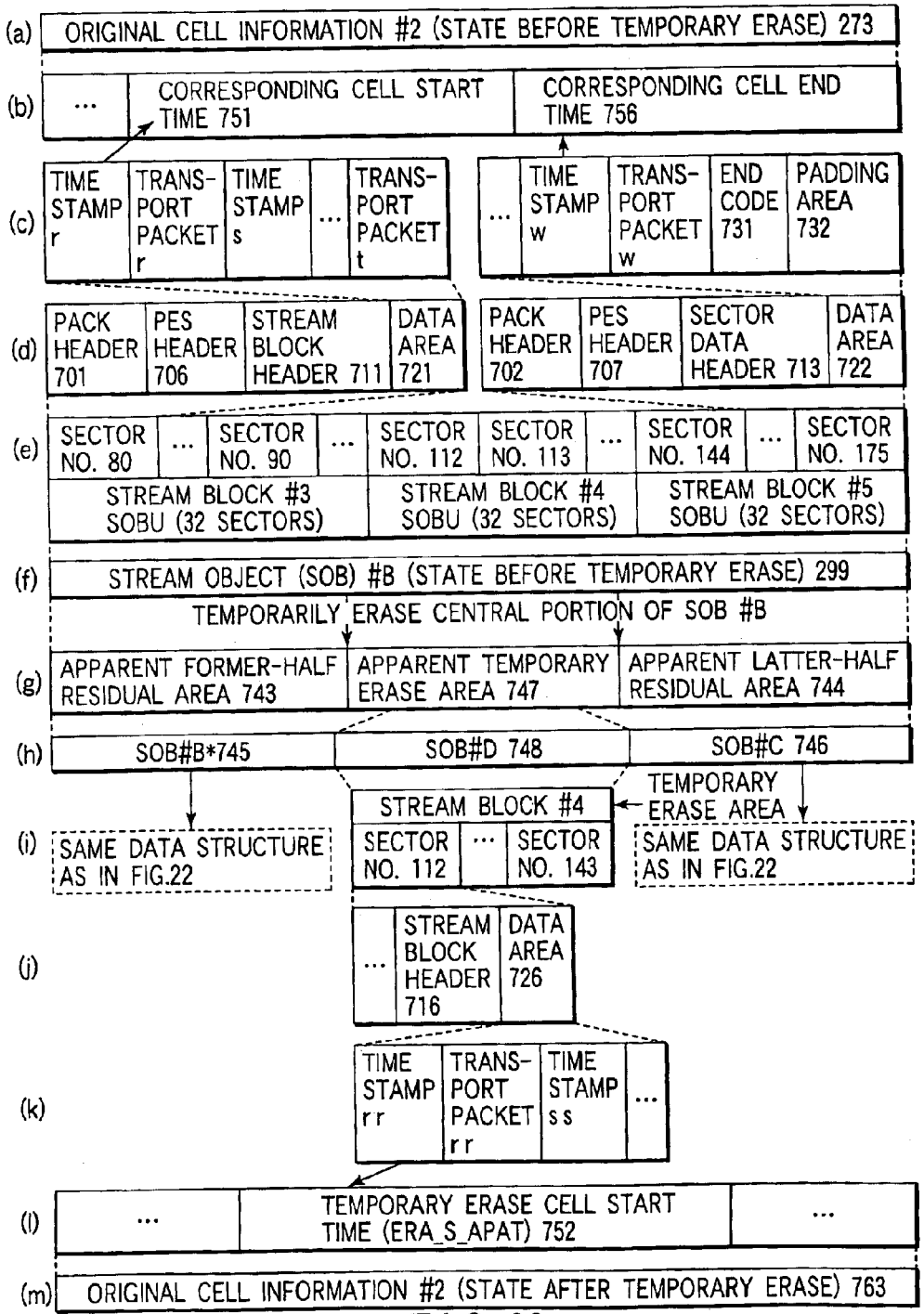
FIG. 23 is a view for explaining, as a modification of FIG. 22, an example of the temporary erase method of stream data when all stream blocks are made up of SOBUs each having a constant size (32 sectors=2 ECC blocks)
Figure 25:
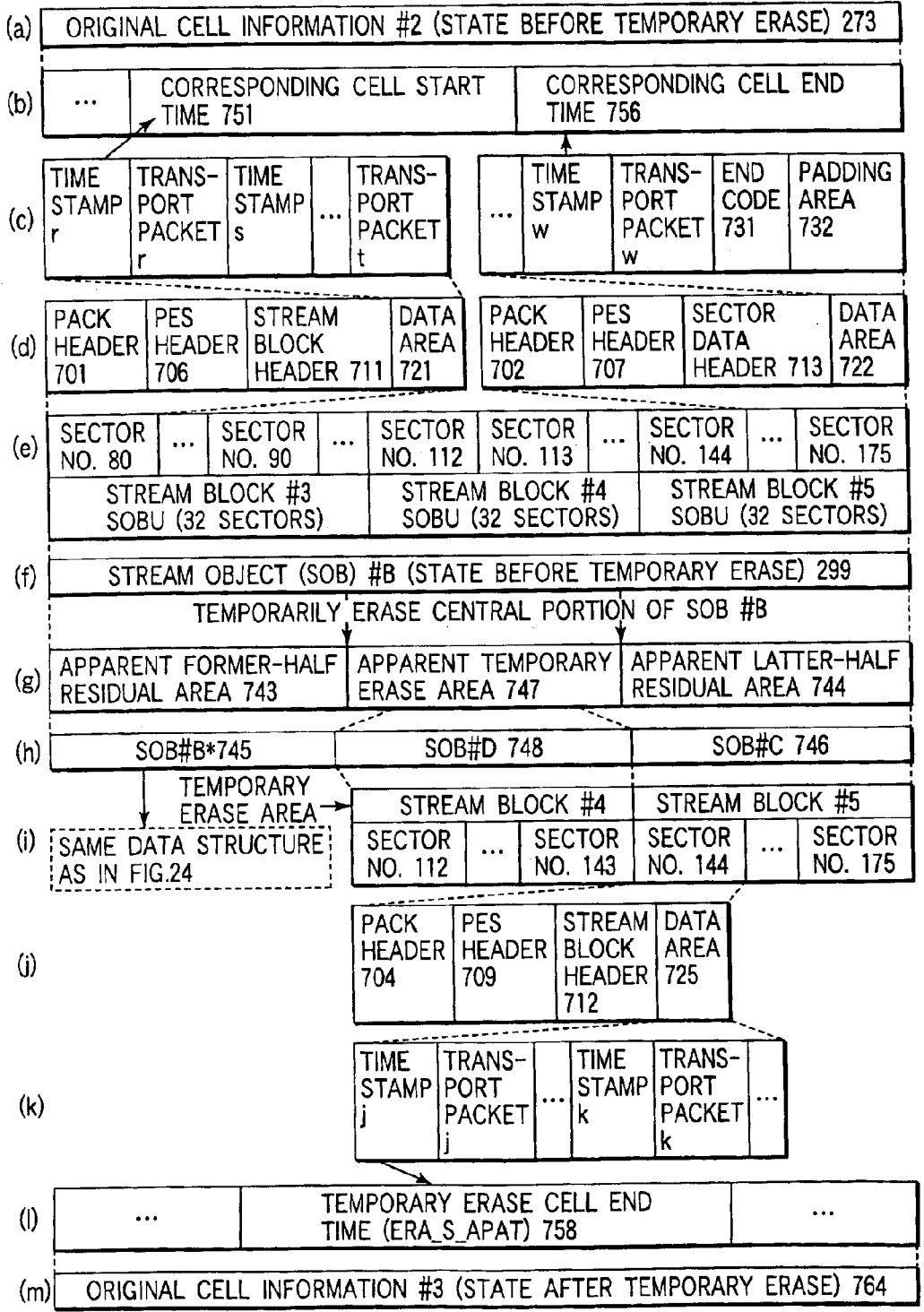
FIG. 25 is a view for explaining, as a modification of FIG. 24, an example of the temporary erase method of stream data when all stream blocks are made up of SOBUs each having a constant size (32 sectors=2 ECC blocks)

Furthermore, FIGS. 23 and 25 are views for explaining the stream data temporary erase method according to another embodiment of the present invention, and show a case wherein each stream block is made up of stream object units SOBU having a given size (32 sectors=64 kbytes).

FIG. 23 exemplifies a data structure when erase areas (741, 742) in FIGS. 22(g) and (h) are temporary erase areas (747, 748). FIG. 25 exemplifies a data structure when erase areas (741, 742) in FIGS. 24(g) and (h) are temporary erase areas (747, 748).

A case will be explained below wherein a portion of stream data already recorded on information storage medium 201 in FIG. 3 or FIG. 7 is partially erased (or temporarily erased).

In the stream data recording/playback apparatus (streamer), a partial erase process (temporary erase process) is executed by control program "stream data partial erase/temporary erase controller" of main MPU 404 in FIG. 7.

In an embodiment of the present invention, data erase (or temporary erase) is always done in units of stream blocks (or SOBUs). Furthermore, the user can flexibly designate a partial erase range (or temporary erase range) using time information (cell start APAT (SC_S_APAT/ERA_S_APAT); cell end APAT (SC_E_APAT/ERA_E_APAT)) that designates the original cell range. This is also a characteristic feature of the present invention.

In an embodiment of the present invention, padding area 36 or 38 is formed at the end of each stream block (or SOBU), as shown in FIG. 1(b) or (j), to inhibit a single transport packet from being recorded across different stream blocks (SOBUs).

With this structure, since the division of a transport packet always matches that of a stream block (SOBU), partial erase in units of stream blocks (SOBUs) can be easily implemented.

Figure 17:
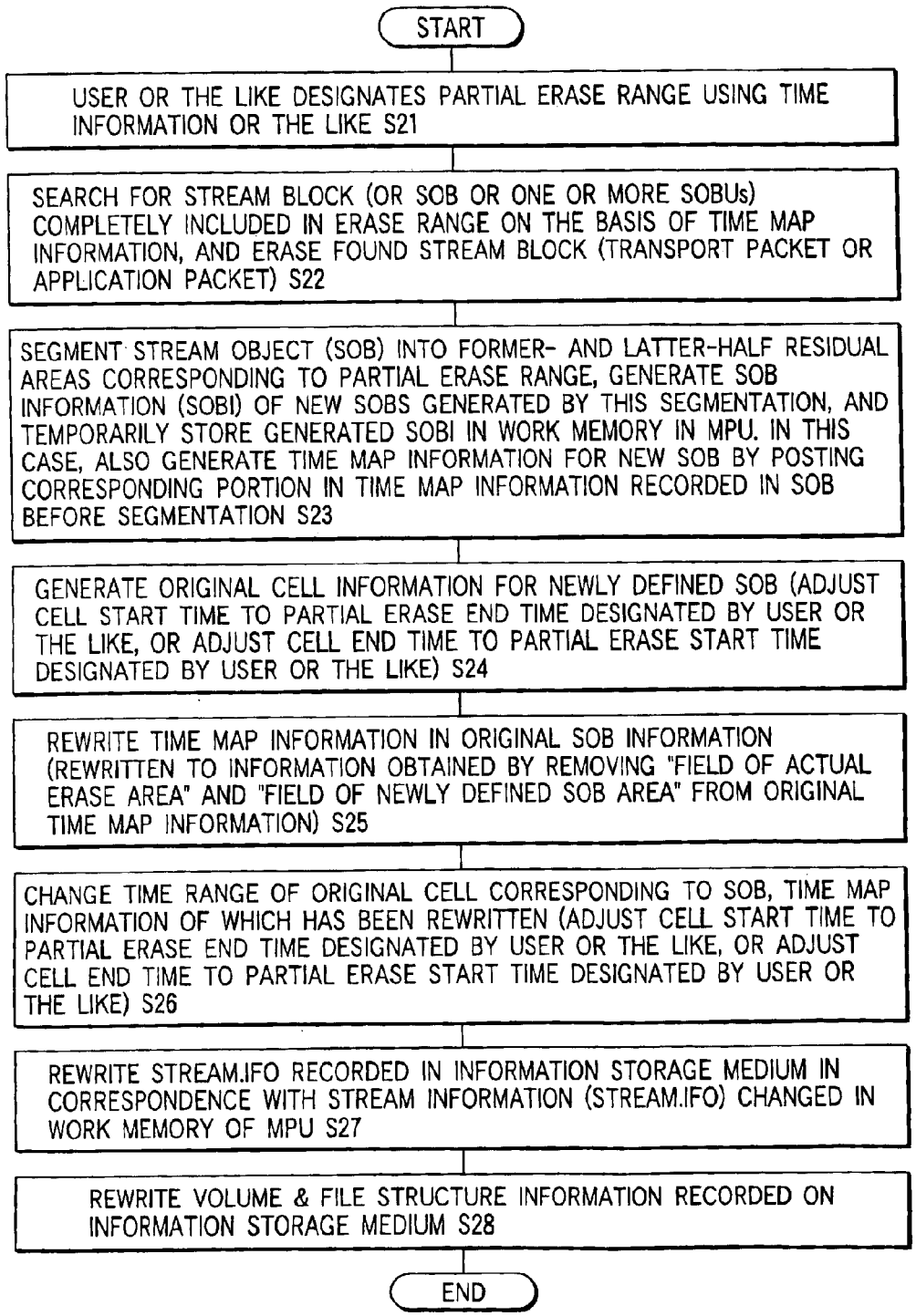
FIG. 17 is a flow chart for explaining the partial erase sequence of stream data according to an embodiment of the present invention.

FIG. 17 is a flow chart for explaining the stream data partial erase sequence (a sequence for completely erasing a portion of recorded information) according to an embodiment of the present invention. Using this flow chart, the temporary erase sequence (a sequence for changing management information as if a portion of recorded information were erased, but leaving an information main body itself without erasing it) will also be explained.

Although not shown in FIG. 17, when the control program "stream data partial erase/temporary erase controller" 404d is started by main MPU 404 in FIG. 7, information of STREAM.IFO 105 (see FIG. 2, FIG. 3(e), and the like) which describes management information that pertains to stream data is read from information storage medium 201 set in disc drive 409 shown in FIG. 7. The read management information is temporary saved in work RAM 404a in main MPU 404.

Information storage medium 201 set in disc drive 409 in FIG. 7 records stream object (SOB) #B·299 as a state before erase (or before temporary erase). A case will be examined below wherein this SOB#B is made up of stream blocks (or SOBUs) #3 to #5, and all transport packets (or application packets) recorded there are ready to be played back.

The erase process in this case makes the following designations as the designation range of original cell information #2·273 (FIG. 3(g); this original cell information is included in a portion of management information STREAM-.IFO 105 temporarily saved in work RAM 404a) corresponding to SOB#B·299:

(1a) the time of time stamp r (indicating the arrival time of transport packet r) corresponding to transport packet r (FIG. 15(k) or FIG. 22(k)) is designated as that of corresponding cell start time 751 (FIG. 15(l) or FIG. 22(l)), and (2a) the time of time stamp w (indicating the arrival time of transport packet w) corresponding to transport packet w (FIG. 16(k) or FIG. 24(k)) is designated as the time of corresponding cell end time 756 (FIG. 16(l) or FIG. 24(l)).

On the other hand, the temporary erase process makes the following designations as the designation range of original cell information #2·273 (FIG. 3(g); a portion of STREAM-.IFO 105) corresponding to SOB#B·299:

(1b) the time of time stamp rr (indicating the arrival time of transport packet rr) corresponding to transport packet r (FIG. 23(k)) is designated as that of corresponding cell start time 752 (FIG. 23(l)), and (2b) the time of time stamp j (indicating the arrival time of transport packet j) corresponding to transport packet j (FIG. 25(k)) is designated as the time of corresponding cell end time 758 (FIG. 25(l)).

In the following description of the partial erase sequence (or temporary erase sequence), changes in contents of STREAM.IFO 105 and STREAM.VRO 106 in FIG. 2 before and after partial erase (before and after temporary erase) will be explained with reference to FIGS. 15, 16, and 22 to 25 as needed.

The partial erase process will be explained first, and the temporary erase process will then be explained.

[Partial Erase]

An explanation of the flow chart in FIG. 17 will be given assuming that a central portion of stream object (SOB) #B·299 shown in FIG. 15(f), FIG. 16(f), FIG. 22(f), or FIG. 24(f) is to be partially erased, and apparent erase area 741 is set, as shown in FIG. 15(g), FIG. 16(g), FIG. 22(g), or FIG. 24(g).

The user or the like designates the partial erase range using time information (partial erase start and end times) or the like (step S21).

With this designation, the range of "apparent erase area 741" shown in FIG. 15(g) and the like is specified. After this erase range designation, apparent former-half residual area 743 and apparent latter-half residual area 744 are left in SOB#B·299 in FIG. 15(f) or the like (see FIG. 15(g), FIG. 16(g), FIG. 22(g), or FIG. 24(g)).

After the range of "apparent erase area 741" is specified in step S21, main MPU 404 that executes stream data partial erase/temporary erase controller 404d in FIG. 7 reads out time map information (252 in FIG. 3(h) or SOBI in FIG. 29 to be described later). Based on the contents of the readout time map information, a stream block (one or plurality of SOBUs or SOB that includes one or more SOBUs; typically, stream block=SOBU) that completely includes the partial erase range designated by the user is searched. The found stream block (in other words, all transport packets or application packets before the erase end position of those included in that SOB) is erased (step S22).

Management information (STREAM.IFO/SR_MANGR.IFO) 105 in FIG. 2 handles the erased stream block (or SOBU) as that which is not present in file STREAM.VRO 106 (that is, the file system ignores the erased stream block/SOBU).

Note that another file present under a directory (a location not managed by management information 105 in, e.g., subdirectory 113 for saving computer data in FIG. 2) other than DVD_RTR directory 102 in FIG. 2 may be recorded at the physical address position on information storage medium 201, where information of the erased stream block/SOBU was recorded. In such case as well, the physical recording location on information storage medium 201 where another file present under subdirectory 113 is recorded is excluded from file STREAM.VRO 106 for reasons attributed to the file system.

The stream object is segmented by former-half residual area 743 and latter-half residual area 744 corresponding to the partial erase range shown in FIG. 15(g) or the like. Subsequently, SOB information (SOBI) for new stream objects (SOB#B*745, SOB#C·746 in FIG. 15(h) or the like) formed by this segmentation is created, and is temporarily stored in work RAM 404a in main MPU 404 in FIG. 7. In this case, time map information for new SOB#B*745 and SOB#C·746 is generated by posting the corresponding location in time map information 252 recorded for SOB#B before segmentation (step S23).

Figure 29:
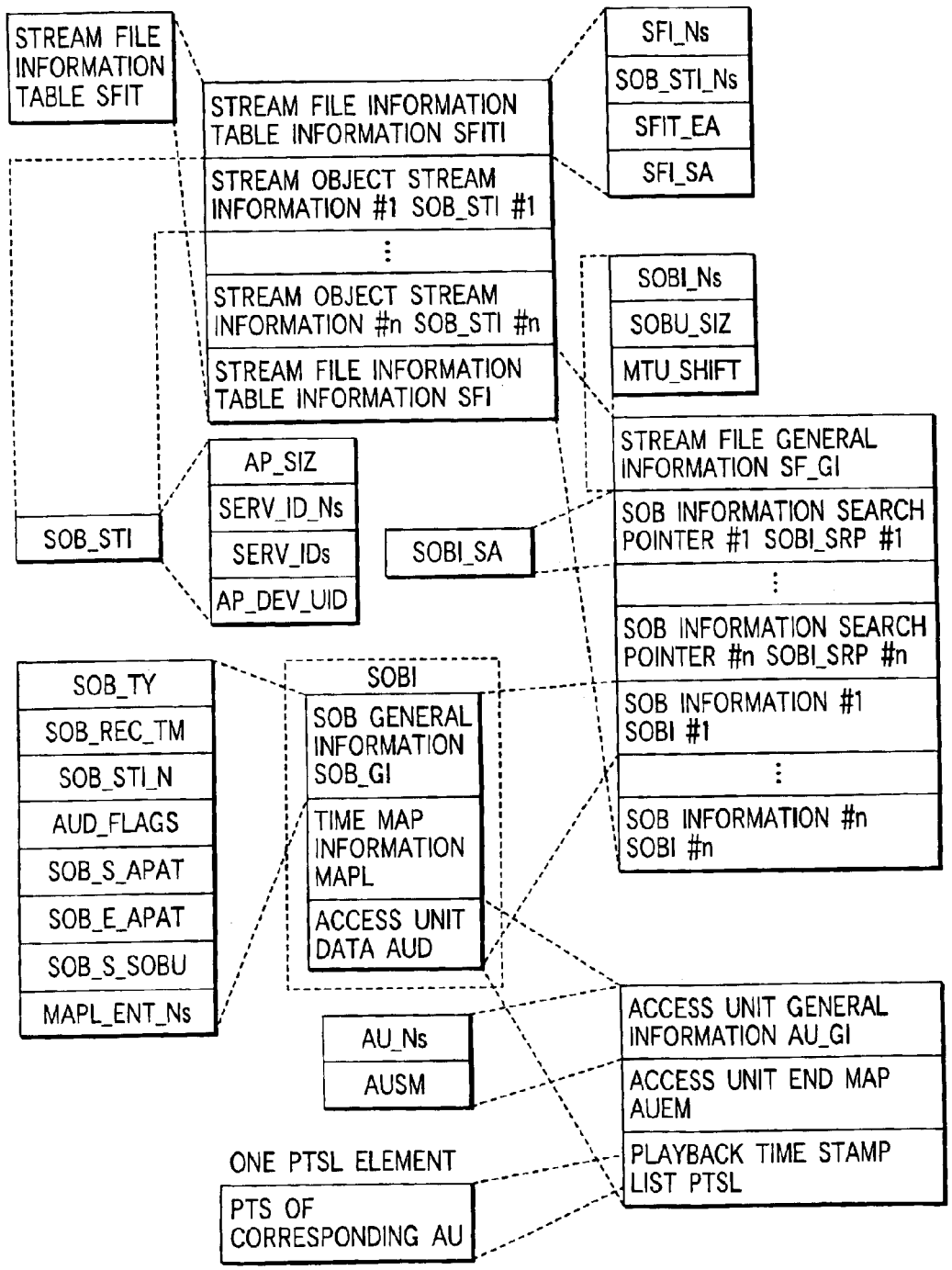
FIG. 29 is a view for explaining the internal data structure of a stream file information table (SFIT in FIG. 3 or FIG. 27)

In the time map information, for example, various kinds of information (261 to 265) shown in FIG. 3(i) or the contents (MAPL, MAPL_ENT_Ns, and the like) of stream object information (SOBI) shown in FIG. 29 are changed (posted/generated) in practice.

When the time map information (MAPL) becomes short due to partial erase, "one or more subsequent SOBIs and all subsequent information tables" that follow the SOBI which includes the short time map information (MAPL) are aligned to the changed (short) SOBI. As a result, a gap can be prevented from being formed between neighboring SOBIs.

Figure 27:
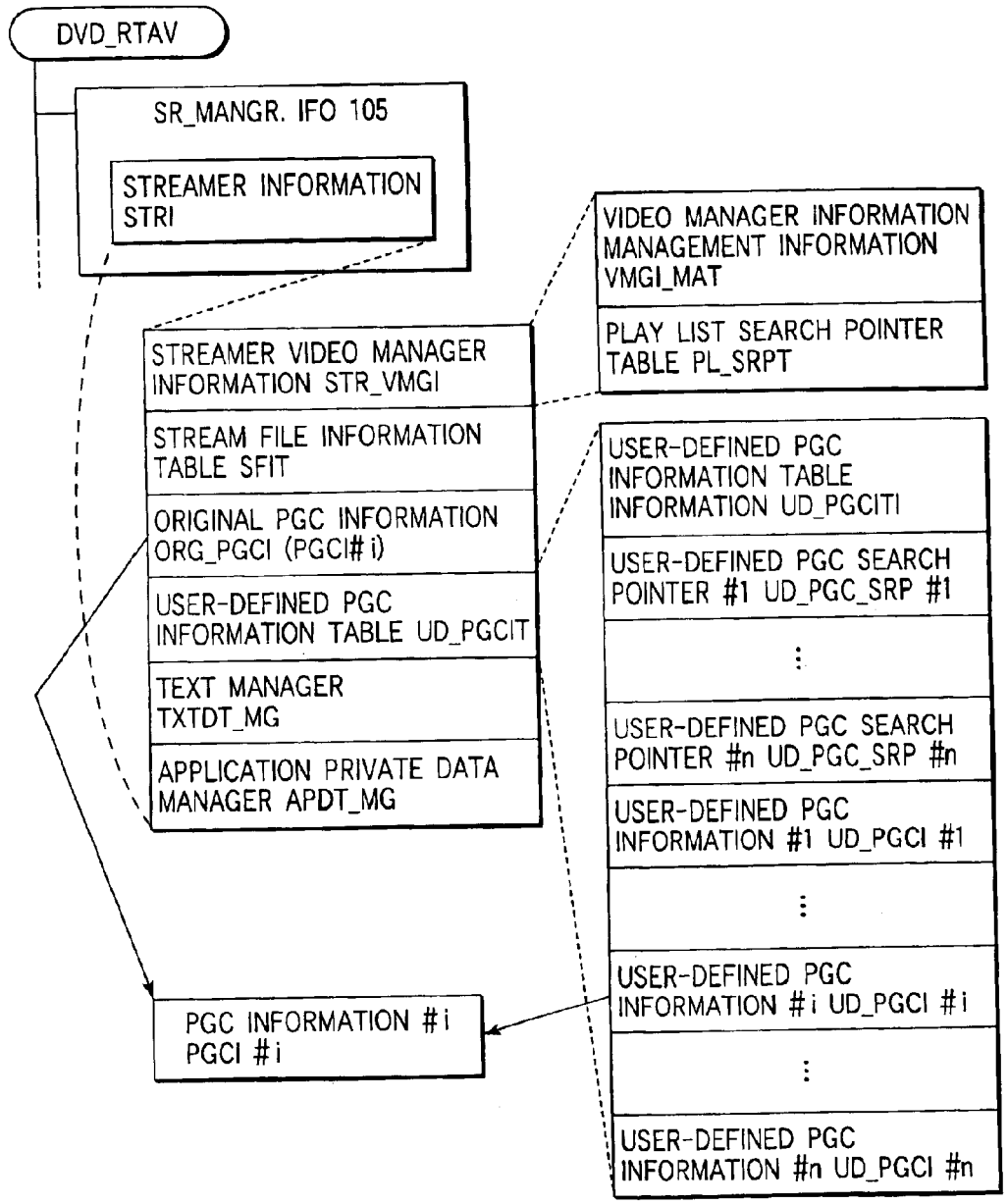
FIG. 27 is a view for explaining the internal data structure of management information (STREAM.IFO or SR_MANGR.IFO in FIG. 2) of the streamer.

In this case, SOBI_SRP# in FIG. 29, a portion of SFIT, STR_VMGI (all start addresses in information tables after SFIT) shown in FIG. 3(f) or FIG. 27, and the like are also corrected in correspondence with the SOBI align.

The processing contents in step S23 will be further explained.

Main MPU 404 in FIG. 7 executes processes in accordance with the sequential program that pertains to stream data partial erase/temporary erase controller 404d, and issues a data read instruction to disc drive 409. In response to this instruction, data ((i) to (l) of FIG. 16 or FIG. 24) of stream block #5 are played back from file STREAM.VRO (or SR_TRANS.SRO) 106 (FIG. 2) that records stream data on information storage medium 201, and are temporarily saved in work RAM 404a in main MPU 404.

Main MPU 404 searches the temporary stored data for a time stamp having a value closest to the start time of apparent latter-half residual area 744 shown in FIG. 16(g) or FIG. 24(g).

When the search result matches or is close to the value of time stamp k in sector No. 112 shown in FIG. 16(i) to (k) (or time stamp k in sector No. 144 shown in FIG. 24(i) to (k)), the value of this time stamp k is set as the value of corresponding cell start time 752 of original cell information #3·762.

The set corresponding cell start time (SC_S_ATAP or the like) 752 is additionally written in management information STREAM.IFO (or SR_MANGR.IFO) 105 temporarily saved in work RAM 404a in main MPU 404.

Likewise, as the value of corresponding cell end time (SC_E_ATAP or the like) 756 of original cell information #3·762, the value of corresponding cell end time 756 of original cell information #2·273 before partial erase is posted.

In the embodiment shown in FIG. 15, FIG. 16, FIG. 22, or FIG. 24, since stream block #4 is completely included in the partial erase range, that portion is substantially erased as actual erase area 742.

At this time, although stream blocks #3 and #5 remain unerased in practice, portions on the tail side and head side of stream blocks #3 and #5 are included in apparent erase area 741 designated by the user, as shown in (e) to (g) of FIG. 15, FIG. 16, FIG. 22, or FIG. 24.

In an embodiment of the present invention, stream object (SOB#B) is segmented and separated in former-half residual area 743 and latter-half residual area 744 for partial erase range 741, and the original cell range is segmented and separated accordingly.

In the embodiment shown in FIG. 15, FIG. 16, FIG. 22, or FIG. 24, the position of stream block #5 is newly defined as stream object #C·746 in correspondence with the segmentation/separation process.

On the other hand, in time map information (its contents are the same as those shown in FIG. 3(i), and correspond to the contents of SOBI shown in FIG. 29) described in stream object information (SOBI) #B·243 (FIG. 3(g)) corresponding to stream object (SOB) #B·299 before erase, the values of the stream block size and stream block time difference remain the same before and after partial erase.

Hence, as shown in step S23 in FIG. 17, this time map information is directly posted as time map information in stream object information #C corresponding to new stream object #C·746 (FIG. 16(h), FIG. 24(h), or the like) created in STREAM.IFO 105.

The display range designated by original cell information #3·762 (FIG. 16(m) or FIG. 24(m)) of newly defined stream object #C·746 matches the range of apparent latter-half residual area 744 designated by the user.

Upon completion of generation of the time map information in the process in step S23, original cell information for the newly defined SOBs (SOB#B*, SOB#C) is generated (step S24).

Upon generation of original cell information, the designation range of corresponding original cell #3·762 (FIG. 16(m) or FIG. 24(m)) is set.

This setup is attained by adjusting the corresponding cell start time to the partial erase end time designated by the user or the like (or by adjusting the corresponding cell end time to the partial erase start time designated by the user or the like).

More specifically, taking a lower illustration in FIG. 31 to be described later as an example, the start time (SC_S_APATk+1) of cell #k+1 of a new SOB after complete erase (after partial erase is completely done) is adjusted to the erase end time (SC_E_APATk+1 of cell #k+1 before complete erase) designated by the user or the like.

Alternatively, the end time (SC_E_APATk) of cell #k after complete erase (cell #k even before complete erase) may be adjusted to the erase start time (SC_S_APATk+1 of cell #k+1 before complete erase) designated by the user or the like.

Figure 31:
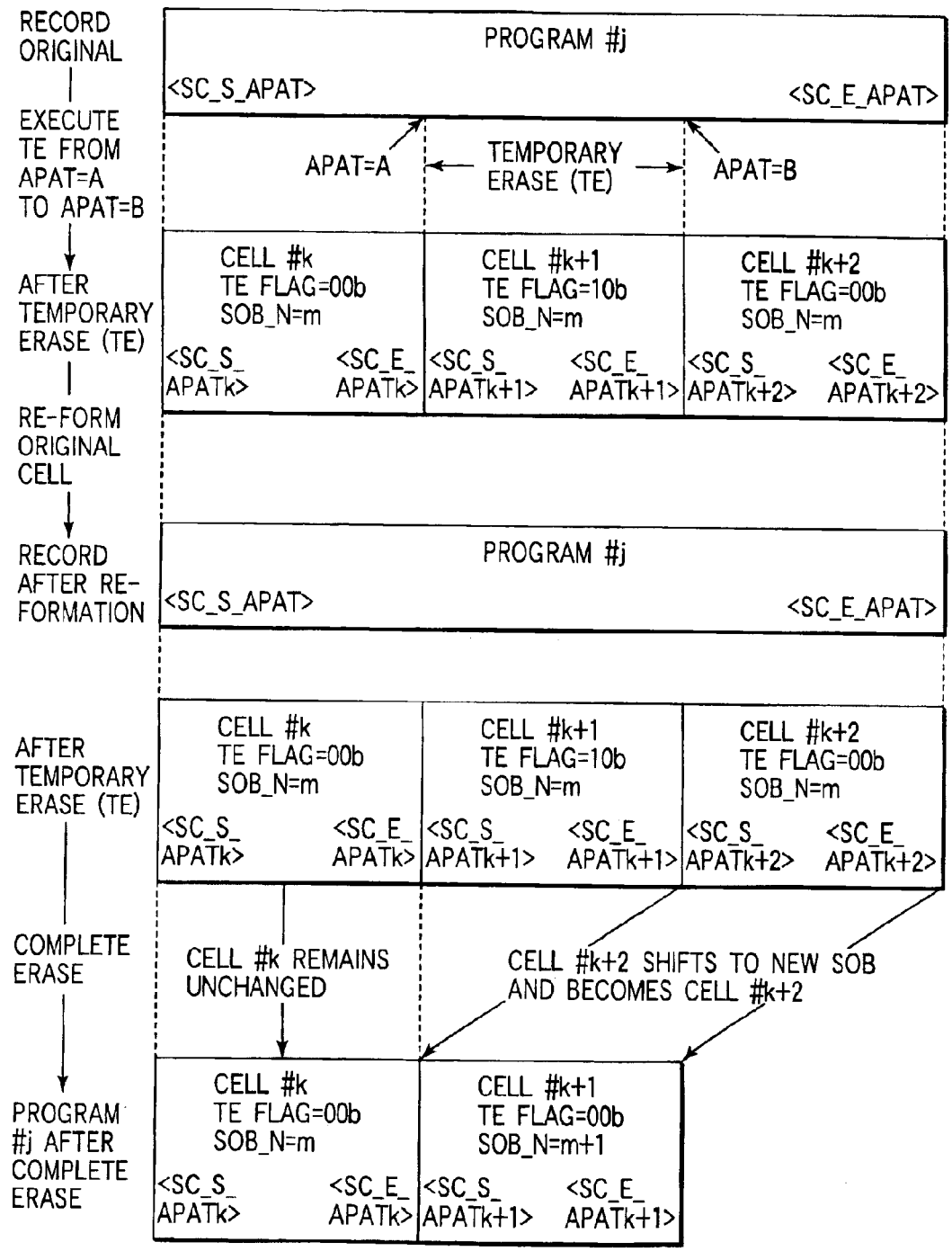
FIG. 31 is a view for explaining an example (part 2) of the relationship between cells and corresponding time information (SC_S_APAT/SC_E_APAT) when certain program #j is partially erased (temporarily and actually erased)

In the lower illustration in FIG. 31, the start time (SC_S_APATk) and end time (SC_E_APATk) of cell #k, which is left unchanged before and after complete erase, remain the same.

With the process in step S24, the aforementioned "SOBI align" is done (thereby preventing a gap from being formed between neighboring SOBIs).

Then, information (time map information and the like) that pertains to original (before erase) stream object information (SOBI#B·243 (FIG. 3(g)) is rewritten (step S25).

More specifically, the contents of the time map information are rewritten by removing a portion of actual erase area 742 (FIG. 16(h) or FIG. 24(h)) and a portion of newly defined SOB area 746 (FIG. 16(h) or FIG. 24(h)) from the original time map information.

This is because a portion of actually erased stream block #4 and information of stream object #5 that belongs to another stream object (SOB#C) must be deleted from the time map information in SOBI#B·243 before partial erase, since stream block #3 alone forms SOB#B*745 (FIG. 15(h) or FIG. 22(h)) after partial erase.

This information delete process corresponds to the information rewrite process in step S25. The delete process is done for management information (STREAM.IFO/SR_MANGR.IFO) 105 temporarily saved in work RAM 404a in main MPU 404 in FIG. 7.

In rewrite of information (time map information and the like) in step S25 as well, the aforementioned "SOBI align" is done (thereby preventing a gap from being formed between neighboring SOBIs).

The information contents of original cell information #2·273 before erase are changed. In this case, the same process as that of generation of original cell information #3·762 in step S24 is done.

The time range of an original cell corresponding to corresponding to the SOB, the time map information of which has been rewritten, is changed (step S26).

This change is attained by adjusting the corresponding cell end time to the partial erase start time designated by the user or the like (or by adjusting the corresponding cell start time to the partial erase end time designated by the user or the like).

More specifically, taking a lower illustration of FIG. 31 to be described later as an example, the end time (SC_E_APATk) of cell k (cell #k even before complete erase) is adjusted to the erase start time (SC_S_APATk+1 of cell #k+1 before complete erase) designated by the user or the like.

Alternatively, the start time (SC_S_APATk+1) of cell #k+1 (cell #k+2 before complete erase) after complete erase may be adjusted to the erase end time (SC_E_APATk+1 of cell #k+1 before complete erase) designated by the user or the like.

Main MPU 404 in FIG. 7 then executes processes in accordance with the sequence program that pertains to stream data partial erase/temporary erase controller 404d, and issues a data read instruction to disc drive 409. In response to this instruction, data ((i) to (l) of FIG. 15 or FIG. 22) of stream block #3 are played back from file STREAM-.VRO (or SR_TRANS.SRO) 106 (FIG. 2) that records stream data on information storage medium 201, and are temporarily saved in work RAM 404a in main MPU 404.

Main MPU 404 searches the temporary stored data for a time stamp having a value closest to the end time of apparent former-half residual area 743 shown in FIG. 15(g) or FIG. 22(g).

When the search result matches or is close to the value of time stamp v in sector No. 90 shown in (i) to (k) of FIG. 15 or FIG. 22, the value of this time stamp v is set as the value of corresponding cell start time 757 (FIG. 15(l) or FIG. 22(l)) of original cell information #2·761 (FIG. 15(m) or FIG. 22(m)) after partial erase.

The value set in this manner is additionally written in management information (STREAM.IFO/SR_MANGR.IFO) 105 temporarily saved in work RAM 404a in main MPU 404.

Since the value (SC_S_APAT) of corresponding cell start time 751 of original cell information #2·761 after partial erase is the same as the value (SC_S_APAT) of corresponding cell start time 751 of original cell information #2·273 before partial erase, that value is left in management information (STREAM.IFO/SR_MANGR.IFO) 105 without being changed.

Upon completion of a series of processes mentioned above, main MPU 404 issues an instruction to disc drive 409 on the basis of information of management information (STREAM.IFO/SR_MANGR.IFO) 105 that has been changed in work RAM 404a in FIG. 7.

In this manner, information of STREAM.IFO/SR_MANGR.IFO 105 on information storage medium 201 is rewritten (step S27).

As a result of this information rewrite, the deleted stream block (SOBU) is ignored from the file system (file system of DVD_RTAV) in FIG. 2.

Finally, information of volume & file structure information 206 (FIG. 3(b)) recorded on information storage medium 201 is rewritten to update file system information (step S28).

The designation range of original cell information that indicates the playback range corresponding to the designation range of stream object information (SOBI) that records the data size and time information (time difference) of each stream block can be set to be equal to or narrower than that designation range (see (f) to (h) of FIG. 15, FIG. 16, FIG. 22, or FIG. 24). In this manner, the user can partially erase recorded SOB information within an arbitrary range apparently smaller than a stream block.

Note that the recorded position (=address information) of a specific stream block can be computed by summing up data sizes in units of stream blocks.

When playback is made from information storage medium 201 that has undergone the aforementioned partial erase process, original cells #2 and #3 are successively played back in single original PGC 290, as shown in FIG. 4.

When the user or the like plays back data from information storage medium 201 that has undergone the partial erase process, playback successively (seamlessly in general) starts from the position of corresponding cell start time 752 in original cell information #3·762 (FIG. 16(m) or the like) immediately after data are played back from corresponding cell start time 751 to corresponding cell end time 757 in original cell information #2·761 (FIG. 15(m) or the like).

[Temporary Erase]

A DVD streamer can implement two types of erase. The first erase process completely erases a portion of a stream, as described above, and the second erase process temporarily erases a portion of a stream, as will be described below (temporary erase; to be abbreviated as TE as needed).

As for temporary erase:

(11) the temporary erase portion of a stream can be completely re-constructed;

(12) the start and end positions of the temporary erase portion can be marked by time information with the precision of an application packet arrival time (APAT) (the user of the streamer cannot recognize internal information such as SOB, SOBU, SOBI/MAPL, and the like, but can recognize the recording time. Hence, the user can mark the temporary erase range, i.e., the start and end positions of the temporary erase portion on the basis of time); and

(13) during recording, the format of the streamer can completely erase the temporary erase portion regardless of the contents of the stream (thereby recycling the temporary erase portion in real time).

(11) to (13) mentioned above can be implemented using protect flag TE (FIG. 28) included in stream cell information SCI (FIG. 28) in an original PGC (not a user-defined PGC) shown in FIG. 3(f), FIG. 4, FIG. 27, or FIG. 32.

An explanation of the flow chart in FIG. 17 will be given assuming that a central portion of stream object (SOB) #B·299 shown in FIG. 23(f) or FIG. 25(f) is to be temporarily erased, and temporary erase area 747 is set, as shown in FIG. 23(g) or FIG. 25(g).

In the temporary erase process, the sequence of the processing contents is the same as that in the partial erase process if "partial erase range" or "erase range" in steps S21 to S23 in FIG. 17 is changed to read "temporary erase range". Also, the processing sequence in steps S27 and S28 in FIG. 17 in the temporary erase process is the same as that in the partial erase process.

The temporary erase sequence in steps S24 to S26 in FIG. 17 will be described below with reference to FIGS. 23 and 25.

Upon completion of generation of the time map information in the process in step S23, original cell information for the newly defined SOBs (SOB#B*, SOB#C) is generated (step S24).

Upon generation of original cell information, the designation range of the corresponding original cell is set.

More specifically, taking an illustration in FIG. 30(b) to be described later as an example, the start time of cell #k+1 set with temporary erase flag TE="10b" is the temporary erase start time (ERA_S_APAT; temporary erase start mark) designated by the user or the like. On the other hand, the end time of cell #k+1 set with temporary erase flag TE="10b" is the temporary erase end time (ERA_E_APAT; temporary erase end mark) designated by the user or the like.

Alternatively, taking an upper illustration in FIG. 31 to be described later as an example, the start time of cell #k+1 set with temporary erase flag TE="10b" is SC_S_APATk+1, and the end time of this cell #k+1 is SC_E_APATk+1.

Then, information (time map information and the like) that pertains to the original (before temporary erase) stream object information (SOBI) is rewritten by the same method as in partial erase mentioned above (step S25).

In this temporary erase, data itself to be temporarily erased is not erased but management information of data to be erased is merely rewritten to indicate a "temporary erase"

state. However, when data to be temporarily erased (data of cell #k+1 in the example in FIG. 30(*b*) or the upper illustration in FIG. 31) is completely erased, the following process is executed.

The time range of an original cell corresponding to the SOB, the time map information of which has been rewritten, is changed (step S26).

More specifically, taking an illustration in FIG. 30 to be described later as an example, the start time (ERA_S_APAT) of temporary erase cell #k+1 in FIG. 30(*b*) is adjusted to the end time (SC_E_APAT) of cell #k after complete erase in FIG. 30(*c*), and the end time (ERA_E_APAT) of temporary erase cell #k+1 in FIG. 30(*b*) is adjusted to the start time (SC_S_APAT) of cell #k+1 after complete erase in FIG. 30(*c*).

The aforementioned temporary erase process can be summarized as follows.

(a) A temporary erase range for a portion (temporary erase area 747 in FIG. 23 or FIG. 25) of bitstream information included in a stream object (SOB) is designated by the temporary erase start time (ERA_S_APAT) and temporary erase end time (ERA_E_APAT) (to change "partial erase range" in step S21 to read "temporary erase range").

When the start time (SC_S_APAT) matches the head position of a transport packet (application packet) that starts in a stream block (SOBU), a temporary erase start time (ERA_S_APAT) is adjusted to the start time of the first one of transport packets (application packets) that start within the stream block (SOBU) which includes the transport packet (application packet) with the start time (SC_S_APAT) (change "partial erase" to read "temporary erase" in step S26). Then, streamer information (STREAM.IFO/STRI) is rewritten (step S27).

(b) Alternatively, a temporary erase range for a portion (temporary erase area 747 in FIG. 23 or FIG. 25) of bitstream information included in a stream object (SOB) is designated by the temporary erase start time (ERA_S_APAT) and temporary erase end time (ERA_E_APAT) (change "partial erase range" to read "temporary erase range" in step S21).

When a cell (TE cell) corresponding to a portion where the temporary erase range is designated includes the head position of a stream object (SOB), the temporary erase start time (ERA_S_APAT) is adjusted to the start time (SC_S_APAT) of the first one of transport packets (application packets) that start within the stream block (SOBU) which includes the transport packet (application packet) with the start time (SC_S_APAT) (change "partial erase" to read "temporary erase" in step S26). Then, streamer information (STREAM.IFO/STRI) is rewritten (step S27).

(c) Alternatively, a temporary erase range for a portion (temporary erase area 747 in FIG. 23 or FIG. 25) of bitstream information included in a stream object (SOB) is designated by the temporary erase start time (ERA_S_APAT) and temporary erase end time (ERA_E_APAT) (change "partial erase range" to read "temporary erase range" in step S21).

Figure 30:
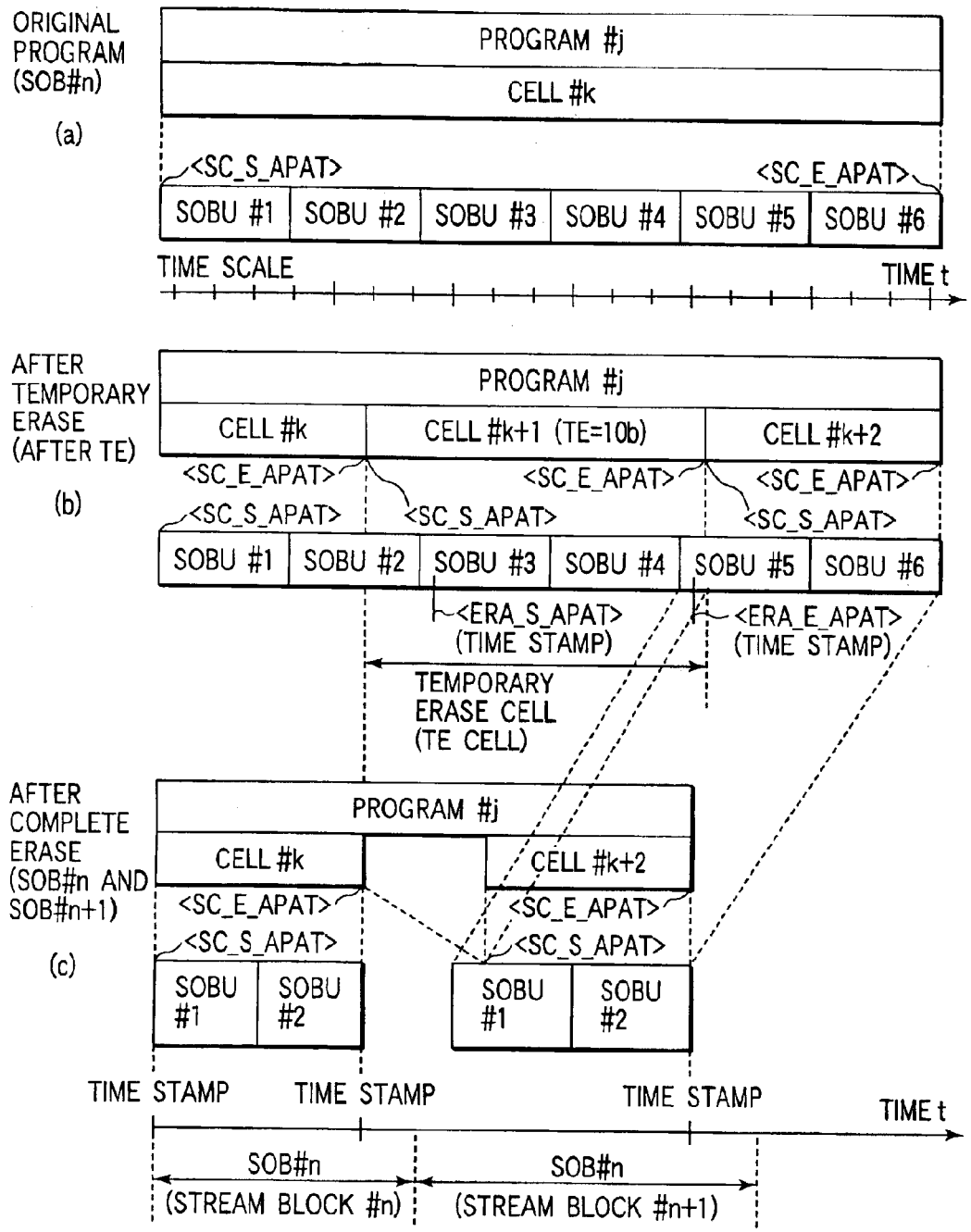
FIG. 30 is a view for explaining an example (part 1) of the relationship between cells and corresponding time information (SC_S_APAT/SC_E_APAT; ERA_S_APAT/ERA_E_APAT) when certain program #j is partially erased (temporarily and actually erased)

The temporary erase start time (ERA_S_APAT) is adjusted to the start time (SC_S_APAT) of the first one of transport packets (application packets) that start within another stream block (SOBU#2 in FIG. 30(*b*)) immediately followed by a stream block (SOBU#3 in FIG. 30(*b*)) including a transport packet (application packet) with the start time (SC_S_APAT) (change "partial erase" to read "temporary erase" in step S26). Then, streamer information (STREAM.IFO/STRI) is rewritten (step S27).

(d) Alternatively, a temporary erase range for a portion (temporary erase area 747 in FIG. 23 or FIG. 25) of bitstream information included in a stream object (SOB) is designated by the temporary erase start time (ERA_S_APAT) and temporary erase end time (ERA_E_APAT) (change "partial erase range" to read "temporary erase range" in step S21).

The temporary erase start time (ERA_E_APAT) is adjusted to the start time (SC_S_APAT) of the first one of transport packets (application packets) which start within a stream block (SOBU#1 of cell #k+1 in FIG. 30(*c*)) including a transport packet (application packet) which immediately follows the cell (TE cell) corresponding to the portion where the temporary erase range is designated (change "partial erase" to read "temporary erase" in step S26). Then, streamer information (STREAM.IFO/STRI) is rewritten (step S27).

Figures 18, 19:
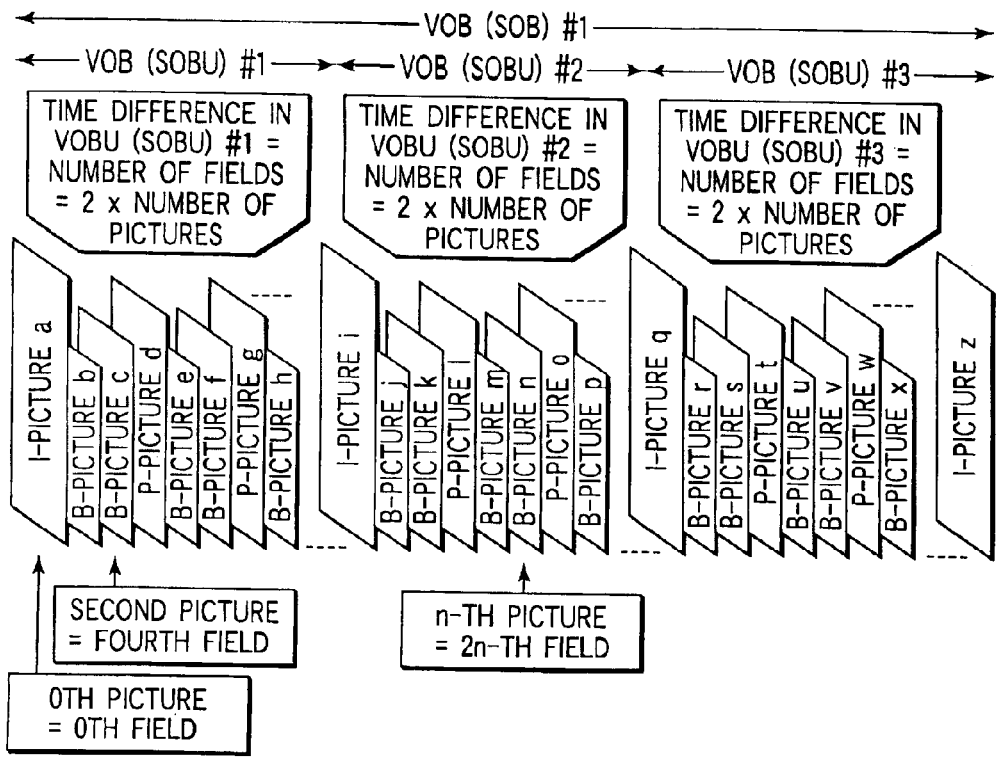
FIG. 18 is a view for explaining the time management information setting method for MPEG-encoded video data (before partial or temporary erase)
FIG. 19 is a view for explaining the relationship between time information and field information in original cell information (before partial or temporary erase) corresponding to the video data shown in FIG. 18.

FIG. 18 is a view for explaining the time management information setting method for MPEG-encoded video data (before partial erase or temporary erase).

FIG. 19 is a view for explaining the relationship between the time information and field information in original cell information (before partial erase or temporary erase) corresponding to the video information shown in FIG. 18.

In the aforementioned embodiment, practical partial erase is done in units of stream blocks which are segmented into specific data sizes (e.g., 32 sectors/64 kbytes), and a minute apparent partial erase range can be defined by the original cell range.

However, the present invention is not limited to this. The present invention can be applied to every methods for segmenting and managing specific data such as video data into units or blocks, erasing data in units of such units or blocks, and "capable of designating a minute playback range by the user" by range designation of playback information (cell or the like).

For example, in RTR.IFO 104 (FIG. 2) as a management information file that manages video information recorded by MPEG2, a given I-picture unique to moving picture compression of MPEG2 to data before the next I-picture are handled as a unit, as shown in FIG. 18. This unit is called a video object unit (VOBU). This VOBU can be considered in correspondence with a stream object unit (SOBU).

In the NTSC TV standards, approximately 30 images (frames) are displayed per second. Each image is called a picture, and one picture is expressed by two field scans (odd and even field scans) in the interlace method.

The streamer uses time stamp information that records the arrival time information of stream data at a receiver as time information. However, in an embodiment of the present invention, time information can also be expressed by the number of fields counted from first I-picture a shown in FIG. 18.

The time map information in this embodiment is managed as a unit for each VOBU (or SOBU). For example, the data size of one VOBU (or SOBU) corresponds to stream block size 262 in FIG. 3(*i*). Also, the number of fields included in one corresponding VOBU (or SOBU) represents time information corresponding to stream block time difference 263.

At this time, information of each of corresponding cell start time (SC_S_APAT or ERA_S_APAT) 735 and corresponding cell end time (SC_E_APAT or ERA_E_APAT) 758 in information (SCI in FIG. 28) 763 (FIG. 19) of original cell #1 can be expressed by the number of fields counted from first I-picture a in FIG. 18.

For example, time information of the n-th picture in FIG. 18 can be expressed as the 2n-th field.

Figures 20, 21:
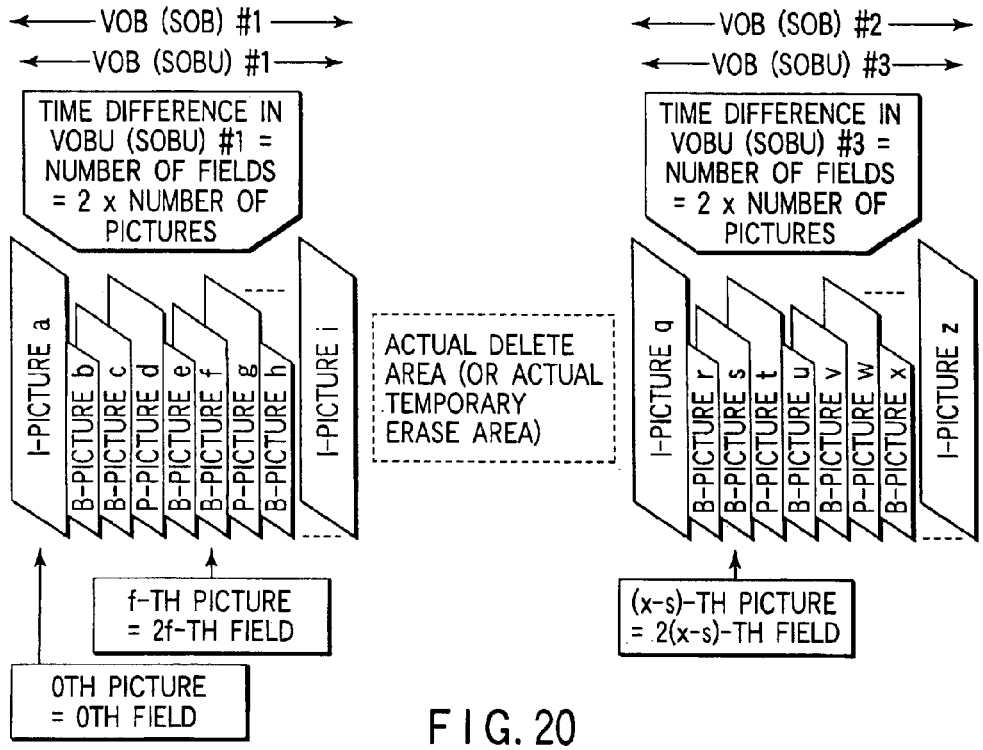
FIG. 20 is a view for explaining the time management information setting method for MPEG-encoded video data (after partial or temporary erase)
FIG. 21 is a view for explaining the relationship between time information and field information in original cell information (after partial or temporary erase) corresponding to the video data shown in FIG. 20.

FIG. 20 is a view for explaining the time management information setting method for MPEG-encoded video data (after partial erase or temporary erase).

FIG. 21 is a view for explaining the relationship between the time information and field information in original cell information (after partial erase or temporary erase) corresponding to the video data shown in FIG. 20.

When the video information shown in FIG. 18 has undergone a partial erase process, only VOBU#2 (SOBU#2) is substantially partially erased, as shown in FIG. 20. The minute partial erase range designated by the user or the like can be defined by setting the cell range as in partial erase of stream data that has been explained above with reference to FIG. 15 and the like.

More specifically, when the user or the like designates partial erase from B-picture f to B-picture s, VOBU#2 (SOBU#2) included in this designated partial erase range is completely erased. At this time, VOBU#1 (SOBU#1) and VOBU#3 (SOBU#3) only partially included in the designated partial erase range substantially remain in units of VOBUs (SOBUs).

As in stream data, a VOB (or SOB) is segmented into VOB#1 (SOB#1) and VOB#2 (SOB#2) before and after the partially erased portion. A cell before partial erase is segmented into original cells #1 and #2 in correspondence with this segmentation.

At this time, as shown in FIG. 21, the (2f)-th field corresponding to B-picture f can be designated as corresponding cell end time (SC_E_APAT or ERA_E_APAT) of information (SCI) 764 of original cell #1, and the 2(s-q)-th field corresponding to B-picture s can be designated as corresponding cell start time (SC_S_APAT or ERA_S_APAT) 754 of information (SCI) 765 of original cell #2.

For example, the time information of the f-th picture in FIG. 20 can be expressed as the 2f-th field.

In the embodiment shown in FIGS. 20 and 21, the number of fields is always expressed by that counted from the first picture of a VOB in units of VOBs (SOBs). Furthermore, a corresponding VOB (SOB) can be designated by the number of fields in cell information (SCI). This is a characteristic feature of this embodiment.

Figure 26:
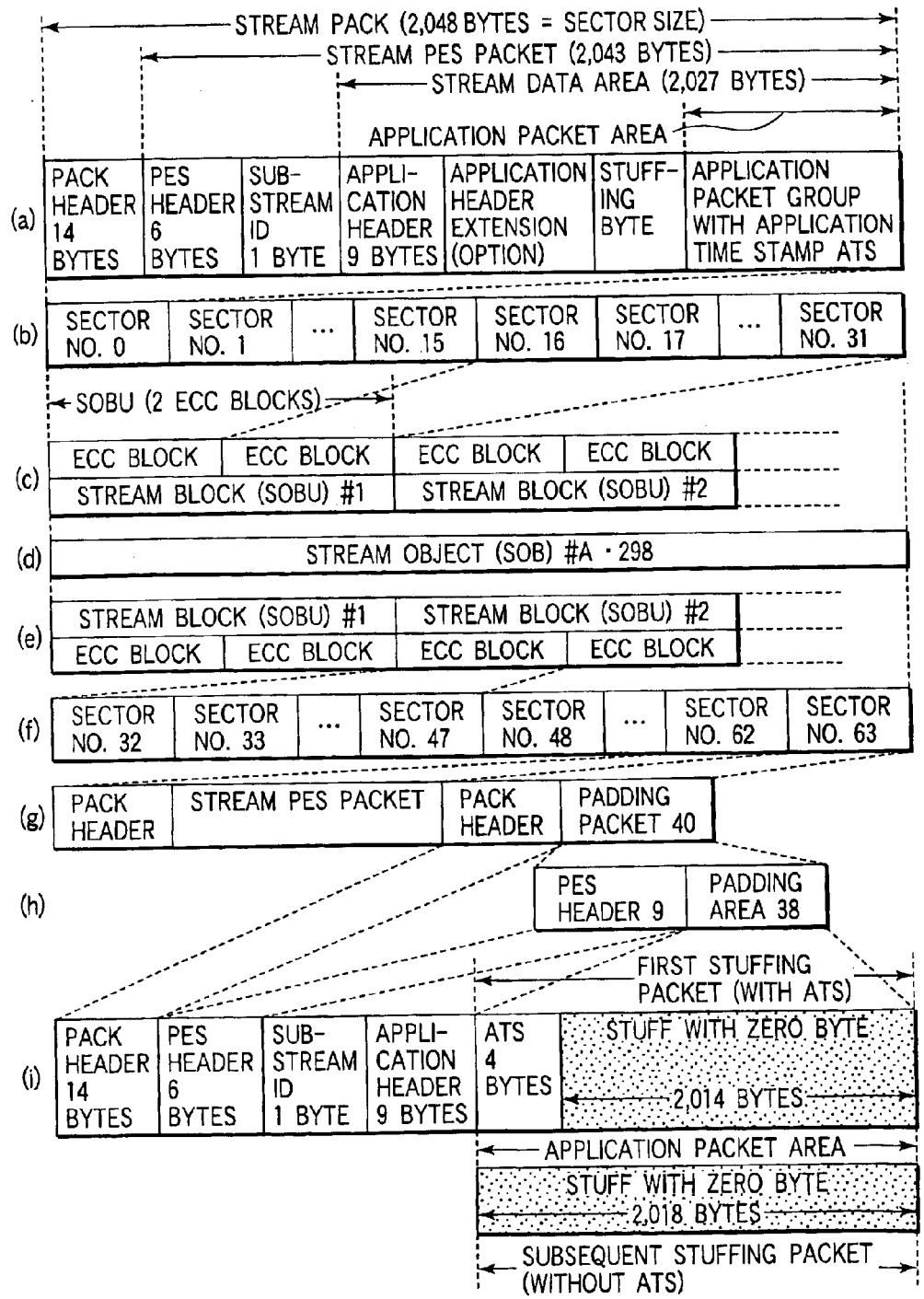
FIG. 26 is a view for explaining an example of the internal structure (a stream pack containing application packets and a stream pack containing stuffing packets) of a sector that forms a stream block (SOBU)

FIG. 26 is a view for explaining an example of the internal structure of a sector (a stream pack including an application packet and a stream pack including a stuffing packet) that form a stream block (SOBU).

Stream object (SOB) #A·298 in FIG. 26(d) is made up of a plurality of stream blocks #1, #2, . . . , as shown in FIGS. 26(c) and (e).

All stream blocks #1, #2, . . . are formed of stream object units (SOBU) each having a 2-ECC block size (=32 sectors= 64 kbytes).

In this manner, even when stream block (SOBU) #2 is deleted, an ECC block of stream block (SOBU) #1 is not influenced by this deletion.

First stream block (SOBU) #1 of SOB#A·298 is made up of sectors No. 0 to No. 31 (32 sectors/64 kbytes), as shown in FIG. 26(b).

Each sector of stream block (SOBU) #1 has a similar data structure. For example, sector No. 0 has a data structure, as shown in FIG. 26(a).

More specifically, sector No. 0 consists of a 2,048-byte (2-kbyte) stream pack, which is made up of a 14-byte pack header and 2,034-byte stream PES packet.

The stream PES packet is comprised of a 6-byte PES header, 1-byte substream ID, and 2,027-byte stream data area.

The stream data area consists of a 9-byte application header, application header extension (option), stuffing byte (option), and application packet area.

The application packet area is made up of a group of application packets each having an application time stamp (ATS) at its head position.

For example, when a transport packet having a 188-byte size is stored as an application packet in the application packet area, approximately 10 application packets can be stored in the application packet area.

In stream recording, an application that generates recording contents makes stuffing by itself to obviate the need for independent adjustment of the pack length. For this reason, in stream recording a stream pack can always have a required length (e.g., 2,048 bytes).

The stuffing byte in FIG. 26(a) is used to maintain the predetermined length (2,048 bytes) of a stream pack.

In stream recording, the first byte of application time stamp ATS of the first application packet must be aligned to the start position of the application packet area in the first stream pack at the beginning of stream object SOB.

On the other hand, as for the subsequent stream packet in the SOB, an application packet may be segmented (split) at the boundary of neighboring stream packets. The partial packet exemplified in the lower portion of FIG. 9 indicates an application packet formed by this segmentation (split).

The byte offset of the first application time stamp that starts within the stream packet and the number of application packets which start within that stream packet are described in the application header.

With this format, stuffing before the first application time stamp and after the last application packet is automatically done in a given stream packet with this automatic stuffing, a stream packet can always have a required length.

The pack header shown in FIG. 26(a) contains pack start code information, SCR base information, SCR extension information, program maximum rate information, marker bit, pack stuffing length information, and the like, although not shown.

The SCR base consists of 32 bits, and its 32nd bit is zero. As the program maximum rate, 10,08 Mbps are used.

The PES header and substream ID shown in FIG. 26(a) have the contents shown in FIG. 10(c).

The application header in FIG. 26(a) includes version information, the number AP_Ns of application packets, time stamp position FIRST_AP_OFFSET of the first application packet, extension header information EXTENSION_HEADER_IFO, service ID, and the like, as shown in FIG. 12(c).

Note that the version describes the version number of the application header format.

AP_Ns in the application header describes the number of application packets that start within the stream pack of interest. If the stream pack of interest stores the first byte of ATS, it is determined that an application packet starts in this stream pack.

FIRST_AP_OFFSET describes the time stamp position of the first application packet that starts within the stream packet of interest as a relative value (unit: byte) from the first byte in this stream packet. If no application packet starts within the stream packet, FIRST_AP_OFFSET describes "0".

EXTENSION_HEADER_INFO describes whether or not an application header extension and/or stuffing byte are/is present within the stream packet of interest.

If the contents of EXTENSION_HEADER_IFO are 00b, it indicates that neither the application header extension nor stuffing byte are present after the application header.

If the contents of EXTENSION_HEADER_IFO are 10b, it indicates that the application header extension is present after the application header, but no stuffing byte is present.

If the contents of EXTENSION_HEADER_IFO are 11b, it indicates that the application header extension is present after the application header, and the stuffing byte is also present after the application header extension.

The contents of EXTENSION_HEADER_IFO are inhibited from assuming 01b.

The stuffing byte (option) before the application packet area is activated by "EXTENSION_HEADER_IFO=11b". In this manner, "packing paradox" can be prevented when the number of bytes in the application header extension is contradictory to the number of application packets that can be stored in the application packet area.

SERVICE_ID describes the ID of a service that generates the stream. If this service is unknown, SERVICE_ID describes 0x0000.

The application packet area in FIG. 26(a) can have the same configuration as that shown in the lower portion in FIG. 9 (change "packet" in FIG. 9 to read "application packet" in FIG. 26).

That is, a partial application packet is recorded at the head of the application packet area, a plurality of pairs of application time stamps ATS and application packets are sequentially recorded after the partial application packet, and a partial application packet is recorded at the end of the application packet area.

In other words, a partial application packet can be present at the start position of the application packet area. At the end position of the application packet area, a partial application packet or a stuffing area with the reserved number of bytes can be present.

The application time stamp (ATS) allocated before each application packet consists of 32 bits (4 bytes). This ATS can be divided into two fields, i.e., a basic field and extended field. The basic field is called a 90-kHz unit value, and the extended field indicates a less significant value measured at 27 MHz.

In FIG. 26(a), the application header extension can be used to store information which can differ between application packets. Such information is not always required for all applications.

Therefore, the data field of the application header is defined to be able to describe the presence of the application header extension as an option in the stream data area (in EXTENSION_HEADER_IFO mentioned above).

Upon recording a stream, the first byte of application time stamp ATS of the first application packet must be aligned to the start position of the application packet area in the first stream packet at the beginning of stream object SOB.

On the other hand, as for the subsequent stream packet in the SOB, an application packet may be segmented (split) at the boundary of neighboring stream packets. The partial application packet shown in FIGS. 8(f) and (g) or FIG. 9 indicates an application packet formed by this segmentation (split).

The byte offset of the first application time stamp that starts within the stream packet and the number of application packets which start within that stream packet are described in the application header.

With this format, stuffing before the first application time stamp and after the last application packet is automatically done in a given stream packet.

That is, the automatic mechanism allows "the application to make stuffing by itself". With this automatic stuffing, a stream packet can always have a required length.

The application header extension (option) consists of a list of entries. The list includes one entry having a 1-byte length corresponding to each application packet that starts within the stream packet of interest. The bytes of these entries can be used to store information which may differ in units of application packets.

Note that the 1-byte application header extension (option) describes 1-bit AU_START, 1-bit AU_END, and 2-bit COPYRIGHT.

When AU_START is set at "1", it indicates that a related application packet includes a random access entry point (start of a random access unit) within the stream.

When AU_END is set at "1", it indicates that a related application packet is the last packet of the random access unit.

COPYRIGHT describes the state of the copyright of a related application packet.

The packet structure shown in FIG. 26(a) can be applied to sectors other than the last sector of SOB#A·298, but cannot always be applied to the last sector.

For example, when the last sector of SOB#A·298 is sector No. 63 in FIG. 26(f), and this sector consists of padding packet 40 (see FIG. 1(i)), as shown in FIG. 26(g), the contents of its padding area 38 (FIG. 26(h)) are different from those in FIG. 26(a).

That is, as shown in FIG. 26(i), the stuffing packet as padding packet 40 consists of a 14-byte pack header, 6-byte PES header, 1-byte substream ID, 9-byte application header, and 2,018-byte application packet area.

In a pack that includes the head of the stuffing packet, this application packet area consists of 4-byte application time stamp ATS and 2,014-byte zero byte data (data having substantially no recording contents).

On the other hand, in a pack including the subsequent stuffing packet, this application packet area consists of 2,018-byte zero byte data (without ATS).

When recording is done at very low bit rate, the stuffing byte is required to ensure recovery (playback) of time map information (252 in FIG. 3(h); or MAPL in SOBI in FIG. 29). The stuffing packet in FIG. 26(i) is defined as a conceptual unit for that purpose. The objective of this stuffing packet is achieved when each SOBU includes at least one ATS value as well as the stuffing area.

The following conditions are attached to the stuffing packet:

One or a plurality of stuffing packets always start from the application packet area of a pack after a pack including actual application packet data; and One or a plurality of stuffing packets consist of one 4-byte ATS, and zero byte data (following ATS) required to stuff the application data area of the remaining pack of the SOBU of interest. Assuming that SOBU_SIZ represents the number of sectors per SOBU, if 0≦n≦SOBU_SIZ−1, the total length of the stuffing packet is "4+2,014+n×2,018" bytes.

ATS of the stuffing packet is set as follows:

In an SOBU in which at least one pack includes actual application packet data, ATS of the stuffing byte is set to be that of an application packet preceding the stuffing byte; and In an SOBU that does not include any actual application packet, ATS of the stuffing packet is determined in accordance with the contents of time map information or the like.

All packs each of which includes the stuffing packet or a portion of the stuffing packet are configured as follows:

SCR of the pack header is set to be the sum of SCR of the preceding pack and "2,048×8 bits 10,08 Mbps";

The PES packet header and substream ID are the same as those of all other PES packets; and In the application header (see FIGS. 12(c) and (d)), AP_Ns=0, FIRST_AP_OFFSET=0, EXTENSION_HEADER_IFO=00b, and SERVICE_ID=0 (other parameters in the application header are set at zero).

FIG. 27 is a view for explaining the internal data structure of management information (STREAM.IFO or SR_MANGR.IFO in FIG. 2) of the streamer.

STREAM.IFO (SR_MANGR.IFO) 105 as management information (navigation data) shown in FIG. 2 or FIG. 3(a) includes streamer information STRI, as shown in FIG. 27.

This streamer information STRI is comprised of streamer video manager information STR_VMGI, stream file information table SFIT, original PGC information ORG_PGCI (more generally, PGC information PGCI#i), user-defined PGC information table UD_PGCIT, text data manager TXTDT_MG, and application private data manager APDT_MG, as shown in FIG. 3(f) or FIG. 27.

Streamer video manager STR_VMGI includes video manager information management information VTSI_MAT that describes management information which pertains to STRI and STR_VMGI, and the like, and a play list search pointer table (PL_SRPT) that describes search pointers used to search for a play list in the stream, as shown in FIG. 27.

Note that the play list is a list of a portion of a program. With this play list, the user can define an arbitrary playback sequence (for the contents of a program).

Stream file information table SFIT includes all navigation data that directly pertain to the streamer operation. Details of stream file information table SFIT will be explained later with reference to FIG. 29.

Original PGC information ORG_PGCI is a portion that describes information which pertains to an original PGC (ORG_PGC). ORG_PGC indicates navigation data which describes a program set. ORG_PGC is a chain of programs, and includes stream data recorded in a ".SRO" file (SR_TRANS.SRO 106 in FIG. 2) shown in FIG. 2 or FIG. 32.

Note that the program set indicates the entire recorded contents (all programs) of information storage medium 201. Upon playing back the program set, the same playback order as the recording order of programs is used except for a case wherein an arbitrary program has been edited, and the playback order of original recording has been changed. This program set corresponds to a data structure called an original PGC (ORG_PGC).

Also, a program is a logical unit of recorded contents, which is recognized by the user or is defined by the user. A program in the program set is made up of one or more original cells. The program is defined within only the original PGC.

Furthermore, a cell is a data structure indicating a portion of a program. A cell in the original PGC is called an "original cell", and a cell in a user-defined PGC (to be described later) is called a "user-defined cell".

Each program in the program set consists of at least one original cell. A portion of a program in each play list consists of at least one user-defined cell.

On the other hand, only a stream cell (SC) is defined in the streamer. Each stream cell looks up a portion of the recorded bitstream. In an embodiment of the present invention, a "cell" means a "stream cell" unless otherwise specified.

Note that a program chain (PGC) is a generic unit. In an original PGC, PGC indicates a chain of programs corresponding to a program set. On the other hand, in a user-defined PGC, PGC indicates a chain of portions of programs corresponding to a play list.

A user-defined PGC indicating a chain of portions of programs includes navigation data alone. A portion of each program looks up stream data belonging to the original PGC.

User-defined PGC Information table UD_PGCIT in FIG. 27 can include user-defined PGC information table information UD_PGCITI, one or more user-defined PGC search pointers UD_PGC_SRP#n, and one or more pieces of user-defined PGC information UD_PGCI#n.

User-defined PGC information table information UD_PGCITI includes UD_PGC_SRP_NS indicating the number of user-defined PGC search pointers UD_PGC_SRP, and UD_PGCIT_EA indicating the end address of user-defined PGC information table UD_PGCIT.

The number of "UD_PGC_SRP"s indicated by UD_PGC_SRP_Ns is the same as the number of pieces of user-defined PGC information (UD_PGCI), and is also the same as the number of user-defined PGCs (UD_PGC). The maximum value of UD_PGC_SRP_Ns is "99".

UD_PGCIT_EA describes the end address of UD_PGCIT of interest by the relative number of bytes (F_RBN) from the first byte of that UD_PGCIT.

Note that F_RBN indicates the relative number of bytes from the first byte of the defined field, and starts from zero.

PGCI#i that generally expresses original PGC information ORG_PGCI or user-defined PGC information UD_PGCI in user-defined PGC information table UD_PGCIT will be described later with reference to FIG. 28.

Text data manager TXTDT_MG in FIG. 27 is supplementary text information. This TXTDT_MG can be stored in the play list and program together with primary text information PRM_TXTI.

Application private data manager APDT_MG in FIG. 27 can include application private data manager general information APDT_GI, one or more APDT search pointers APDT_SRP#n, and one or more APDT areas APADTA#n (not shown).

Note that application private data APDT is a conceptual area that allows an application device connected to the streamer to store arbitrary non-real time information (more desired information in addition to real-time stream data).

Figure 28:
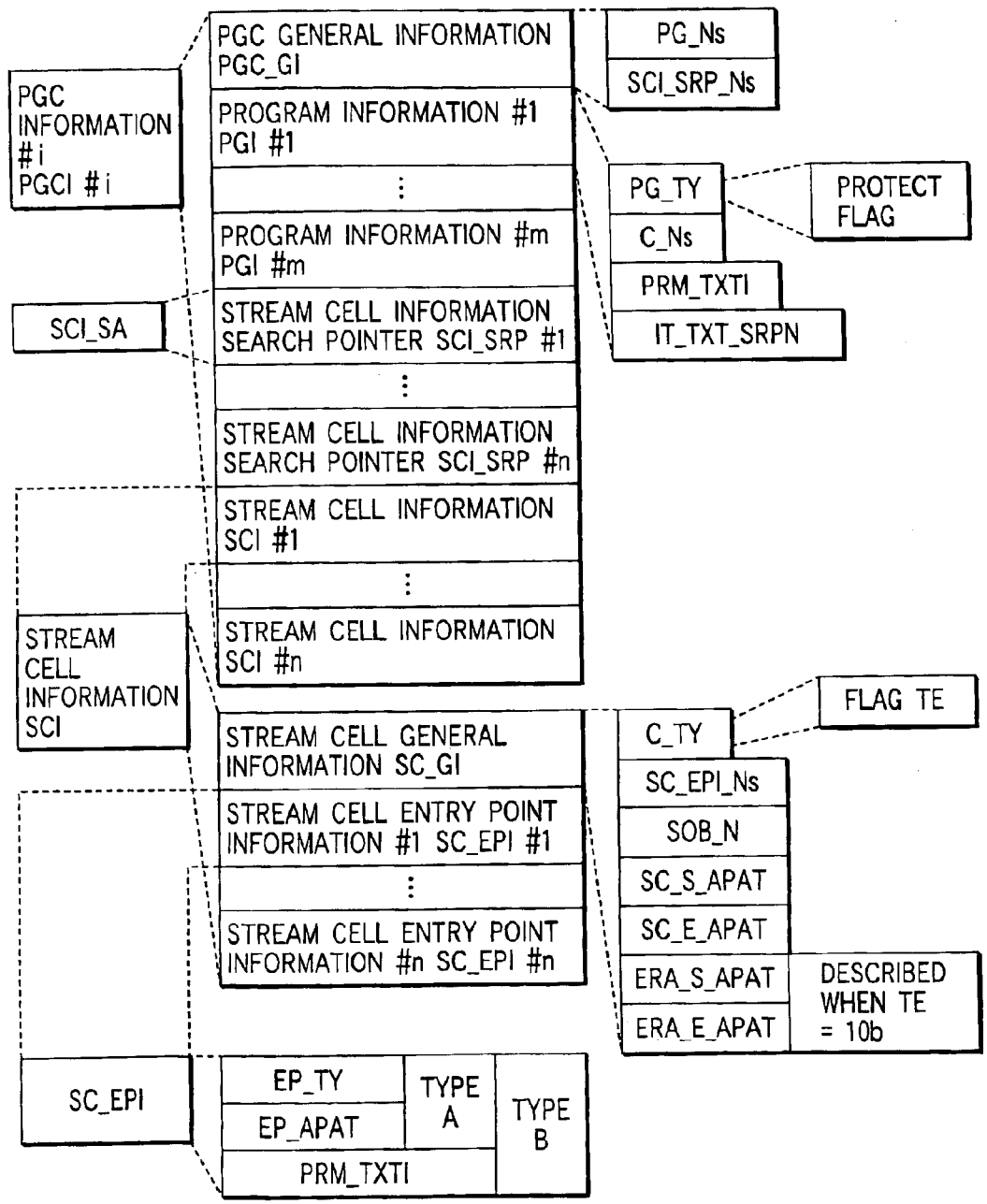
FIG. 28 is a view for explaining the internal data structure of PGC information (ORG_PGCI/UD_PGCIT in FIG. 3 or PGCI#i in FIG. 27)

FIG. 28 is a view for explaining the internal data structure of PGC Information (ORG_PGCI/UD_PGCIT in FIG. 3 or PGCI#i in FIG. 27).

PGC information PGCI#i in FIG. 28 generally expresses original PGC information ORG_PGCI or user-defined PGC information UD_PGCI in user-defined PGC information table UD_PGCIT in FIG. 27.

As shown in FIG. 28, PGC information PGCI#i is made up of PGC general information PGC_GI, one or more pieces of program information PGI#m, one or more stream cell information search pointers SCI_SRP#n, and one or more pieces of stream cell information SCI#n.

PGC general information PGC_GI includes the number PG_Ns of programs, and the number SCI_SRP_Ns of stream cell information search pointers SCI_SRP.

Each program information PGI (e.g., PGI#1) includes program type PG_TY, the number C_Ns of cells in the program of interest, primary text information PRM_TXTI of the program of interest, and search pointer number IT_TXT_SRPN of item text.

Note that program type PG_TY includes information indicating the state of the program of interest. Especially, program type PG_TY includes a flag indicating if that program is protected from an erase error, i.e., a protect flag.

When this protect flag is "0b", the program of interest is not protected; when it is "1b", the program is protected.

The number C_Ns of cells indicates the number of cells in the program of interest. In all the programs and cells in a PGC, cells (tacitly) append themselves to each program in their ascending order.

For example, if program #1 in a given PGC has C_Ns=1, and program #2 has C_Ns=2, first stream cell information SCI of that PGC is appended to program #1, and the second SCI and third SCI are appended to program #2.

Primary text information PRM_TXTI describes text information having a single common character set (ISO/

IEC646:1983 (ASCII code)) to allow use of information storage medium (DVD-RAM disc) 201 anywhere in the world.

Item text search pointer number IT_TXT_SRPN describes a search pointer number corresponding to item text (text data corresponding to the program of interest) IT_TXT. If the program of interest has no item text, IT_TXT_SRPN is set at "0000h".

Each stream cell information search pointer SCI_SRP (e.g., SCI_SRP#1) includes SCI_SA indicating the start address of corresponding stream cell information SCI. This SCI_SA is described as the relative number of bytes (F_RBN) from the first byte of PGCI.

Each stream cell information SCI (e.g., SCI#1) is made up of stream cell general information SC_GI and one or more pieces of stream cell entry point information SC_EPI#n.

Stream cell general information SC_GI includes cell type C_TY including flag TE indicating a temporary erase (TE) state, the number SC_EPI_Ns of pieces of entry point information of a stream cell, stream object number SOB_N, stream cell start APAT (SC_S_APAT shown in FIG. 6 and the like), stream cell end APAT (SC_E_APAT shown in FIG. 6 and the like), erase start APAT (ERA_S_APAT shown in FIG. 6 and the like) indicating start APAT of a temporary erase cell if that cell is in the temporary erase state (TE=01b), and erase end APAT (ERA_E_APAT shown in FIG. 6 and the like) indicating end APAT of a temporary erase cell if that cell is in the temporary erase state (TE=10b).

Cell type C_TY describes the type and temporary erase state of the stream cell of interest.

More specifically, cell type C_TY1="010b" is described in the type of all stream cells (with this C_TY1="010b", a stream cell can be distinguished from other cells).

On the other hand, if flag TE is "00b", it indicates that the cell of interest is in a normal state; if flag TE is "01b" or "10b", that cell is in a temporary erase state.

Flag TE="01b" indicates that the cell of interest (cell in the temporary erase state) starts from a position after the first application packet that starts within a SOBU, and comes to an end at a position before the last application packet in that SOBU.

On the other hand, flag TE="10b" indicates that the cell of interest (cell in the temporary erase state) includes at least one SOBU boundary (the first or last application packets starts within that SOBU).

Note that a protect flag of a program and TE flag of a cell in that program cannot be set at the same time. Therefore, (a) none of cells in a program in the protect state can be set in the temporary erase state; and (b) a program including one or more cells in the temporary erase state cannot be set in the protect state.

The number SC_EPI_Ns of pieces of entry point information of a stream cell describes the number of pieces of stream cell entry point information included in stream cell information SCI of interest.

Each stream cell entry point information SC_EPI (e.g., SC_EPI#1) in FIG. 28 includes two types (types A and B).

SC_EPI of type A includes entry point type EP_TY and entry point application packet arrival time EP_APAT. Type A is set by entry point type EP_TY1="00b".

SC_EPI of type B includes primary text information PRM_TXTI in addition to EP_TY and EP_APAT of type A. Type B is indicated by entry point type EP_TY1="01b".

As a tool for skipping a portion of the recorded contents in an arbitrary stream cell, an entry point can be used. All entry points can be specified by application packet arrival times (APAT). This APAT can specify the data output start position.

Stream object number SOB_N describes the number of an SOB that the cell of interest looks up.

Stream cell start APAT (SC_S_APAT) describes start APAT of the cell of interest.

Stream cell end APAT (SC_E_APAT) describes end APAT of the cell of interest.

Erase start APAT (ERA_S_APAT) describes an arrival time (APAT) of the first application packet that starts within the first SOBU, the head position of which is included in a given temporary erase cell (TE field of its C_TY is "10b") including at least one SOBU boundary, in that temporary erase cell.

Erase end APAT (ERA_E_APAT) describes an arrival time (APAT) of the first application packet that starts within an SOBU including an application packet which immediately follows a temporary erase cell (TE field of its C_TY is "10b") including at least one SOBU boundary, in that temporary erase cell.

FIG. 29 is a view for explaining the internal data structure of the stream file information table (SFIT in FIG. 3(f) or FIG. 27).

As shown in FIG. 29, stream file information table SFIT is made up of stream file information table information SFITI, one or more pieces of stream object stream information SOB_STI#n, and stream file information SFI.

Stream file information table information SFITI consists of the number SFI_Ns of pieces of stream file information on information storage medium (DVD-RAM disc) 201, the number SOB_STI_Ns of pieces of stream object stream information that follow SFITI, end address SFIT_EA of SFIT, and start address SFI_SA of SFI.

SFIT_EA describes the end address of SFIT by the relative number of bytes (F_RBN) from the first byte of SFIT.

SFI_SA describes the start address of SFI by the relative number of bytes (F_RBN) from the first byte of SFIT.

Stream object stream information SOB_STI includes three different parameters. Each parameter can assume a value unique to individual bitstream recording. However, these parameter sets can have equal values in most bitstream recording. Therefore, SOB_STI is stored in a table independently from the table of stream object information (SOBI), and some stream objects (SOB) are allowed to share identical SOB_STI (i.e., point to identical SOB_STI). Therefore, the number of pieces of SOB_STI is normally smaller than the number of SOBs.

Each stream object stream information SOB_STI (e.g., SOB_STI#1) in FIG. 27 includes application packet size AP_SIZ, the number SERV_ID_Ns of service IDs, service ID (SERV_IDs), and application packet device unit ID (AP_DEV_UID).

AP_SIZ describes the application packet size by the byte length of a packet in a bitstream transferred from an application device to the streamer.

In the DVD streamer, the application packet size is constant in each bitstream recording. For this reason, if the application packet size changes in each recording free from any interrupt, the current stream object (current SOB) comes to an end there, and a new stream object (new SOB) starts with new AP_SIZ. In this case, the current and new SOBs belong to an identical program in original PGC information (ORG_PRGI).

SERV_ID_Ns describes the number of service IDs included in the subsequent parameter.

SERV_IDs describes a list of service IDs in an arbitrary order.

AP_DEV_UID describes a unique device ID unique to an application device that supplies the recorded bitstream.

As shown in FIG. 29, stream file information SFI is comprised of stream file general information SF_GI, one or more stream object information (SOB information) search pointers (SOB_SRP) #n, and one or more pieces of SOB information (SOBI) #n.

Stream file general information SF_GI includes the number SOBI_Ns of pieces of SOBI, sector size SOBU_SIZ per SOBU, and MTU_SHFT as a kind of time map information.

SOBU_SIZ describes the SOBU size using the number of sectors, and this size is constant to be 32 (32 sectors=64 kbytes). This means that the first entry is associated with an application packet included in the first 32 sectors of an SOB. Likewise, the second entry is associated with an application packet included in the next 32 sectors. The same applies to the third and subsequent entries.

Each SOB information search pointer (e.g., SOBI_SRP#1) includes start address SOBI_SA of SOBI. This SOBI_SA describes the start address of the associated SOBI using the relative number of bytes (F_RBN) from the first byte of stream file information SFI.

Each SOB information (e.g., SOBI#1) is made up of stream object general information SOB_GI, time map information MAPL, and access unit data AUD (option).

Stream object general information SOB_GI includes stream object type SOB_TY, stream object recording time SOB_REC_TM, stream object stream information number SOB_STI_N, access unit data flag AUD_FLAGS, stream object start application packet arrival time SOB_S_APAT, stream object end application packet arrival time SOB_E_APAT, start stream object unit SOB_S_SOBU of the stream object of interest, and the number MAPL_ENT_Ns of entries in time map information.

Stream object type SOB_TY is a field that describes bits indicating the temporary erase state (TE state) and/or bits of the copy generation management system.

Stream object recording time SOB_REC_TM describes the recording time of the associated stream object (SOB).

Stream object stream information number SOB_STI_N describes an index of valid SOB_STI for the stream object of interest.

Access unit data flag AUD_FLAGS describes whether or not access unit data (AUD) is present for the stream object of interest, and the type of access unit data if it is present.

If access unit data (AUD) is present, AUD_FLAGS describes some properties of AUD.

The access unit data (AUD) itself consists of access unit general information AU_GI, access unit end map AUEM, and playback time stamp list PTSL, as shown in FIG. 29.

Access unit general information AU_GI includes AU_Ns indicating the number of access units described in correspondence with the SOB of interest, and access unit start map AUSM indicating an SOBU that belongs to the SOB of interest and includes an access unit.

Access unit end map AUEM is a bit array having the same length as that of AUSM (if it is present), and indicates an SOBU that includes the terminal end of a bitstream segment appended to the access unit of the SOB of interest.

Playback time stamp list PTSL is a list of playback time stamps of all access units that belong to the SOB of interest. One PTSL element included in this list includes a playback time stamp (PTS) of the corresponding access unit.

Note that the access unit (AU) indicates an arbitrary single, continuous portion of the recorded bitstream, and is suitable for individual playback. For example, in an audio/video bitstream, an access unit corresponds to I-picture of MPEG.

The contents of SOB_GI will be explained again.

AUD_FLAGS includes flag RTAU_FLG, flag AUD_FLG, flag AUEM_FLG, and flag PTSL_FLG.

When flag RTAU_FLG is 0b, it indicates that no access unit flag is present in real-time data of the SOB of interest.

When flag RTAU_FLG is 1b, it indicates that AU flags (AU_START, AU_END) described in the application header extension shown in FIG. 26(a) can be present in real-time data of the SOB of interest. This state is also allowed when AUD_FLG (to be described below) is 1b.

When flag AUD_FLG is 0b, it indicates that no access unit data (AUD) is present for the SOB of interest.

When flag AUD_FLG is 1b, it indicates that access unit data (AUD) can be present for the SOB of interest.

When flag AUEM_FLG is 0b, it indicates that no AUEM is present in the SOB of interest.

When flag AUEM_FLG is 1b, it indicates that AUEM is present in the SOB of interest.

When flag PTSL_FLG is 0b, it indicates that no PTSL is present in the SOB of interest.

When flag PTSL_FLG is 1b, it indicates that PTSL is present in the SOB of interest.

SOB_S_APAT describes the start application packet arrival time of a stream object. That is, SOB_S_APAT indicates the arrival time of the first application packet that belongs to the SOB of interest.

This packet arrival time (PAT) is divided into two fields, i.e., a basic field and extended field. The basic field is called a 90-kHz unit value, and the extended field indicates a less significant value measured at 27 MHz.

SOB_E_APAT describes the end application packet arrival time of a stream object. That is, SOB_E_APAT indicates the arrival time of the last application packet that belongs to the SOB of interest.

SOB_S_SOBU describes the start stream object unit of the stream object of interest. That is, SOB_S_SOBU indicates an SOBU including the start portion of the start application packet of the stream object.

MAPL_ENT_Ns describes the number of entries in time map information (MAPL) that follows SOBI_GI.

Time map information MAPL has contents corresponding to time map information 252 shown in FIG. 3(h).

FIG. 30 is a view for explaining an example (part 1) of the relationship between the cell and corresponding time information (SC_S_APAT/SC_E_APAT; ERA_S_APAT/ERA_E_APAT) when certain program #j is partially erased (temporarily and actually erased).

The streamer according to an embodiment of the present invention can implement partial erase for completely erasing a portion of a stream, and temporary erase (TE) for temporarily erasing a portion of a stream, as has been explained earlier in FIG. 17.

Assume that program #j of an original program (corresponding to SOB#n) consists of cell #k, which is made up of SOBU#1 to SOBU#6, as shown in FIG. 30(a). At this time, the start time of cell #k is indicated by SC_S_APAT, and its end time is indicated by SC_E_APAT.

In such program #j, assume that the streamer user sets an area (starts from SC_S_APAT and ends at SC_E_APAT) that completely includes SOBU#3 and SOBU#4 as temporary erase cell #k+1, as shown in FIG. 30(b). At this time, temporary erase flag TE of cell #k+1 is set to be "10b".

In this case, a portion corresponding to SOBU#1 and SOBU#2 of cell #k before temporary erase (FIG. 30(a)) remains the same even after temporary erase (FIG. 30(b)), i.e., cell #k. A portion corresponding to SOBU#5 and SOBU#6 after SOBU#3 and SOBU#4 included in temporary erase cell (TE cell) #k+1 becomes cell #k+2 after temporary erase (FIG. 30(b)).

As shown in FIG. 30(b), temporary erase cell (TE cell) #k+1 includes an SOBU boundary between SOBU#3 and SOBU#4. In this case, the application packet arrival time of the start application packet that starts within SOBU#3 is indicated by ERA_S_APAT of TE cell #k+1. Also, the application packet arrival time of the start application packet which starts within SOBU#5 that includes an application packet immediately following TE cell #k+1 is indicated by ERA_E_APAT of TE cell #k+1.

When TE cell #k+1 is actually erased (completely erased) from program #j in FIG. 30(b), program #j that belongs to SOB#n in the original program (FIG. 30(a)) is split into SOB#n and SOB#n+1.

In this case, SC_E_APAT of cell #k after complete erase can be adjusted to ERA_S_APAT of TE cell #k+1. Also, SC_S_APAT of cell #k+1 after complete erase can be adjusted to ERA_E_APAT of TE cell #k+1.

The reason why not only SC_S_APAT and SC_E_APAT but also ERA_S_APAT and ERA_E_APAT are used in this manner will be explained below.

A TE cell can have two different special APATs, i.e., SC_S_APAT/SC_E_APAT, and ERA_S_APAT and ERA_E_APAT. This is to re-use SOBUs (SOBU#3 and SOBU#4 in FIG. 30(b)) in the TE cell during recording.

In other words, when medium (DVD-RAM disc) 201 becomes full of data during recording, the streamer acquires new unrecorded SOBUs (SOBU#3 and SOBU#4 in FIG. 30(b)) by completely erasing a TE cell, and proceeds with recording using the acquired SOBUs without any interrupt.

Only SC_S_APAT and SC_E_APAT of the TE cell are insufficient to achieve this objective "to acquire new unrecorded SOBUs". This is because two possible search positions are formed for an assigned SOBU in a search via time map information (MAPL). However, when ERA_S_APAT and ERA_E_APAT are used, an accurate SOBU position can be specified irrespective of the stream involved.

FIG. 31 is a view for explaining an example (part 2) of the relationship between the cell and corresponding time information (SC_S_APAT/SC_E_APAT) when certain program #j is partially erased (temporarily and actually erased).

Referring to FIG. 31, originally recorded program #j consists of cell #k (start time=SC_S_APAT; end time=SC_E_APAT), which has a TE flag="00b".

In this case, assume that a temporary erase cell does not include any SOBU boundary (ERA_S_APAT/ERA_E_APAT).

When temporary erase is executed for a middle portion (a range from APAT=A to APAT=B) of this program #j, originally recorded cell #k is split into three cells, i.e., cell #k (TE flag="00b"; start time=SC_S_APATk; end time=SC_E_APATk), cell #k+1 (TE flag="10b"; start time=SC_S_APATk+1; end time=SC_E_APATk+1), and cell #k+2 (TE flag="00b"; start time=SC_S_APATk+2; end time=SC_E_APATk+2).

When an original cell is re-formed after temporary erase (TE), program #j becomes cell #k (start time=SC_S_APAT; end time=SC_E_APAT with TE flag=00b", as shown in the middle portion of FIG. 31.

Note that temporary erase (TE) does not influence the contents of original PGC information, and the contents of stream file information SFI remain unchanged.

On the other hand, user-defined PGC Information remains the same or can be modified to inhibit a user-defined cell from looking up the TE cell.

Principal operations of temporary erase are executed within program #j. Temporary erase is implemented by splitting a cell of program #j into portions that cover a normal stream portion (unerased portion) and a temporary erase portion.

When the contents of the user-defined PGC information remain the same, navigation data is the same as that before temporary erase even after reformation of TE operation.

When an unrecorded area of information storage medium 201 is used up, and the recording space becomes short, temporary erase cell #k+1 is completely erased. Then, as shown in the lower portion in FIG. 31, cell #k upon temporary erase remains unchanged even after complete erase, i.e., cell #k, but cell #k+2 upon temporary erase becomes cell #k+1 after complete erase.

Figure 32:
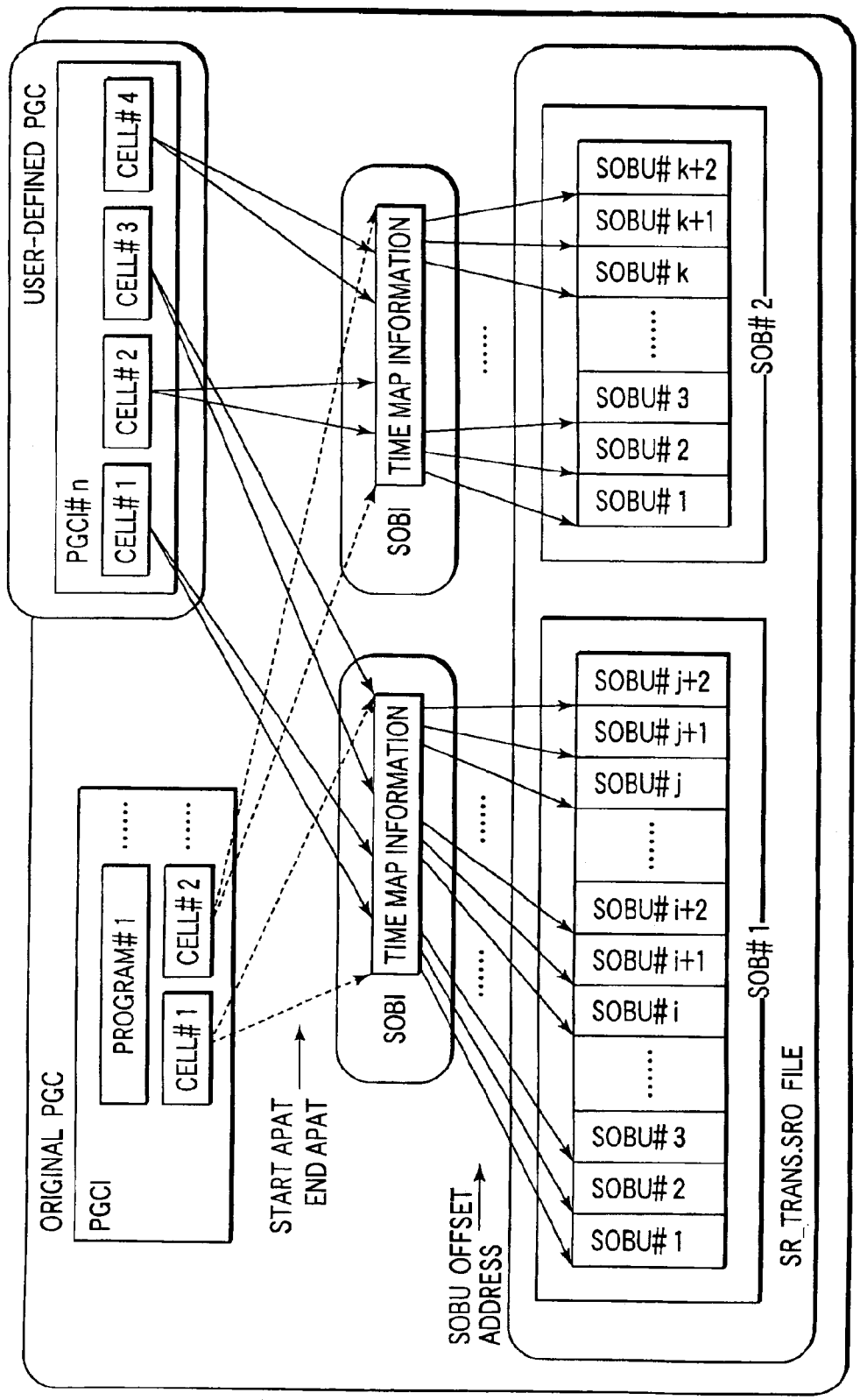
FIG. 32 is a view for explaining the relationship between cells designated by an original or user-defined PGC and SOBUs corresponding to these cells via time map information.

FIG. 32 is a view showing an example of the relationship defined between cells designated by an original or user-defined PGC, and SOBUs corresponding to these cells via time map information.

A user-defined PGC does not contain its own SOB, but looks up an SOB in an original PGC. Therefore, the user-defined PGC can be described using only PGC information. This means that an arbitrary playback sequence can be implemented without modifying SOB data.

The user-defined PGC does not contain any program, and is made up of a chain of cells corresponding to portions of programs in the original PGC.

FIG. 32 shows an example of such user-defined PGC. In this example, user-defined PGC#n is formed so that a cell in the PGC looks up an SOB in an original PGC.

Referring to FIG. 32, PGC#n has four cells #1 to #4. Of these cells, two cells look up SOB#1, and the remaining two cells look up SOB#2.

The solid arrows from cells in the user-defined PGC to the original PGC (time map information of an SOBI) indicate the playback periods of those cells. The cell playback order in the user-defined PGC can become quite different from that in the original PGC.

Playback of an arbitrary SOB and its SOBUs is specified by start APAT (S_APAT) and end APAT (E_APAT) in FIG. 32.

S_APAT of the SOB or SOBU is defined in association with a time stamp recorded in the payload (see FIG. 8(b)) of a stream pack of the SOB of interest. During SOB recording, each incoming application packet is appended with a time stamp by the local clock reference in the streamer. This is the application packet arrival time APAT).

APAT of the start application packet of the SOB is stored as SOB_S_APAT. Four least significant bytes of all APATs are fixed in advance for a corresponding application packets in a _.SRO file.

In order to play back data of the SOB or SOBU, the internal reference clock of the streamer is set at an SCR value, and clocks are then automatically counted. This SCR value is described in the first stream pack (pack header) from which playback begins. Based on the clocks, all subsequent application packets are played back and output from the SOB or SOBU.

When an arbitrary stream cell (SC) defines stream cell start APAT (SC_S_APAT) that has an arbitrary value between SOB_S_APAT and SOB_E_APAT of an SOB that SC points to, an address used to find out an SOBU that includes an application packet with a desired APAT is required.

The number of stream packs per SOBU is constant, but the intervals of arrival times captured by SOBUs are flexible. Therefore, each SOB has time map information (MAPL) that describes the arrival time intervals of its SOBUs. That is, the address system implemented by time map information (MAPL) converts arbitrary APAT into a relative logical block address in the file to point to an SOBU that can find out a desired application packet.

FIG. 33 exemplifies the recorded positions of the contents of SOBUs that form each stream object (SOB) in data area 207 in FIG. 3 (data areas 21 to 23 in FIG. 1). How to allocate an SOB upon recording the SOB will be explained below.

In order to effectively use a free space of information storage medium (DVD-RAM disc) 201, SOBs can be allocated in data areas distributed over the entire medium (disc).

Upon reading such SOBs from the medium (disc), data supply from the medium (disc) is interrupted during jump from a given data area to the next data area. Even in such case, in order to guarantee continuous supply of SOB data, SOB data are allocated under the following conditions.

That is, SOBs are allocated in a chain of continuous data areas (to be abbreviated as a CDA hereinafter as needed). The CDA basically becomes a sequence of continuous physical sectors in the medium (disc).

The minimum length of the CDA and data allocation in the CDA are restricted by a player model that can continuously play back SOBs.

The continuous data area (CDA) is defined by continuous physical sectors in the medium (disc). The CDA consists of a plurality of ECC blocks. In the CDA, SOB data is continuously allocated except for a case wherein some physical sectors skip in the CDA upon recording.

Restrictions upon recording SOB data in the CDA are as follows:

(21) SOB data and other data are not recorded within an identical ECC block; and

(22) Even when a defective sector is encountered during recording of SOB data, no replace process (linear replacement) is used.

Playback executed when a certain SOBU including a plurality of application packets includes cell start APAT will be supplemented below.

A cell can have cell start APAT or cell end APAT which does not match an SOBU boundary. A case will be examined below wherein there are two successive SOBU#K−1 and SOBU#k, and SOBU#k includes cell start APAT in its middle portion.

When a series of application packets begin to be played back from an application packet specified by cell start APAT, SOBU#k that includes the target application packet (corresponding to desired APAT) must be accessed. The target application packet is not directly accessed since it is assumed that the address system based on time map information (MAPL) gives only an SOBU start address.

In order to find out desired APAT, all application packets in SOBU#k must be scanned from the beginning (the boundary between SOBU#k−1 and SOBU#k). If desired APAT is found by this scan, subsequent application packets begin to be played back and output from the found position in accordance with the time stamps (ATS) of these application packets.

As described above, the effects in the embodiment of the present invention are summarized as follows.

1. Since stream data to be recorded on an information storage medium are formed in units of stream blocks (or in units of SOBUs) each having a predetermined size, and recording and erase are done in units of stream blocks, the address of the stream block start position can be easily detected, and access control upon playback is facilitated. (As shown in S12 in FIG. 14, upon playback, playback starts from the stream block first position.)

2. Since stream data to be recorded on an information storage medium are formed by stream blocks each having a predetermined size (e.g., 32 sectors=64 kbytes), and a time stamp or data packet (transport packet) can be recorded across different sectors in a single stream block, a data packet (transport packet) having a size larger than the sector size (2,048 kbytes) can be recorded.

3. When a DVD-RAM disc is used as an information storage medium, ECC blocks are formed every 16 sectors, and data interleave (re-arrangement) and appending of an error correction code are made within each ECC block. For this reason, in order to erase, rewrite, or additionally write only a specific sector in an ECC block, a process so-called "read-modify-write" is required. That is, after all data in an ECC block are read and are re-arranged (deinterleaved) in a buffer memory, data for a specific sector is erased or rewritten or new data is additionally written (modify), and the data which are interleaved (re-arranged) again while appending a new error correction code is recorded. This process is very time-consuming, and recording or partial erase of stream data cannot be done in real time.

To combat such problem, the stream block size is set at an integer multiple of the ECC block size (e.g., SOBU=2 ECC block sizes), and recording and partial erase are done in units of stream blocks (in units of SOBUs). For this reason, the need for read-modify-write process can be obviated, and overwrite can be directly made on the information storage medium in units of ECC blocks. As a result, a recording or partial erase process of stream data can be done at high speed, and a real-time process can be realized.

4. Since each stream block has unique header information (stream block header or application header), playback can start from the stream block start position upon playback of stream data. For this reason, the stream data recording/playback apparatus (streamer) can facilitate processes of played-back stream data by reading each stream block header early.

5. As described above, playback basically starts from the stream block start position. However, in some cases, playback may start from the second or subsequent ECC block start position in a stream block.

As shown in the example in which single transport packet d is recorded across two sectors (sector No. 0 and sector No. 1) in FIG. 1, when playback has started from the second or subsequent ECC block start position, the recording position of the next time stamp information must be detected.

When unique header information (sector data header or application header) is allocated at the head position of each sector, and first access point 651 (or FIRST_AP_OFFSET in FIG. 12(c) is recorded in that header, playback can be easily started from the second or subsequent ECC block start position in a stream block.

6. As shown in FIG. 1(j), end code 32 is attached to the last stream data recorded in stream block #2. However, when end code 32 cannot be read due to an error correction failure in units of ECC blocks or a data transfer error in the stream data recording/playback apparatus during data playback from an information storage medium, a wrong video may be displayed by erroneously interpreting that stream data be recorded in padding area 38.

When stream ID 603 (or substream ID) of PES header 601 in FIG. 10 (or stream PES packet header) is set at "10111110" to define sector No. 79 as padding packet 40, even when it is erroneously interpreted that stream data is recorded in padding area 38 and data transfer is made, the encoder unit (video encoder 416, audio encoder 417, and SP encoder 418) can understand and skip padding packet 40.

By setting padding packet 40 (or stuffing packet in FIG. 26(i)) in this way, even when padding area 38 is erroneously recognized since end code 32 cannot be read, danger of displaying a wrong video can be greatly reduced.

7. The area range designated by an original cell is set to be equal to or smaller than that designated by a stream object. By designating the playback range in the residual stream object after partial erase in this manner, the user can precisely set an apparent arbitrary range as the partial erase range.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information medium configured to have data recorded thereon by a recording apparatus and data reproduced therefrom by a reproducing apparatus, said data including management information used to access a stream object for at least one of recording and reproducing the data by at least one of the recording apparatus and the reproducing apparatus and bitstream information, said information medium comprising:

a data area configured to record the bitstream information of said stream object and real-time video recording information of a real-time video recording object obtained by encoding analog video information based on MPEG, and a management area configured to record the management information of the bitstream information and the real-time video recording information, wherein a first data unit is defined as a data packet of transport packets, a second data unit is defined as a data unit of stream blocks or stream object units, a third data unit is defined as an object data of said stream object, said bitstream information to be recorded in the data area is configured by said third data unit including said second data unit including said first data unit, said second data unit includes header information, said header information includes time-related information of the first data unit, the header information including said time-related information is configured to be recorded in the data area which is different from the management area, said management information includes other time-related information serving to reproduce the stream object including I-pictures of MPEG, and said medium is configured to adopt a data filing scheme having a directory which includes a data file of said bitstream information and another data file of said real-time video recording object.

2. A method of recording bitstream information on an information medium configured to have data recorded thereon by a recording apparatus and data reproduced therefrom by a reproducing apparatus, said data including management information used to access a stream object for at least one of recording and reproducing the data by at least one of the recording apparatus and the reproducing apparatus and bitstream information, said information medium comprising a data area configured to record the bitstream information of said stream object and real-time video recording information of a real-time video recording object obtained by encoding analog video information based on MPEG, and a management area configured to record the management information of the bitstream information and the real-time video recording information, wherein a first data unit is defined as a data packet of transport packets, a second data unit is defined as a data unit of stream blocks or stream object units, a third data unit is defined as an object data of said stream object, said bitstream information to be recorded in the data area is configured by said third data unit including said second data unit including said first data unit, said second data unit includes header information, said header information included time-related information of the first data unit, the header information including said time-related information is configured to be recorded in the data area which is different from the management area, said management information includes other time-related information serving to reproduce the stream object including I-pictures of MPEG, and said medium is configured to adopt a data filing scheme having a directory which includes a data file of said bitstream information and another data file of said real-time video recording object, said method comprising:

recording the stream object on the data area; and recording the management information on the management area.

3. A method of reproducing bitstream information from an information medium configured to have data recorded thereon by a recording apparatus and data reproduced therefrom by a reproducing apparatus, said data including management information used to access a stream object for at least one of recording and reproducing the data by at least one of the recording apparatus and the reproducing apparatus and bitstream information, said information medium comprising a data area configured to record the bitstream information of said stream object and real-time video recording information of a real-time video recording object obtained by encoding analog video information based on MPEG, and a management area configured to record the management information of the bitstream information and the real-time video recording information, wherein a first data unit is defined as a data packet of transport packets, a second data unit is defined as a data unit of stream blocks or stream object units, a third data unit is defined as an object data of said stream object, said bitstream information to be recorded in the data area is configured by said third data unit including said second data unit including said first data unit, said second data unit includes header information, said header information included time-related information of the first data unit, the header information including said time-related information is configured to be recorded in the data area which is different from the management area, said management information includes other time-related information serving to reproduce the stream object including I-pictures of MPEG, and said medium is configured to adopt a data filing scheme having a directory which includes a data file of said bitstream information and another data file of said real-time video recording object, said method comprising:

reproducing the management information from the management area; and reproducing the stream object from the data area.

4. An apparatus of recording bitstream information on an information medium configured to have data recorded thereon by a recording apparatus and data reproduced therefrom by a reproducing apparatus, said data including management information used to access a stream object for at least one of recording and reproducing the data by at least one of the recording apparatus and the reproducing apparatus and bitstream information, said information medium comprising a data area configured to record the bitstream information of said stream object and real-time video recording information of a real-time video recording object obtained by encoding analog video information based on MPEG, and a management area configured to record the management information of the bitstream information and the real-time video recording information, wherein a first data unit is defined as a data packet of transport packets, a second data unit is defined as a data unit of stream blocks or stream object units, a third data unit is defined as an object data of said stream object, said bitstream information to be recorded in the data area is configured by said third data unit including said second data unit including said first data unit, said second data unit includes header information, said header information included time-related information of the first data unit, the header information including said time-related information is configured to be recorded in the data area which is different from the management area, said management information includes other time-related information serving to reproduce the stream object including I-pictures of MPEG, and said medium is configured to adopt a data filing scheme having a directory which includes a data file of said bitstream information and another data file of said real-time video recording object, said apparatus comprising:

a first recorder configured to record the stream object on the data area; and a second recorder configured to record the management information on the management area.

5. An apparatus of reproducing bitstream information from an information medium configured to have data recorded thereon by a recording apparatus and data reproduced therefrom by a reproducing apparatus, said data including management information used to access a stream object for at least one of recording and reproducing the data by at least one of the recording apparatus and the reproducing apparatus and bitstream information, said information medium comprising a data area configured to record the bitstream information of said stream object and real-time video recording information of a real-time video recording object obtained by encoding analog video information based on MPEG, and a management area configured to record the management information of the bitstream information and the real-time video recording information, wherein a first data unit is defined as a data packet of transport packets, a second data unit is defined as a data unit of stream blocks or stream object units, a third data unit is defined as an object data of said stream object, said bitstream information to be recorded in the data area is configured by said third data unit including said second data unit including said first data unit, said second data unit includes header information, said header information included time-related information of the first data unit, the header information including said time-related information is configured to be recorded in the data area which is different from the management area, said management information includes other time-related information serving to reproduce the stream object including I-pictures of MPEG, and said medium is configured to adopt a data filing scheme having a directory which includes a data file of said bitstream information and another data file of said real-time video recording object, said apparatus comprising:

a first reproducer configured to reproduce the management information from the management area, and a second reproducer configured to reproduce the stream object from the data area.

* * * * *